(12) United States Patent
Perrin et al.

(10) Patent No.: US 7,761,845 B1
(45) Date of Patent: Jul. 20, 2010

(54) METHOD FOR PARAMETERIZING A USER MODULE

(75) Inventors: Jon Perrin, Redmond, WA (US); Dennis Seguine, Monroe, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1433 days.

(21) Appl. No.: 10/238,966

(22) Filed: Sep. 9, 2002

(51) Int. Cl.
G06F 9/44 (2006.01)

(52) U.S. Cl. .................. 717/109; 717/106; 717/113

(58) Field of Classification Search .................. 716/4–5; 717/110–113, 106–109, 100; 703/14–28
See application file for complete search history.

(56) References Cited

U.S. PATENT DOCUMENTS

| | | |
|---|---|---|
| 3,600,690 A | 8/1971 | White |
| 3,725,804 A | 4/1973 | Langan |
| 3,740,588 A | 6/1973 | Stratton et al. |
| 3,810,036 A | 5/1974 | Bloedom |
| 3,831,113 A | 8/1974 | Ahmed |
| 3,845,328 A | 10/1974 | Hollingsworth |
| 3,940,760 A | 2/1976 | Brokaw |
| 4,061,987 A | 12/1977 | Nagahama |
| 4,134,073 A | 1/1979 | MacGregor |
| 4,138,671 A | 2/1979 | Comer et al. |
| 4,176,258 A | 11/1979 | Jackson |
| 4,250,464 A | 2/1981 | Schade, Jr. |
| 4,272,760 A | 6/1981 | Prazak et al. |
| 4,283,713 A | 8/1981 | Phillipp |
| 4,326,135 A | 4/1982 | Jarrett et al. |
| 4,344,067 A | 8/1982 | Lee |
| 4,380,083 A | 4/1983 | Andersson et al. |
| 4,438,404 A | 3/1984 | Phillipp |
| 4,475,151 A | 10/1984 | Phillipp |
| 4,497,575 A | 2/1985 | Phillipp |
| 4,608,502 A | 8/1986 | Dijkmans et al. |
| 4,656,603 A | 4/1987 | Dunn |
| 4,670,838 A | 6/1987 | Kawata |
| 4,689,740 A | 8/1987 | Moelands et al. |
| 4,692,718 A | 9/1987 | Roza et al. |
| 4,701,907 A | 10/1987 | Collins |
| 4,727,541 A | 2/1988 | Mori et al. |
| 4,736,097 A | 4/1988 | Phillipp |
| 4,740,966 A | 4/1988 | Goad |
| 4,755,766 A | 7/1988 | Metz |
| 4,773,024 A | 9/1988 | Faggin et al. |

(Continued)

FOREIGN PATENT DOCUMENTS

DE 19710829 A1 9/1998

(Continued)

OTHER PUBLICATIONS

Turner "THe Structure of Modular Programs" May 1980, Communications of the ACM, V23 No. 5, pp. 272-277.*

(Continued)

Primary Examiner—Jason Mitchell

(57) ABSTRACT

A method for parameterizing a user module. A first design application corresponding to a parameter of a user module is accessed, wherein the user module is a pre-configured electronic design to be implemented on a microcontroller. The parameter is adjusted within the first design application to derive parameterized data. In response to a command, the parameterized data is automatically loaded into a second design application.

20 Claims, 9 Drawing Sheets

U.S. PATENT DOCUMENTS

| | | |
|---|---|---|
| 4,794,558 A | 12/1988 | Thompson |
| 4,802,103 A | 1/1989 | Faggin et al. |
| 4,802,119 A | 1/1989 | Heene et al. |
| 4,809,345 A | 2/1989 | Tabata et al. |
| 4,812,684 A | 3/1989 | Yamagiwa et al. |
| 4,827,401 A | 5/1989 | Hrustich et al. |
| 4,833,418 A | 5/1989 | Quintus et al. |
| 4,868,525 A | 9/1989 | Dias |
| 4,876,534 A | 10/1989 | Mead et al. |
| 4,878,200 A | 10/1989 | Asghar et al. |
| 4,879,461 A | 11/1989 | Phillipp |
| 4,885,484 A | 12/1989 | Gray |
| 4,907,121 A | 3/1990 | Hrassky |
| 4,935,702 A | 6/1990 | Mead et al. |
| 4,939,637 A | 7/1990 | Pawloski |
| 4,942,540 A | 7/1990 | Black et al. |
| 4,947,169 A | 8/1990 | Smith et al. |
| 4,953,928 A | 9/1990 | Anderson et al. |
| 4,962,342 A | 10/1990 | Mead et al. |
| 4,964,074 A | 10/1990 | Suzuki et al. |
| 4,969,087 A | 11/1990 | Tanagawa et al. |
| 4,970,408 A | 11/1990 | Hanke et al. |
| 4,972,372 A | 11/1990 | Ueno |
| 4,977,381 A | 12/1990 | Main |
| 4,980,652 A | 12/1990 | Tarusawa et al. |
| 4,999,519 A | 3/1991 | Kitsukawa et al. |
| 5,043,674 A | 8/1991 | Bonaccio et al. |
| 5,049,758 A | 9/1991 | Mead et al. |
| 5,050,168 A | 9/1991 | Paterson |
| 5,053,949 A | 10/1991 | Allison et al. |
| 5,055,827 A | 10/1991 | Phillipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,088,822 A | 2/1992 | Warren |
| 5,095,284 A | 3/1992 | Mead |
| 5,097,305 A | 3/1992 | Mead et al. |
| 5,107,146 A | 4/1992 | El-Ayat |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Phillipp |
| 5,126,685 A | 6/1992 | Platt et al. |
| 5,127,103 A | 6/1992 | Hill et al. |
| 5,128,871 A | 7/1992 | Schmitz |
| 5,136,188 A | 8/1992 | Ha et al. |
| 5,140,197 A | 8/1992 | Grider |
| 5,142,247 A | 8/1992 | Lada et al. |
| 5,144,582 A | 9/1992 | Steele |
| 5,146,106 A | 9/1992 | Anderson et al. |
| 5,150,079 A | 9/1992 | Williams et al. |
| 5,155,836 A | 10/1992 | Jordan et al. |
| 5,159,292 A | 10/1992 | Canfield et al. |
| 5,159,335 A | 10/1992 | Veneruso |
| 5,160,899 A | 11/1992 | Anderson et al. |
| 5,161,124 A | 11/1992 | Love |
| 5,165,054 A | 11/1992 | Platt et al. |
| 5,166,562 A | 11/1992 | Allen et al. |
| 5,175,884 A | 12/1992 | Suarez |
| 5,179,531 A | 1/1993 | Yamaki |
| 5,198,817 A | 3/1993 | Walden et al. |
| 5,200,751 A | 4/1993 | Smith |
| 5,202,687 A | 4/1993 | Distinti |
| 5,204,549 A | 4/1993 | Platt et al. |
| 5,206,582 A | 4/1993 | Ekstedt et al. |
| 5,220,512 A * | 6/1993 | Watkins et al. ................ 716/11 |
| 5,230,000 A | 7/1993 | Mozingo et al. |
| 5,235,617 A | 8/1993 | Mallard, Jr. |
| 5,241,492 A | 8/1993 | Girardeau, Jr. |
| 5,243,554 A | 9/1993 | Allen et al. |
| 5,245,262 A | 9/1993 | Moody et al. |
| 5,248,843 A | 9/1993 | Billings |
| 5,248,873 A | 9/1993 | Allen et al. |
| 5,258,760 A | 11/1993 | Moody et al. |
| 5,260,592 A | 11/1993 | Mead et al. |
| 5,260,979 A | 11/1993 | Parker et al. |
| 5,270,963 A | 12/1993 | Allen et al. |
| 5,276,407 A | 1/1994 | Mead et al. |
| 5,276,890 A | 1/1994 | Arai |
| 5,280,199 A | 1/1994 | Itakura |
| 5,280,202 A | 1/1994 | Chan et al. |
| 5,289,023 A | 2/1994 | Mead |
| 5,303,329 A | 4/1994 | Mead et al. |
| 5,304,955 A | 4/1994 | Atriss et al. |
| 5,305,017 A | 4/1994 | Gerphide |
| 5,305,312 A | 4/1994 | Fornek et al. |
| 5,307,381 A | 4/1994 | Ahuja |
| 5,313,618 A | 5/1994 | Pawloski |
| 5,317,202 A | 5/1994 | Waizman |
| 5,319,370 A | 6/1994 | Signore et al. |
| 5,319,771 A | 6/1994 | Takeda |
| 5,321,828 A | 6/1994 | Phillips et al. |
| 5,324,958 A | 6/1994 | Mead et al. |
| 5,325,512 A | 6/1994 | Takahashi |
| 5,329,471 A | 7/1994 | Swoboda et al. |
| 5,331,215 A | 7/1994 | Allen et al. |
| 5,331,315 A | 7/1994 | Crosette |
| 5,331,571 A | 7/1994 | Aronoff et al. |
| 5,334,952 A | 8/1994 | Maddy et al. |
| 5,336,936 A | 8/1994 | Allen et al. |
| 5,339,213 A | 8/1994 | O'Callaghan |
| 5,339,262 A | 8/1994 | Rostoker et al. |
| 5,341,267 A | 8/1994 | Whitten |
| 5,345,195 A | 9/1994 | Cordoba et al. |
| 5,349,303 A | 9/1994 | Gerpheide |
| 5,355,097 A | 10/1994 | Scott et al. |
| 5,357,626 A | 10/1994 | Johnson et al. |
| 5,361,290 A | 11/1994 | Akiyama |
| 5,371,524 A | 12/1994 | Herczeg et al. |
| 5,371,860 A | 12/1994 | Mura et al. |
| 5,371,878 A | 12/1994 | Coker |
| 5,374,787 A | 12/1994 | Miller et al. |
| 5,378,935 A | 1/1995 | Korhonen et al. |
| 5,381,515 A | 1/1995 | Platt et al. |
| 5,384,467 A | 1/1995 | Plimon et al. |
| 5,384,745 A | 1/1995 | Konishi et al. |
| 5,384,910 A | 1/1995 | Torres |
| 5,392,784 A | 2/1995 | Gudaitis |
| 5,394,522 A | 2/1995 | Sanchez-Frank et al. |
| 5,396,245 A | 3/1995 | Rempfer |
| 5,398,261 A | 3/1995 | Marbot |
| 5,399,922 A | 3/1995 | Kiani et al. |
| 5,408,194 A | 4/1995 | Steinbach et al. |
| 5,414,308 A | 5/1995 | Lee et al. |
| 5,414,380 A | 5/1995 | Floyd et al. |
| 5,416,895 A | 5/1995 | Anderson et al. |
| 5,422,823 A | 6/1995 | Agrawal et al. |
| 5,424,689 A | 6/1995 | Gillig et al. |
| 5,426,378 A | 6/1995 | Ong |
| 5,426,384 A | 6/1995 | May |
| 5,428,319 A | 6/1995 | Marvin et al. |
| 5,430,395 A | 7/1995 | Ichimaru |
| 5,430,687 A | 7/1995 | Hung et al. |
| 5,430,734 A | 7/1995 | Gilson |
| 5,432,476 A | 7/1995 | Tran |
| 5,438,672 A | 8/1995 | Dey |
| 5,440,305 A | 8/1995 | Signore et al. |
| 5,451,887 A | 9/1995 | El-Ayat et al. |
| 5,455,525 A | 10/1995 | Ho et al. |
| 5,455,731 A | 10/1995 | Parkinson |
| 5,455,927 A | 10/1995 | Huang |
| 5,457,410 A | 10/1995 | Ting |

| | | | | | |
|---|---|---|---|---|---|
| 5,457,479 A | 10/1995 | Cheng | 5,663,965 A | 9/1997 | Seymour |
| 5,463,591 A | 10/1995 | Aimoto et al. | 5,664,199 A | 9/1997 | Kuwahara |
| 5,479,603 A | 12/1995 | Stone et al. | 5,670,915 A | 9/1997 | Cooper et al. |
| 5,479,643 A | 12/1995 | Bhaskar et al. | 5,673,198 A | 9/1997 | Lawman et al. |
| 5,479,652 A | 12/1995 | Dreyer et al. | 5,675,825 A | 10/1997 | Dreyer et al. |
| 5,481,471 A | 1/1996 | Naglestad | 5,677,691 A | 10/1997 | Hosticka et al. |
| 5,488,204 A | 1/1996 | Mead et al. | 5,680,070 A | 10/1997 | Anderson et al. |
| 5,491,458 A | 2/1996 | McCune | 5,682,032 A | 10/1997 | Phillipp |
| 5,493,246 A | 2/1996 | Anderson | 5,684,434 A | 11/1997 | Mann et al. |
| 5,493,723 A | 2/1996 | Beck et al. | 5,684,952 A | 11/1997 | Stein |
| 5,495,077 A | 2/1996 | Miller et al. | 5,686,844 A | 11/1997 | Hull et al. |
| 5,495,593 A | 2/1996 | Elmer et al. | 5,689,195 A | 11/1997 | Cliff et al. |
| 5,495,594 A | 2/1996 | MacKenna et al. | 5,689,196 A | 11/1997 | Schutte |
| 5,499,192 A | 3/1996 | Knapp et al. | 5,691,664 A | 11/1997 | Anderson et al. |
| 5,517,198 A | 5/1996 | McEwan | 5,691,898 A | 11/1997 | Rosenberg et al. |
| 5,519,854 A | 5/1996 | Watt | 5,694,063 A | 12/1997 | Burlison et al. |
| 5,521,529 A | 5/1996 | Agrawal et al. | 5,696,952 A | 12/1997 | Pontarelli |
| 5,530,444 A | 6/1996 | Tice et al. | 5,699,024 A | 12/1997 | Manlove et al. |
| 5,530,673 A | 6/1996 | Tobita et al. | 5,703,871 A | 12/1997 | Pope et al. |
| 5,530,813 A | 6/1996 | Paulsen et al. | 5,706,453 A | 1/1998 | Cheng et al. |
| 5,537,057 A | 7/1996 | Leong et al. | 5,708,798 A | 1/1998 | Lynch et al. |
| 5,541,878 A | 7/1996 | LeMoncheck et al. | 5,710,906 A | 1/1998 | Ghosh et al. |
| 5,543,588 A | 8/1996 | Bisset et al. | 5,712,969 A | 1/1998 | Zimmermann et al. |
| 5,543,590 A | 8/1996 | Gillespie et al. | 5,724,009 A | 3/1998 | Collins et al. |
| 5,543,591 A | 8/1996 | Gillespie et al. | 5,727,170 A | 3/1998 | Mitchell et al. |
| 5,544,067 A | 8/1996 | Rostoker et al. | 5,729,704 A | 3/1998 | Stone et al. |
| 5,544,311 A | 8/1996 | Harenberg et al. | 5,730,165 A | 3/1998 | Phillipp |
| 5,546,433 A | 8/1996 | Tran et al. | 5,732,277 A | 3/1998 | Kodosky et al. |
| 5,546,562 A | 8/1996 | Patel | 5,734,272 A | 3/1998 | Belot et al. |
| 5,552,725 A | 9/1996 | Ray et al. | 5,734,334 A | 3/1998 | Hsieh et al. |
| 5,552,748 A | 9/1996 | O'Shaughnessy | 5,737,557 A | 4/1998 | Sullivan |
| 5,554,951 A | 9/1996 | Gough | 5,737,760 A | 4/1998 | Grimmer et al. |
| 5,555,452 A | 9/1996 | Callaway et al. | 5,745,011 A | 4/1998 | Scott |
| 5,555,907 A | 9/1996 | Phillipp | 5,748,048 A | 5/1998 | Moyal |
| 5,557,762 A | 9/1996 | Okuaki et al. | 5,748,875 A | 5/1998 | Tzori |
| 5,559,502 A | 9/1996 | Schutte | 5,752,013 A | 5/1998 | Christensen et al. |
| 5,559,996 A | 9/1996 | Fujioka et al. | 5,754,552 A | 5/1998 | Allmond et al. |
| 5,563,526 A | 10/1996 | Hastings et al. | 5,754,826 A | 5/1998 | Gamal et al. |
| 5,563,529 A | 10/1996 | Seltzer et al. | 5,757,368 A | 5/1998 | Gerpheide et al. |
| 5,564,010 A | 10/1996 | Henry et al. | 5,758,058 A | 5/1998 | Milburn |
| 5,564,108 A | 10/1996 | Hunsaker et al. | 5,761,128 A | 6/1998 | Watanabe |
| 5,565,658 A | 10/1996 | Gerpheide et al. | 5,763,909 A | 6/1998 | Mead et al. |
| 5,566,702 A | 10/1996 | Phillipp | 5,764,714 A | 6/1998 | Stansell et al. |
| 5,572,665 A | 11/1996 | Nakabayashi et al. | 5,767,457 A | 6/1998 | Gerpheide et al. |
| 5,572,719 A | 11/1996 | Biesterfeldt | 5,774,704 A | 6/1998 | Williams |
| 5,574,678 A | 11/1996 | Gorecki | 5,777,399 A | 7/1998 | Shibuya |
| 5,574,852 A | 11/1996 | Bakker et al. | 5,781,030 A | 7/1998 | Agrawal et al. |
| 5,574,892 A | 11/1996 | Christensen | 5,781,747 A | 7/1998 | Smith et al. |
| 5,579,353 A | 11/1996 | Parmenter et al. | 5,784,545 A | 7/1998 | Anderson et al. |
| 5,587,945 A | 12/1996 | Lin et al. | 5,790,957 A | 8/1998 | Heidari |
| 5,587,957 A | 12/1996 | Kowalczyk et al. | 5,796,183 A | 8/1998 | Hourmand |
| 5,590,354 A | 12/1996 | Klapproth et al. | 5,799,176 A | 8/1998 | Kapusta et al. |
| 5,594,388 A | 1/1997 | O'Shaughnessy et al. | 5,802,073 A | 9/1998 | Platt |
| 5,594,734 A | 1/1997 | Worsley et al. | 5,802,290 A | 9/1998 | Casselman |
| 5,594,890 A | 1/1997 | Yamaura et al. | 5,805,792 A | 9/1998 | Swoboda et al. |
| 5,600,262 A | 2/1997 | Kolze | 5,805,897 A | 9/1998 | Glowny |
| 5,604,466 A | 2/1997 | Dreps et al. | 5,808,883 A | 9/1998 | Hawkes |
| 5,608,892 A | 3/1997 | Wakerly | 5,811,987 A | 9/1998 | Ashmore, Jr. et al. |
| 5,614,861 A | 3/1997 | Harada | 5,812,698 A | 9/1998 | Platt et al. |
| 5,625,316 A | 4/1997 | Chambers et al. | 5,818,254 A | 10/1998 | Agrawal et al. |
| 5,629,857 A | 5/1997 | Brennan | 5,818,444 A | 10/1998 | Alimpich et al. |
| 5,629,891 A | 5/1997 | LeMoncheck et al. | 5,819,028 A | 10/1998 | Manghirmalani et al. |
| 5,630,052 A | 5/1997 | Shah | 5,822,387 A | 10/1998 | Mar |
| 5,630,057 A | 5/1997 | Hait | 5,822,531 A | 10/1998 | Gorczyca et al. |
| 5,630,102 A | 5/1997 | Johnson et al. | 5,828,693 A | 10/1998 | Mays et al. |
| 5,631,577 A | 5/1997 | Freidin et al. | 5,838,583 A | 11/1998 | Varadarajan et al. |
| 5,633,766 A | 5/1997 | Hase et al. | 5,841,078 A | 11/1998 | Miller et al. |
| 5,642,295 A | 6/1997 | Smayling | 5,841,996 A | 11/1998 | Nolan et al. |
| 5,646,544 A | 7/1997 | Iadanza | 5,844,256 A | 12/1998 | Mead et al. |
| 5,646,901 A | 7/1997 | Sharpe-Geisler et al. | 5,848,285 A | 12/1998 | Kapusta et al. |
| 5,648,642 A | 7/1997 | Miller et al. | 5,850,156 A | 12/1998 | Wittman |
| 5,651,035 A | 7/1997 | Tozun | 5,852,733 A | 12/1998 | Chien et al. |
| 5,663,900 A | 9/1997 | Bhandari et al. | 5,854,625 A | 12/1998 | Frisch et al. |

| | | | | | | |
|---|---|---|---|---|---|---|
| 5,857,109 A | | 1/1999 | Taylor | 5,982,229 A | 11/1999 | Wong et al. |
| 5,861,583 A | | 1/1999 | Schediwy et al. | 5,982,241 A | 11/1999 | Nguyen et al. |
| 5,861,875 A | | 1/1999 | Gerpheide | 5,983,277 A | 11/1999 | Heile et al. |
| 5,864,242 A | | 1/1999 | Allen et al. | 5,986,479 A | 11/1999 | Mohan |
| 5,864,392 A | | 1/1999 | Winklhofer et al. | 5,987,246 A | 11/1999 | Thomsen et al. |
| 5,867,046 A | | 2/1999 | Sugasawa | 5,988,902 A | 11/1999 | Holehan |
| 5,867,399 A | | 2/1999 | Rostoker et al. | 5,994,939 A | 11/1999 | Johnson et al. |
| 5,869,979 A | | 2/1999 | Bocchino | 5,996,032 A | 11/1999 | Baker |
| 5,870,004 A | | 2/1999 | Lu | 5,999,725 A | 12/1999 | Barbier et al. |
| 5,870,309 A | * | 2/1999 | Lawman ................. 716/6 | 6,002,268 A | 12/1999 | Sasaki et al. |
| 5,870,345 A | | 2/1999 | Stecker | 6,002,398 A | 12/1999 | Wilson |
| 5,872,464 A | | 2/1999 | Gradinariu | 6,003,054 A | 12/1999 | Oshima et al. |
| 5,874,958 A | | 2/1999 | Ludolph | 6,003,133 A | 12/1999 | Moughanni et al. |
| 5,875,293 A | | 2/1999 | Bell et al. | 6,005,814 A | 12/1999 | Mulholland et al. |
| 5,877,656 A | | 3/1999 | Mann et al. | 6,005,904 A | 12/1999 | Knapp et al. |
| 5,878,425 A | * | 3/1999 | Redpath ................. 707/102 | 6,008,685 A | 12/1999 | Kunst |
| 5,880,411 A | | 3/1999 | Gillespie et al. | 6,008,703 A | 12/1999 | Perrott et al. |
| 5,880,598 A | | 3/1999 | Duong | 6,009,270 A | 12/1999 | Mann |
| 5,883,623 A | | 3/1999 | Cseri | 6,009,496 A | 12/1999 | Tsai |
| 5,886,582 A | | 3/1999 | Stansell | 6,011,407 A | 1/2000 | New |
| 5,889,236 A | | 3/1999 | Gillespie et al. | 6,012,835 A | 1/2000 | Thompson et al. |
| 5,889,723 A | | 3/1999 | Pascucci | 6,014,135 A | 1/2000 | Fernandes |
| 5,889,936 A | | 3/1999 | Chan | 6,014,509 A | 1/2000 | Furtek et al. |
| 5,889,988 A | | 3/1999 | Held | 6,016,554 A | 1/2000 | Skrovan et al. |
| 5,894,226 A | | 4/1999 | Koyama | 6,016,563 A | 1/2000 | Fleisher |
| 5,894,243 A | | 4/1999 | Hwang | 6,018,559 A | 1/2000 | Azegami et al. |
| 5,894,565 A | | 4/1999 | Furtek et al. | 6,023,422 A | 2/2000 | Allen et al. |
| 5,895,494 A | | 4/1999 | Scalzi et al. | 6,023,565 A | 2/2000 | Lawman et al. |
| 5,896,068 A | | 4/1999 | Moyal | 6,026,134 A | 2/2000 | Duffy et al. |
| 5,896,330 A | | 4/1999 | Gibson | 6,026,501 A | 2/2000 | Hohl et al. |
| 5,898,345 A | | 4/1999 | Namura et al. | 6,028,271 A | 2/2000 | Gillespie et al. |
| 5,900,780 A | | 5/1999 | Hirose et al. | 6,028,959 A | 2/2000 | Wang et al. |
| 5,901,062 A | | 5/1999 | Burch et al. | 6,031,365 A | 2/2000 | Sharpe-Geisler |
| 5,903,718 A | | 5/1999 | Marik | 6,032,268 A | 2/2000 | Swoboda et al. |
| 5,905,398 A | | 5/1999 | Todsen et al. | 6,034,538 A | 3/2000 | Abramovici |
| 5,911,059 A | | 6/1999 | Profit, Jr. | 6,037,807 A | 3/2000 | Wu et al. |
| 5,914,465 A | | 6/1999 | Allen et al. | 6,038,551 A | 3/2000 | Barlow et al. |
| 5,914,633 A | | 6/1999 | Comino et al. | 6,041,406 A | 3/2000 | Mann |
| 5,914,708 A | | 6/1999 | LaGrange et al. | 6,043,695 A | 3/2000 | O'Sullivan |
| 5,917,356 A | | 6/1999 | Casal et al. | 6,043,719 A | 3/2000 | Lin et al. |
| 5,920,310 A | | 7/1999 | Faggin et al. | 6,049,223 A | 4/2000 | Lytle et al. |
| 5,923,264 A | | 7/1999 | Lavelle et al. | 6,049,225 A | 4/2000 | Huang et al. |
| 5,926,566 A | | 7/1999 | Wang et al. | 6,051,772 A | 4/2000 | Cameron et al. |
| 5,929,710 A | | 7/1999 | Bien | 6,052,035 A | 4/2000 | Nolan et al. |
| 5,930,150 A | | 7/1999 | Cohen et al. | 6,052,524 A | 4/2000 | Pauna |
| 5,933,023 A | | 8/1999 | Young | 6,057,705 A | 5/2000 | Wojewoda et al. |
| 5,933,356 A | | 8/1999 | Rostoker et al. | 6,058,263 A | 5/2000 | Voth |
| 5,933,816 A | | 8/1999 | Zeanah et al. | 6,058,452 A | 5/2000 | Rangasayee et al. |
| 5,935,266 A | | 8/1999 | Thurnhofer et al. | 6,061,511 A | 5/2000 | Marantz et al. |
| 5,939,904 A | | 8/1999 | Fetterman et al. | 6,066,961 A | 5/2000 | Lee et al. |
| 5,939,949 A | | 8/1999 | Olgaard et al. | 6,070,003 A | 5/2000 | Gove et al. |
| 5,941,991 A | | 8/1999 | Kageshima | 6,072,803 A | 6/2000 | Allmond et al. |
| 5,942,733 A | | 8/1999 | Allen et al. | 6,075,941 A | 6/2000 | Itoh et al. |
| 5,943,052 A | | 8/1999 | Allen et al. | 6,079,985 A | 6/2000 | Wohl et al. |
| 5,945,878 A | | 8/1999 | Westwick et al. | 6,081,140 A | 6/2000 | King |
| 5,949,632 A | | 9/1999 | Barreras, Sr. et al. | 6,094,730 A | 7/2000 | Lopez et al. |
| 5,952,888 A | | 9/1999 | Scott | 6,097,211 A | 8/2000 | Couts-Martin et al. |
| 5,959,871 A | | 9/1999 | Pierzchala et al. | 6,097,432 A | 8/2000 | Mead et al. |
| 5,963,075 A | | 10/1999 | Hiiragizawa | 6,101,457 A | 8/2000 | Barch et al. |
| 5,963,105 A | | 10/1999 | Nguyen | 6,101,617 A | 8/2000 | Burckhartt et al. |
| 5,963,503 A | | 10/1999 | Lee | 6,104,217 A | 8/2000 | Magana |
| 5,964,893 A | | 10/1999 | Circello et al. | 6,104,325 A | 8/2000 | Liaw et al. |
| 5,966,027 A | | 10/1999 | Kapusta et al. | 6,107,769 A | 8/2000 | Saylor et al. |
| 5,966,532 A | | 10/1999 | McDonald et al. | 6,107,826 A | 8/2000 | Young et al. |
| 5,968,135 A | | 10/1999 | Teramoto et al. | 6,107,882 A | 8/2000 | Gabara et al. |
| 5,969,513 A | | 10/1999 | Clark | 6,110,223 A | 8/2000 | Southgate et al. |
| 5,969,632 A | | 10/1999 | Diamant et al. | 6,111,431 A | 8/2000 | Estrada |
| 5,973,368 A | | 10/1999 | Pearce et al. | 6,112,264 A | 8/2000 | Beasley et al. |
| 5,974,235 A | | 10/1999 | Nunally et al. | 6,121,791 A | 9/2000 | Abbott |
| 5,977,791 A | | 11/1999 | Veenstra | 6,121,805 A | 9/2000 | Thamsirianunt et al. |
| 5,978,584 A | | 11/1999 | Nishibata et al. | 6,121,965 A | 9/2000 | Kenney et al. |
| 5,978,937 A | | 11/1999 | Miyamori et al. | 6,125,416 A | 9/2000 | Warren |
| 5,982,105 A | | 11/1999 | Masters | 6,130,548 A | 10/2000 | Koifman |

| | | | |
|---|---|---|---|
| 6,130,551 A * | 10/2000 | Agrawal et al. ............... 326/39 |
| 6,130,552 A | 10/2000 | Jefferson et al. |
| 6,133,773 A | 10/2000 | Garlepp et al. |
| 6,134,181 A | 10/2000 | Landry |
| 6,134,516 A | 10/2000 | Wang et al. |
| 6,137,308 A | 10/2000 | Nayak |
| 6,140,853 A | 10/2000 | Lo |
| 6,141,376 A | 10/2000 | Shaw |
| 6,141,764 A | 10/2000 | Ezell |
| 6,144,327 A | 11/2000 | Distinti et al. |
| 6,148,104 A | 11/2000 | Wang et al. |
| 6,148,441 A | 11/2000 | Woodward |
| 6,149,299 A | 11/2000 | Aslan et al. |
| 6,150,866 A | 11/2000 | Eto et al. |
| 6,154,064 A | 11/2000 | Proebsting |
| 6,157,024 A | 12/2000 | Chapdelaine et al. |
| 6,157,270 A | 12/2000 | Tso |
| 6,161,199 A | 12/2000 | Szeto et al. |
| 6,166,367 A | 12/2000 | Cho |
| 6,166,960 A | 12/2000 | Marneweck et al. |
| 6,167,077 A | 12/2000 | Ducaroir |
| 6,167,559 A | 12/2000 | Furtek et al. |
| 6,169,383 B1 | 1/2001 | Sabin et al. |
| 6,172,571 B1 | 1/2001 | Moyal et al. |
| 6,173,419 B1 | 1/2001 | Barnett |
| 6,175,914 B1 | 1/2001 | Mann |
| 6,175,949 B1 | 1/2001 | Gristede et al. |
| 6,181,163 B1 | 1/2001 | Agrawal et al. |
| 6,183,131 B1 | 2/2001 | Holloway et al. |
| 6,185,127 B1 | 2/2001 | Myers et al. |
| 6,185,450 B1 | 2/2001 | Seguine et al. |
| 6,185,522 B1 | 2/2001 | Bakker |
| 6,185,703 B1 | 2/2001 | Guddat et al. |
| 6,185,732 B1 | 2/2001 | Mann et al. |
| 6,188,228 B1 | 2/2001 | Philipp |
| 6,188,241 B1 | 2/2001 | Gauthier et al. |
| 6,188,381 B1 | 2/2001 | van der Wal et al. |
| 6,188,391 B1 | 2/2001 | Seely et al. |
| 6,188,975 B1 | 2/2001 | Gay |
| 6,191,603 B1 | 2/2001 | Muradali et al. |
| 6,191,660 B1 | 2/2001 | Mar et al. |
| 6,191,998 B1 | 2/2001 | Reddy et al. |
| 6,192,431 B1 | 2/2001 | Dabral et al. |
| 6,198,303 B1 | 3/2001 | Rangasayee |
| 6,201,407 B1 | 3/2001 | Kapusta et al. |
| 6,201,829 B1 | 3/2001 | Schneider |
| 6,202,044 B1 | 3/2001 | Tzori |
| 6,204,687 B1 | 3/2001 | Schultz et al. |
| 6,205,574 B1 | 3/2001 | Dellinger et al. |
| 6,208,572 B1 | 3/2001 | Adams et al. |
| 6,211,708 B1 | 4/2001 | Klemmer |
| 6,211,715 B1 | 4/2001 | Terauchi |
| 6,211,741 B1 | 4/2001 | Dalmia |
| 6,215,352 B1 | 4/2001 | Sudo |
| 6,219,729 B1 | 4/2001 | Keats et al. |
| 6,222,528 B1 | 4/2001 | Gerpheide et al. |
| 6,223,144 B1 | 4/2001 | Barnett et al. |
| 6,223,147 B1 | 4/2001 | Bowers |
| 6,223,272 B1 | 4/2001 | Coehlo et al. |
| RE37,195 E | 5/2001 | Kean |
| 6,225,866 B1 | 5/2001 | Kubota et al. |
| 6,236,242 B1 | 5/2001 | Hedberg |
| 6,236,275 B1 | 5/2001 | Dent |
| 6,236,278 B1 | 5/2001 | Olgaard |
| 6,236,593 B1 | 5/2001 | Hong et al. |
| 6,239,389 B1 | 5/2001 | Allen et al. |
| 6,239,798 B1 | 5/2001 | Ludolph et al. |
| 6,240,375 B1 | 5/2001 | Sonoda |
| 6,246,258 B1 | 6/2001 | Lesea |
| 6,246,410 B1 | 6/2001 | Bergeron et al. |
| 6,249,167 B1 | 6/2001 | Oguchi et al. |
| 6,249,447 B1 | 6/2001 | Boylan et al. |
| 6,253,754 B1 | 7/2001 | Roohparvar |
| 6,262,717 B1 | 7/2001 | Donohue et al. |
| 6,263,302 B1 | 7/2001 | Hellestrand et al. |
| 6,263,339 B1 | 7/2001 | Hirsh |
| 6,263,484 B1 | 7/2001 | Yang |
| 6,271,679 B1 | 8/2001 | McClintock et al. |
| 6,272,646 B1 | 8/2001 | Rangasayee |
| 6,275,117 B1 | 8/2001 | Abugharbieh et al. |
| 6,278,568 B1 | 8/2001 | Cloke et al. |
| 6,280,391 B1 | 8/2001 | Olson et al. |
| 6,281,753 B1 | 8/2001 | Corsi et al. |
| 6,282,547 B1 | 8/2001 | Hirsh |
| 6,282,551 B1 | 8/2001 | Anderson et al. |
| 6,286,127 B1 | 9/2001 | King et al. |
| 6,288,707 B1 | 9/2001 | Philipp |
| 6,289,300 B1 | 9/2001 | Brannick et al. |
| 6,289,478 B1 | 9/2001 | Kitagaki |
| 6,289,489 B1 * | 9/2001 | Bold et al. ............... 716/1 |
| 6,292,028 B1 | 9/2001 | Tomita |
| 6,294,932 B1 | 9/2001 | Watarai |
| 6,294,962 B1 | 9/2001 | Mar |
| 6,298,320 B1 | 10/2001 | Buckmaster et al. |
| 6,304,014 B1 | 10/2001 | England et al. |
| 6,304,101 B1 | 10/2001 | Nishihara |
| 6,304,790 B1 | 10/2001 | Nakamura et al. |
| 6,307,413 B1 | 10/2001 | Dalmia et al. |
| 6,310,521 B1 | 10/2001 | Dalmia |
| 6,310,611 B1 | 10/2001 | Caldwell |
| 6,311,149 B1 | 10/2001 | Ryan et al. |
| 7,406,674 B1 | 10/2001 | Ogami et al. |
| 6,314,530 B1 | 11/2001 | Mann |
| 6,320,184 B1 | 11/2001 | Winklhofer et al. |
| 6,320,282 B1 | 11/2001 | Caldwell |
| 6,321,369 B1 | 11/2001 | Heile et al. |
| 6,323,846 B1 | 11/2001 | Westerman et al. |
| 6,324,628 B1 | 11/2001 | Chan |
| 6,326,859 B1 | 12/2001 | Goldman et al. |
| 6,332,137 B1 | 12/2001 | Hori et al. |
| 6,332,201 B1 | 12/2001 | Chin et al. |
| 6,337,579 B1 | 1/2002 | Mochida |
| 6,338,109 B1 | 1/2002 | Snyder et al. |
| 6,339,815 B1 | 1/2002 | Feng et al. |
| 6,342,907 B1 | 1/2002 | Petty et al. |
| 6,345,383 B1 | 2/2002 | Ueki |
| 6,347,395 B1 | 2/2002 | Payne et al. |
| 6,351,789 B1 | 2/2002 | Green |
| 6,353,452 B1 | 3/2002 | Hamada et al. |
| 6,355,980 B1 | 3/2002 | Callahan |
| 6,356,862 B2 | 3/2002 | Bailey |
| 6,356,958 B1 | 3/2002 | Lin |
| 6,356,960 B1 | 3/2002 | Jones et al. |
| 6,359,950 B2 | 3/2002 | Gossmann et al. |
| 6,362,697 B1 | 3/2002 | Pulvirenti |
| 6,366,174 B1 | 4/2002 | Berry et al. |
| 6,366,300 B1 | 4/2002 | Ohara et al. |
| 6,366,874 B1 * | 4/2002 | Lee et al. ............... 703/14 |
| 6,366,878 B1 | 4/2002 | Grunert |
| 6,369,660 B1 | 4/2002 | Wei |
| 6,371,878 B1 | 4/2002 | Bowen |
| 6,373,954 B1 | 4/2002 | Malcolm et al. |
| 6,374,380 B1 | 4/2002 | Bockhaus et al. |
| 6,377,009 B1 | 4/2002 | Philipp |
| 6,377,575 B1 | 4/2002 | Mullaney et al. |
| 6,377,646 B1 | 4/2002 | Sha |
| 6,380,811 B1 | 4/2002 | Zarubinsky et al. |
| 6,380,929 B1 | 4/2002 | Platt |
| 6,380,931 B1 | 4/2002 | Gillespie et al. |
| 6,384,947 B1 | 5/2002 | Ackerman et al. |
| 6,385,742 B1 | 5/2002 | Kirsch et al. |
| 6,388,109 B1 | 5/2002 | Schwarz et al. |
| 6,388,464 B1 | 5/2002 | Lacey et al. |
| 6,396,302 B2 | 5/2002 | New et al. |
| 6,396,657 B1 | 5/2002 | Sun et al. |
| 6,397,232 B1 | 5/2002 | Cheng-Hung et al. |

| Patent | Type | Date | Inventor |
|---|---|---|---|
| 6,404,204 | B1 | 6/2002 | Farruggia et al. |
| 6,404,445 | B1 | 6/2002 | Galea et al. |
| 6,407,953 | B1 | 6/2002 | Cleeves |
| 6,408,432 | B1 | 6/2002 | Herrmann et al. |
| 6,411,665 | B1 | 6/2002 | Chan et al. |
| 6,411,974 | B1 | 6/2002 | Graham et al. |
| 6,414,671 | B1 | 7/2002 | Gillespie et al. |
| 6,421,698 | B1 | 7/2002 | Hong |
| 6,425,109 | B1 * | 7/2002 | Choukalos et al. ............. 716/1 |
| 6,429,882 | B1 | 8/2002 | Abdelnur et al. |
| 6,430,305 | B1 | 8/2002 | Decker |
| 6,433,645 | B1 | 8/2002 | Mann et al. |
| 6,434,187 | B1 | 8/2002 | Beard |
| 6,437,805 | B1 | 8/2002 | Sojoodi et al. |
| 6,438,565 | B1 | 8/2002 | Ammirato et al. |
| 6,438,735 | B1 | 8/2002 | McElvain et al. |
| 6,438,738 | B1 | 8/2002 | Elayda |
| 6,441,073 | B1 | 8/2002 | Tanaka et al. |
| 6,445,211 | B1 | 9/2002 | Saripella |
| 6,449,628 | B1 | 9/2002 | Wasson |
| 6,449,755 | B1 | 9/2002 | Beausang et al. |
| 6,452,437 | B1 | 9/2002 | Takeuchi et al. |
| 6,452,514 | B1 | 9/2002 | Philipp |
| 6,453,175 | B2 | 9/2002 | Mizell et al. |
| 6,453,461 | B1 | 9/2002 | Chaiken |
| 6,456,304 | B1 | 9/2002 | Angiulo et al. |
| 6,457,355 | B1 | 10/2002 | Philipp |
| 6,457,479 | B1 | 10/2002 | Zhuang et al. |
| 6,460,172 | B1 | 10/2002 | Insenser Farre et al. |
| 6,463,488 | B1 | 10/2002 | San Juan |
| 6,466,036 | B1 | 10/2002 | Philipp |
| 6,466,078 | B1 | 10/2002 | Stiff |
| 6,466,898 | B1 | 10/2002 | Chan |
| 6,473,069 | B1 | 10/2002 | Gerpheide |
| 6,477,691 | B1 * | 11/2002 | Bergamashi/Rab et al. .... 716/12 |
| 6,480,921 | B1 | 11/2002 | Mansoorian et al. |
| 6,483,343 | B1 | 11/2002 | Faith et al. |
| 6,487,700 | B1 | 11/2002 | Fukushima |
| 6,489,899 | B1 | 12/2002 | Ely et al. |
| 6,490,213 | B1 | 12/2002 | Mu et al. |
| 6,492,834 | B1 | 12/2002 | Lytle et al. |
| 6,498,720 | B2 | 12/2002 | Glad |
| 6,499,134 | B1 | 12/2002 | Buffet et al. |
| 6,499,359 | B1 | 12/2002 | Washeleski et al. |
| 6,504,403 | B2 | 1/2003 | Bangs et al. |
| 6,507,214 | B1 | 1/2003 | Snyder |
| 6,507,215 | B1 | 1/2003 | Piasecki et al. |
| 6,507,857 | B1 | 1/2003 | Yalcinalp |
| 6,509,758 | B2 | 1/2003 | Piasecki et al. |
| 6,512,395 | B1 | 1/2003 | Lacey et al. |
| 6,516,428 | B2 | 2/2003 | Wenzel et al. |
| 6,522,128 | B1 | 2/2003 | Ely et al. |
| 6,523,416 | B2 | 2/2003 | Takagi et al. |
| 6,525,593 | B1 | 2/2003 | Mar |
| 6,529,791 | B1 | 3/2003 | Takagi |
| 6,530,065 | B1 | 3/2003 | McDonald et al. |
| 6,534,970 | B1 | 3/2003 | Ely et al. |
| 6,535,200 | B2 | 3/2003 | Philipp |
| 6,535,946 | B1 | 3/2003 | Bryant et al. |
| 6,536,028 | B1 | 3/2003 | Katsioulas et al. |
| 6,539,534 | B1 | 3/2003 | Bennett |
| 6,542,025 | B1 | 4/2003 | Kutz et al. |
| 6,542,844 | B1 | 4/2003 | Hanna |
| 6,553,057 | B1 | 4/2003 | Sha |
| 6,554,469 | B1 | 4/2003 | Thomson et al. |
| 6,557,164 | B1 * | 4/2003 | Faustini ...................... 717/107 |
| 6,559,685 | B2 | 5/2003 | Green |
| 6,560,306 | B1 | 5/2003 | Duffy |
| 6,560,699 | B1 | 5/2003 | Konkle |
| 6,563,391 | B1 | 5/2003 | Mar |
| 6,564,179 | B1 | 5/2003 | Belhaj |
| 6,566,961 | B2 | 5/2003 | Dasgupta et al. |
| 6,567,426 | B1 | 5/2003 | van Hook et al. |
| 6,567,932 | B2 | 5/2003 | Edwards et al. |
| 6,570,557 | B1 | 5/2003 | Westerman et al. |
| 6,571,331 | B2 | 5/2003 | Henry et al. |
| 6,574,590 | B1 | 6/2003 | Kershaw et al. |
| 6,574,739 | B1 | 6/2003 | Kung et al. |
| 6,575,373 | B1 | 6/2003 | Nakano |
| 6,577,258 | B2 | 6/2003 | Ruha et al. |
| 6,580,329 | B2 | 6/2003 | Sander |
| 6,581,191 | B1 | 6/2003 | Schubert et al. |
| 6,587,093 | B1 | 7/2003 | Shaw et al. |
| 6,587,995 | B1 * | 7/2003 | Duboc et al. ................... 716/4 |
| 6,588,004 | B1 | 7/2003 | Southgate et al. |
| 6,590,422 | B1 | 7/2003 | Dillon |
| 6,590,517 | B1 | 7/2003 | Swanson |
| 6,591,369 | B1 | 7/2003 | Edwards et al. |
| 6,592,626 | B1 | 7/2003 | Bauchot et al. |
| 6,594,799 | B1 | 7/2003 | Robertson et al. |
| 6,597,212 | B1 | 7/2003 | Wang et al. |
| 6,597,824 | B2 | 7/2003 | Newberg et al. |
| 6,598,178 | B1 | 7/2003 | Lee et al. |
| 6,600,346 | B1 | 7/2003 | Macaluso |
| 6,600,351 | B2 | 7/2003 | Bisanti et al. |
| 6,600,575 | B1 | 7/2003 | Kohara |
| 6,601,189 | B1 | 7/2003 | Edwards et al. |
| 6,601,236 | B1 | 7/2003 | Curtis |
| 6,603,330 | B1 | 8/2003 | Snyder |
| 6,603,348 | B1 | 8/2003 | Preuss et al. |
| 6,604,179 | B2 | 8/2003 | Volk et al. |
| 6,606,731 | B1 | 8/2003 | Baum et al. |
| 6,608,472 | B1 | 8/2003 | Kutz et al. |
| 6,610,936 | B2 | 8/2003 | Gillespie et al. |
| 6,611,220 | B1 | 8/2003 | Snyder |
| 6,611,276 | B1 | 8/2003 | Muratori et al. |
| 6,611,856 | B1 | 8/2003 | Liao et al. |
| 6,611,952 | B1 | 8/2003 | Prakash et al. |
| 6,613,098 | B1 | 9/2003 | Sorge et al. |
| 6,614,260 | B1 | 9/2003 | Welch et al. |
| 6,614,320 | B1 | 9/2003 | Sullam et al. |
| 6,614,374 | B1 | 9/2003 | Gustavsson et al. |
| 6,614,458 | B1 | 9/2003 | Lambert et al. |
| 6,617,888 | B2 | 9/2003 | Volk |
| 6,618,854 | B1 | 9/2003 | Mann |
| 6,621,356 | B2 | 9/2003 | Gotz et al. |
| 6,624,640 | B2 | 9/2003 | Lund et al. |
| 6,625,765 | B1 | 9/2003 | Krishnan |
| 6,628,163 | B2 | 9/2003 | Dathe et al. |
| 6,631,508 | B1 | 10/2003 | Williams |
| 6,634,008 | B1 | 10/2003 | Dole |
| 6,636,096 | B2 | 10/2003 | Schaffer et al. |
| 6,637,015 | B1 | 10/2003 | Ogami et al. |
| 6,639,586 | B2 | 10/2003 | Gerpheide |
| 6,642,857 | B1 | 11/2003 | Schediwy et al. |
| 6,643,151 | B1 | 11/2003 | Nebrigic et al. |
| 6,643,810 | B2 | 11/2003 | Whetsel |
| 6,649,924 | B1 | 11/2003 | Philipp et al. |
| 6,650,581 | B2 | 11/2003 | Hong et al. |
| 6,658,498 | B1 | 12/2003 | Carney et al. |
| 6,658,633 | B2 | 12/2003 | Devins et al. |
| 6,661,288 | B2 | 12/2003 | Morgan et al. |
| 6,661,410 | B2 | 12/2003 | Casebolt et al. |
| 6,664,978 | B1 | 12/2003 | Kekic et al. |
| 6,664,991 | B1 | 12/2003 | Chew et al. |
| 6,667,642 | B1 | 12/2003 | Moyal |
| 6,667,740 | B2 | 12/2003 | Ely et al. |
| 6,670,852 | B1 | 12/2003 | Hauck |
| 6,673,308 | B2 | 1/2004 | Hino et al. |
| 6,677,814 | B2 | 1/2004 | Low et al. |
| 6,677,932 | B1 | 1/2004 | Westerman |
| 6,678,645 | B1 * | 1/2004 | Rajsuman et al. ............. 703/20 |
| 6,678,877 | B1 | 1/2004 | Perry et al. |
| 6,680,632 | B1 | 1/2004 | Meyers et al. |
| 6,680,731 | B2 | 1/2004 | Gerpheide et al. |
| 6,681,280 | B1 | 1/2004 | Miyake et al. |

| | | | | | | |
|---|---|---|---|---|---|---|
| 6,681,359 B1 | 1/2004 | Au et al. | | 6,836,169 B2 | 12/2004 | Richmond et al. |
| 6,683,462 B2 | 1/2004 | Shimizu | | 6,839,774 B1 | 1/2005 | Ahn et al. |
| 6,683,930 B1 | 1/2004 | Dalmia | | 6,842,710 B1 | 1/2005 | Gehring et al. |
| 6,686,787 B2 | 2/2004 | Ling | | 6,847,203 B1 | 1/2005 | Conti et al. |
| 6,686,860 B2 | 2/2004 | Gulati et al. | | 6,850,117 B2 | 2/2005 | Weber et al. |
| 6,690,224 B1 | 2/2004 | Moore | | 6,850,554 B1 | 2/2005 | Sha |
| 6,691,301 B2 | 2/2004 | Bowen | | 6,853,598 B2 | 2/2005 | Chevallier |
| 6,697,754 B1 | 2/2004 | Alexander | | 6,854,067 B1 | 2/2005 | Kutz et al. |
| 6,701,340 B1 | 3/2004 | Gorecki | | 6,856,433 B2 | 2/2005 | Hatano et al. |
| 6,701,487 B1 | 3/2004 | Ogami et al. | | 6,859,884 B1 | 2/2005 | Sullam |
| 6,701,508 B1 * | 3/2004 | Bartz et al. ................ 716/11 | | 6,862,240 B2 | 3/2005 | Burgan |
| 6,704,381 B1 | 3/2004 | Moyal et al. | | 6,864,710 B1 | 3/2005 | Lacey et al. |
| 6,704,879 B1 | 3/2004 | Parrish | | 6,865,429 B1 | 3/2005 | Schneider et al. |
| 6,704,889 B2 | 3/2004 | Veenstra et al. | | 6,865,504 B2 | 3/2005 | Larson et al. |
| 6,704,893 B1 | 3/2004 | Bauwens et al. | | 6,868,500 B1 | 3/2005 | Kutz et al. |
| 6,705,511 B1 | 3/2004 | Dames et al. | | 6,871,253 B2 | 3/2005 | Greeff et al. |
| 6,711,226 B1 | 3/2004 | Williams et al. | | 6,871,331 B1 | 3/2005 | Bloom et al. |
| 6,711,731 B2 | 3/2004 | Weiss | | 6,873,203 B1 | 3/2005 | Latham, II et al. |
| 6,713,897 B2 | 3/2004 | Caldwell | | 6,873,210 B2 | 3/2005 | Mulder et al. |
| 6,714,066 B2 | 3/2004 | Gorecki et al. | | 6,880,086 B2 | 4/2005 | Kidder et al. |
| 6,714,817 B2 | 3/2004 | Daynes et al. | | 6,888,453 B2 | 5/2005 | Lutz et al. |
| 6,715,132 B1 | 3/2004 | Bartz et al. | | 6,888,538 B2 | 5/2005 | Ely et al. |
| 6,717,474 B2 | 4/2004 | Chen et al. | | 6,892,310 B2 | 5/2005 | Kutz et al. |
| 6,718,294 B1 | 4/2004 | Bortfeld | | 6,892,322 B1 | 5/2005 | Snyder |
| 6,718,520 B1 | 4/2004 | Merryman et al. | | 6,893,724 B2 | 5/2005 | Lin et al. |
| 6,718,533 B1 | 4/2004 | Schneider et al. | | 6,894,928 B2 | 5/2005 | Owen |
| 6,724,220 B1 | 4/2004 | Snyder et al. | | 6,897,390 B2 | 5/2005 | Caldwell et al. |
| 6,728,900 B1 | 4/2004 | Meli | | 6,898,703 B1 | 5/2005 | Ogami et al. |
| 6,728,902 B2 | 4/2004 | Kaiser et al. | | 6,900,663 B1 | 5/2005 | Roper et al. |
| 6,730,863 B1 | 5/2004 | Gerpheide | | 6,901,563 B1 | 5/2005 | Ogami et al. |
| 6,731,552 B2 | 5/2004 | Perner | | 6,903,402 B2 | 6/2005 | Miyazawa |
| 6,732,068 B2 | 5/2004 | Sample et al. | | 6,903,613 B1 | 6/2005 | Mitchell et al. |
| 6,732,347 B1 | 5/2004 | Camilleri et al. | | 6,904,570 B2 | 6/2005 | Foote et al. |
| 6,738,858 B1 | 5/2004 | Fernald et al. | | 6,910,126 B1 | 6/2005 | Mar et al. |
| 6,744,323 B1 | 6/2004 | Moyal et al. | | 6,911,857 B1 | 6/2005 | Stiff |
| 6,748,569 B1 | 6/2004 | Brooke et al. | | 6,917,661 B1 | 7/2005 | Scott et al. |
| 6,750,852 B2 | 6/2004 | Gillespie | | 6,922,821 B1 | 7/2005 | Nemecek |
| 6,750,889 B1 | 6/2004 | Livingston | | 6,924,668 B2 | 8/2005 | Muller et al. |
| 6,754,765 B1 | 6/2004 | Chang et al. | | 6,934,674 B1 | 8/2005 | Douezy et al. |
| 6,754,849 B2 | 6/2004 | Tamura | | 6,937,075 B2 | 8/2005 | Lim et al. |
| 6,757,882 B2 | 6/2004 | Chen et al. | | 6,940,356 B2 | 9/2005 | McDonald et al. |
| 6,765,407 B1 | 7/2004 | Snyder | | 6,941,336 B1 | 9/2005 | Mar |
| 6,768,337 B2 | 7/2004 | Kohno et al. | | 6,944,018 B2 | 9/2005 | Caldwell |
| 6,768,352 B1 | 7/2004 | Maher et al. | | 6,949,811 B2 | 9/2005 | Miyazawa |
| 6,769,622 B1 | 8/2004 | Tournemille et al. | | 6,949,984 B2 | 9/2005 | Siniscalchi |
| 6,771,552 B2 | 8/2004 | Fujisawa | | 6,950,954 B1 | 9/2005 | Sullam et al. |
| 6,774,644 B2 | 8/2004 | Eberlein | | 6,950,990 B2 | 9/2005 | Rajarajan et al. |
| 6,781,456 B2 | 8/2004 | Pradhan | | 6,952,778 B1 | 10/2005 | Snyder |
| 6,782,068 B1 | 8/2004 | Wilson et al. | | 6,954,511 B2 | 10/2005 | Tachimori |
| 6,784,821 B1 | 8/2004 | Lee | | 6,954,904 B2 | 10/2005 | White |
| 6,785,881 B1 * | 8/2004 | Bartz et al. ............. 717/110 | | 6,956,419 B1 | 10/2005 | Mann et al. |
| 6,788,116 B2 | 9/2004 | Cook et al. | | 6,957,180 B1 | 10/2005 | Nemecek |
| 6,788,221 B1 | 9/2004 | Ely et al. | | 6,957,242 B1 | 10/2005 | Snyder |
| 6,788,521 B2 | 9/2004 | Nishi | | 6,963,233 B2 | 11/2005 | Puccio et al. |
| 6,791,377 B2 | 9/2004 | Ilchmann et al. | | 6,967,511 B1 | 11/2005 | Sullam |
| 6,792,584 B1 | 9/2004 | Eneboe et al. | | 6,967,960 B1 | 11/2005 | Bross et al. |
| 6,798,218 B2 | 9/2004 | Kasperkovitz | | 6,969,978 B1 | 11/2005 | Dening |
| 6,798,299 B1 | 9/2004 | Mar et al. | | 6,970,844 B1 * | 11/2005 | Bierenbaum ................ 705/39 |
| 6,799,198 B1 | 9/2004 | Huboi et al. | | 6,973,400 B2 | 12/2005 | Cahill-O'Brien et al. |
| 6,806,771 B1 | 10/2004 | Hildebrant et al. | | 6,975,123 B1 | 12/2005 | Malang et al. |
| 6,806,782 B2 | 10/2004 | Motoyoshi et al. | | 6,980,060 B2 | 12/2005 | Boerstler et al. |
| 6,809,275 B1 | 10/2004 | Cheng et al. | | 6,981,090 B1 | 12/2005 | Kutz et al. |
| 6,809,566 B1 | 10/2004 | Xin-LeBlanc | | 6,996,799 B1 | 2/2006 | Cismas et al. |
| 6,810,442 B1 | 10/2004 | Lin et al. | | 7,005,933 B1 | 2/2006 | Shutt |
| 6,815,979 B2 | 11/2004 | Ooshita | | 7,009,444 B1 | 3/2006 | Scott |
| 6,816,544 B1 | 11/2004 | Bailey et al. | | 7,015,735 B2 | 3/2006 | Kimura et al. |
| 6,819,142 B2 | 11/2004 | Viehmann et al. | | 7,017,145 B2 | 3/2006 | Taylor |
| 6,823,282 B1 | 11/2004 | Snyder | | 7,017,409 B2 | 3/2006 | Zielinski et al. |
| 6,823,497 B2 | 11/2004 | Schubert et al. | | 7,020,854 B2 | 3/2006 | Killian et al. |
| 6,825,689 B1 | 11/2004 | Snyder | | 7,023,215 B2 | 4/2006 | Seenwyk |
| 6,825,869 B2 | 11/2004 | Snyder | | 7,023,257 B1 | 4/2006 | Sullam |
| 6,828,824 B2 | 12/2004 | Betz et al. | | 7,024,636 B2 | 4/2006 | Weed |
| 6,829,727 B1 | 12/2004 | Pawloski | | 7,026,861 B2 | 4/2006 | Seenwyk |

| Patent | Type | Date | Inventor |
|---|---|---|---|
| 7,030,513 | B2 | 4/2006 | Caldwell |
| 7,030,656 | B2 | 4/2006 | Lo et al. |
| 7,030,688 | B2 | 4/2006 | Dosho et al. |
| 7,030,782 | B2 | 4/2006 | Ely et al. |
| 7,034,603 | B2 | 4/2006 | Brady et al. |
| 7,042,301 | B2 | 5/2006 | Sutardja |
| 7,047,166 | B2 | 5/2006 | Dancea |
| 7,055,035 | B2 | 5/2006 | Allison et al. |
| 7,058,921 | B1 | 6/2006 | Hwang et al. |
| 7,073,158 | B2 | 7/2006 | McCubbrey |
| 7,076,420 | B1 | 7/2006 | Snyder et al. |
| 7,086,014 | B1 | 8/2006 | Bartz et al. |
| 7,088,166 | B1 | 8/2006 | Reinschmidt et al. |
| 7,089,175 | B1 | 8/2006 | Nemecek et al. |
| 7,091,713 | B2 | 8/2006 | Erdelyi et al. |
| 7,092,980 | B2 | 8/2006 | Mar et al. |
| 7,098,414 | B2 | 8/2006 | Caldwell |
| 7,099,818 | B1 | 8/2006 | Nemecek |
| 7,103,108 | B1 | 9/2006 | Beard |
| 7,109,978 | B2 | 9/2006 | Gillespie et al. |
| 7,117,485 | B2 | 10/2006 | Wilkinson et al. |
| 7,119,550 | B2 | 10/2006 | Kitano et al. |
| 7,119,602 | B2 | 10/2006 | Davis |
| 7,124,376 | B2 * | 10/2006 | Zaidi et al. ............. 716/1 |
| 7,127,630 | B1 | 10/2006 | Snyder |
| 7,129,793 | B2 | 10/2006 | Gramegna |
| 7,129,873 | B2 | 10/2006 | Kawamura |
| 7,132,835 | B1 | 11/2006 | Arcus |
| 7,133,140 | B2 | 11/2006 | Lukacs et al. |
| 7,133,793 | B2 | 11/2006 | Ely et al. |
| 7,138,841 | B1 | 11/2006 | Li |
| 7,138,868 | B2 | 11/2006 | Sanchez et al. |
| 7,139,530 | B2 | 11/2006 | Kusbel |
| 7,141,968 | B2 | 11/2006 | Hibbs et al. |
| 7,141,987 | B2 | 11/2006 | Hibbs et al. |
| 7,149,316 | B1 | 12/2006 | Kutz et al. |
| 7,150,002 | B1 | 12/2006 | Anderson et al. |
| 7,151,528 | B2 | 12/2006 | Taylor et al. |
| 7,152,027 | B2 | 12/2006 | Andrade et al. |
| 7,154,294 | B2 | 12/2006 | Liu et al. |
| 7,161,936 | B1 | 1/2007 | Barrass et al. |
| 7,162,410 | B1 | 1/2007 | Nemecek et al. |
| 7,171,455 | B1 * | 1/2007 | Gupta et al. ............. 709/219 |
| 7,176,701 | B2 | 2/2007 | Wachi et al. |
| 7,180,342 | B1 | 2/2007 | Shutt et al. |
| 7,185,162 | B1 | 2/2007 | Snyder |
| 7,185,321 | B1 | 2/2007 | Roe et al. |
| 7,188,063 | B1 | 3/2007 | Snyder |
| 7,193,901 | B2 | 3/2007 | Ruby et al. |
| 7,200,507 | B2 | 4/2007 | Chen et al. |
| 7,206,733 | B1 | 4/2007 | Nemecek |
| 7,212,189 | B2 | 5/2007 | Shaw et al |
| 7,221,187 | B1 | 5/2007 | Snyder et al. |
| 7,227,389 | B2 | 6/2007 | Gong et al. |
| 7,236,921 | B1 | 6/2007 | Nemecek et al. |
| 7,250,825 | B2 | 7/2007 | Wilson et al. |
| 7,256,588 | B2 | 8/2007 | Howard et al. |
| 7,265,633 | B1 | 9/2007 | Stiff |
| 7,281,846 | B2 | 10/2007 | McLeod |
| 7,282,905 | B2 | 10/2007 | Chen et al. |
| 7,283,151 | B2 | 10/2007 | Nihei et al. |
| 7,288,977 | B2 | 10/2007 | Stanley |
| 7,295,049 | B1 | 11/2007 | Moyal et al. |
| 7,298,124 | B2 | 11/2007 | Kan et al. |
| 7,301,835 | B2 | 11/2007 | Joshi et al. |
| 7,307,485 | B1 | 12/2007 | Snyder et al. |
| 7,312,616 | B2 | 12/2007 | Snyder |
| 7,323,879 | B2 | 1/2008 | Kuo et al. |
| 7,342,405 | B2 | 3/2008 | Eldridge et al. |
| 7,358,714 | B2 | 4/2008 | Watanabe et al. |
| 7,367,017 | B2 | 4/2008 | Maddocks et al. |
| 7,376,001 | B2 | 5/2008 | Joshi et al. |
| 7,386,740 | B2 | 6/2008 | Kutz et al. |
| 7,400,183 | B1 | 7/2008 | Sivadasan et al. |
| 7,421,251 | B2 | 9/2008 | Westwick et al. |
| 7,466,307 | B2 | 12/2008 | Trent, Jr. et al. |
| 7,542,533 | B2 | 6/2009 | Jasa et al. |
| 7,554,847 | B2 | 6/2009 | Lee |
| 2001/0002129 | A1 | 5/2001 | Zimmerman et al. |
| 2001/0010083 | A1 | 7/2001 | Satoh |
| 2001/0038392 | A1 | 11/2001 | Humpleman et al. |
| 2001/0043081 | A1 | 11/2001 | Rees |
| 2001/0044927 | A1 | 11/2001 | Karniewicz |
| 2001/0045861 | A1 | 11/2001 | Bloodworth et al. |
| 2001/0047509 | A1 | 11/2001 | Mason et al. |
| 2002/0010716 | A1 | 1/2002 | McCartney et al. |
| 2002/0023110 | A1 | 2/2002 | Fortin et al. |
| 2002/0042696 | A1 | 4/2002 | Garcia et al. |
| 2002/0052729 | A1 | 5/2002 | Kyung et al. |
| 2002/0059543 | A1 | 5/2002 | Cheng et al. |
| 2002/0063688 | A1 | 5/2002 | Shaw et al. |
| 2002/0065646 | A1 | 5/2002 | Waldie et al. |
| 2002/0068989 | A1 | 6/2002 | Ebisawa et al. |
| 2002/0073119 | A1 | 6/2002 | Richard |
| 2002/0073380 | A1 | 6/2002 | Cooke |
| 2002/0080186 | A1 | 6/2002 | Frederiksen |
| 2002/0085020 | A1 | 7/2002 | Carroll, Jr. |
| 2002/0091739 | A1 | 7/2002 | Ferlitsch et al. |
| 2002/0109722 | A1 | 8/2002 | Rogers et al. |
| 2002/0116168 | A1 | 8/2002 | Kim |
| 2002/0121679 | A1 | 9/2002 | Bazarjani et al. |
| 2002/0122060 | A1 | 9/2002 | Markel |
| 2002/0129334 | A1 * | 9/2002 | Dane et al. ............. 717/123 |
| 2002/0133771 | A1 | 9/2002 | Barnett |
| 2002/0133794 | A1 | 9/2002 | Kanapathippillai et al. |
| 2002/0138516 | A1 | 9/2002 | Igra |
| 2002/0145433 | A1 | 10/2002 | Morrise et al. |
| 2002/0152234 | A1 | 10/2002 | Estrada et al. |
| 2002/0152449 | A1 | 10/2002 | Lin |
| 2002/0156885 | A1 | 10/2002 | Thakkar |
| 2002/0156929 | A1 | 10/2002 | Hekmatpour |
| 2002/0156998 | A1 | 10/2002 | Casselman |
| 2002/0161802 | A1 | 10/2002 | Gabrick et al. |
| 2002/0166100 | A1 | 11/2002 | Meding |
| 2002/0174134 | A1 | 11/2002 | Goykhman |
| 2002/0174411 | A1 | 11/2002 | Feng et al. |
| 2002/0188910 | A1 | 12/2002 | Zizzo |
| 2002/0191029 | A1 | 12/2002 | Gillespie et al. |
| 2003/0011639 | A1 | 1/2003 | Webb |
| 2003/0014447 | A1 | 1/2003 | White |
| 2003/0025734 | A1 | 2/2003 | Boose et al. |
| 2003/0041235 | A1 * | 2/2003 | Meyer ............. 716/3 |
| 2003/0056071 | A1 | 3/2003 | Triece et al. |
| 2003/0058469 | A1 | 3/2003 | Buis et al. |
| 2003/0061572 | A1 | 3/2003 | McClannahan et al. |
| 2003/0062889 | A1 | 4/2003 | Ely et al. |
| 2003/0080755 | A1 | 5/2003 | Kobayashi |
| 2003/0097640 | A1 | 5/2003 | Abrams et al. |
| 2003/0105620 | A1 | 6/2003 | Bowen |
| 2003/0126947 | A1 | 7/2003 | Margaria |
| 2003/0135842 | A1 | 7/2003 | Frey et al. |
| 2003/0149961 | A1 | 8/2003 | Kawai et al. |
| 2003/0154466 | A1 * | 8/2003 | Snider ............. 713/1 |
| 2003/0229482 | A1 * | 12/2003 | Cook et al. ............. 703/14 |
| 2003/0229877 | A1 | 12/2003 | Bersch et al. |
| 2004/0054821 | A1 | 3/2004 | Warren et al. |
| 2004/0153802 | A1 | 8/2004 | Kudo et al. |
| 2004/0205553 | A1 | 10/2004 | Hall et al. |
| 2004/0205617 | A1 | 10/2004 | Light |
| 2004/0205695 | A1 | 10/2004 | Fletcher |
| 2004/0221238 | A1 | 11/2004 | Cifra et al. |
| 2005/0024341 | A1 | 2/2005 | Gillespie et al. |
| 2005/0143968 | A9 | 6/2005 | Odom et al. |
| 2005/0240917 | A1 | 10/2005 | Wu |
| 2005/0248534 | A1 | 11/2005 | Kehlstadt |
| 2005/0280453 | A1 | 12/2005 | Hsieh |

| | | | |
|---|---|---|---|
| 2006/0032680 | A1 | 2/2006 | Elias et al. |
| 2006/0097991 | A1 | 5/2006 | Hotelling et al. |
| 2006/0273804 | A1 | 12/2006 | Delorme et al. |
| 2007/0139074 | A1 | 6/2007 | Reblewski |
| 2008/0095213 | A1 | 4/2008 | Lin et al. |
| 2008/0186052 | A1 | 8/2008 | Needham et al. |
| 2008/0259998 | A1 | 10/2008 | Venkataraman et al. |

FOREIGN PATENT DOCUMENTS

| | | |
|---|---|---|
| EP | 0308583A2 A1 | 3/1989 |
| EP | 368398 A1 | 5/1990 |
| EP | 0450863A2 A1 | 10/1991 |
| EP | 0499383A2 A1 | 8/1992 |
| EP | 0639816A2 A1 | 2/1995 |
| EP | 1170671A1 A1 | 1/2002 |
| EP | 1205848 A1 | 5/2002 |
| EP | 1191423A2 A1 | 2/2003 |
| JP | 404083405 A1 | 3/1992 |
| JP | 405055842 A1 | 3/1993 |
| JP | 06021732 A1 | 1/1994 |
| JP | 404095408 A1 | 3/2002 |
| WO | 9532478 A1 | 11/1995 |
| WO | PCT/US96/17305 A1 | 6/1996 |
| WO | PCT/US98/34376 A1 | 8/1998 |
| WO | PCT/US99/09712 A1 | 2/1999 |

OTHER PUBLICATIONS

Bellows; Hutching "JHDL—An HDL for Reconfigurable Systems", 1998, IEEE, Symposium on FGPAs for Custom Computing Machines, pp. 175-185.*

USPTO Non-Final Rejection for U.S. Appl. No. 10/001,477 dated May 11, 2005; 10 pages.

USPTO Final Rejection for U.S. Appl. No. 10/001,477 dated Oct. 24, 2005; 13 pages.

USPTO Non-Final Rejection for U.S. Appl. No. 10/001,477 dated Mar. 2, 2006; 14 pages.

USPTO Final Rejection for U.S. Appl. No. 10/001,477 dated Aug. 24, 2006; 13 pages.

USPTO Non-Final Rejection for U.S. Appl. No. 10/001,477 dated Jan. 22, 2007; 15 pages.

USPTO Final Rejection for U.S. Appl. No. 10/001,477 dated Jul. 23, 2007; 16 pages.

USPTO Non-Final Rejection for U.S. Appl. No. 10/001,477 dated Dec. 6, 2007; 13 pages.

USPTO Notice of Allowance for U.S. Appl. No. 10/033,027 dated Mar. 31, 2009; 7 pages.

USPTO Non-Final Rejection for U.S. Appl. No. 10/033,027 dated Dec. 18, 2008; 5 pages.

USPTO Final Rejection for U.S. Appl. No. 10/033,027 dated Jun. 8, 2007; 8 pages.

USPTO Non-Final Rejection for U.S. Appl. No. 10/033,027 dated Dec. 21, 2006; 31 pages.

USPTO Final Rejection for U.S. Appl. No. 10/033,027 dated Aug. 9, 2006; 6 pages.

USPTO Non-Final Rejection for U.S. Appl. No. 10/033,027 dated Apr. 26, 2006; 26 pages.

USPTO Final Rejection for U.S. Appl. No. 10/033,027 dated Oct. 31, 2005; 24 pages.

USPTO Non-Final Rejection for U.S. Appl. No. 10/033,027 dated Apr. 20, 2005; 20 pages.

USPTO Non-Final Rejection for U.S. Appl. No. 10/033,027 dated Oct. 18, 2004; 17 pages.

USPTO Non-Final Rejection for U.S. Appl. No. 10/001,478 dated Oct. 20, 2008; 18 pages.

USPTO Final Rejection for U.S. Appl. No. 10/001,478 dated Jun. 4, 2008; 18 pages.

USPTO Non-Final Rejection for U.S. Appl. No. 10/001,478 dated Jan. 30, 2008; 19 pages.

USPTO Final Rejection for U.S. Appl. No. 10/001,478 dated Sep. 17, 2007; 15 pages.

USPTO Non-Final Rejection for U.S. Appl. No. 10/001,478 dated Apr. 2, 2007; 17 pages.

USPTO Final Rejection for U.S. Appl. No. 10/001,478 dated Sep. 5, 2006; 19 pages.

USPTO Non-Final Rejection for U.S. Appl. No. 10/001,478 dated Mar. 15, 2006; 19 pages.

USPTO Final Rejection for U.S. Appl. No. 10/001,478 dated Oct. 24, 2005; 15 pages.

USPTO Non-Final Rejection for U.S. Appl. No. 10/001,478 dated May 16, 2005; 13 pages.

USPTO Notice of Allowance for U.S. Appl. No. 10/002,217 dated Jan. 28, 2009; 4 pages.

USPTO Notice of Allowance for U.S. Appl. No. 10/002,217 dated Oct. 14, 2008; 6 pages.

USPTO Notice of Allowance for U.S. Appl. No. 10/002,217 dated Jun. 6, 2008; 7 pages.

USPTO Final Rejection for U.S. Appl. No. 10/002,217 dated Feb. 6, 2008; 10 pages.

USPTO Non-Final Rejection for U.S. Appl. No. 10/002,217 dated Aug. 3, 2007; 10 pages.

USPTO Final Rejection for U.S. Appl. No. 10/002,217 dated Mar. 7, 2007; 12 pages.

USPTO Non-Final Rejection for U.S. Appl. No. 10/002,217 dated Oct. 2, 2006; 21 pages.

USPTO Non-Final Rejection for U.S. Appl. No. 10/002,217 dated Apr. 3, 2006; 12 pages.

USPTO Final Rejection for 10/002,217 dated Nov. 17, 2005; 17 pages.

USPTO Non-Final Rejection for U.S. Appl. No. 10/002,217 dated May 19, 2005; 15 pages.

USPTO Notice of Allowance for U.S. Appl. No. 10/001,477 dated Nov. 10, 2008; 7 pages.

USPTO Advisory Action for U.S. Appl. No. 10/001,477 dated Oct. 10, 2008; 3 pages.

USPTO Final Rejection for U.S. Appl. No. 10/001,477 dated Jun. 30, 2008; 15 pages.

USPTO Notice of Allowance for U.S. Appl. No. 09/992,076 dated Nov. 13, 2008; 15 pages.

USPTO Final Rejection for U.S. Appl. No. 09/994,601 dated May 18, 2007; 17 pages.

USPTO Notice of Allowance for U.S. Appl. No. 09/992,076 dated Nov. 29, 2007; 8 pages.

USPTO Final Rejection for U.S. Appl. No. 09/992,076 dated Jan. 30, 2007; 32 pages.

USPTO Non-Final Rejection for U.S. Appl. No. 09/992,076 dated Aug. 10, 2006; 19 pages.

USPTO Final Rejection for U.S. Appl. No. 09/992,076 dated Mar. 17, 2006; 16 pages.

USPTO Non-Final Rejection for U.S. Appl. No. 09/992,076 dated Nov. 21, 2005; 29 pages.

USPTO Non-Final Rejection for U.S. Appl. No. 09/992,076 dated Jun. 1, 2005; 20 pages.

USPTO Notice of Allowance for U.S. Appl. No. 09/994,600 dated Nov. 12, 2008; 35 pages.

USPTO Notice of Allowance for U.S. Appl. No. 09/994,600 dated May 14, 2008; 22 pages.

USPTO Final Rejection for U.S. Appl. No. 09/994,600 dated Oct. 17, 2007; 13 pages.

USPTO Non-Final Rejection for U.S. Appl. No. 09/994,600 dated May 15, 2007; 14 pages.

USPTO Final Rejection for U.S. Appl. No. 09/994,600 dated Dec. 8, 2006; 14 pages.

USPTO Non-Final Rejection for U.S. Appl. No. 09/994,600 dated Jul. 17, 2006; 14 pages.

USPTO Final Rejection for U.S. Appl. No. 09/994,600 dated Feb. 13, 2006; 13 pages.

USPTO Non-Final Rejection for U.S. Appl. No. 09/994,600 dated Aug. 23, 2005; 13 pages.

USPTO Final Rejection for U.S. Appl. No. 09/994,600 dated May 4, 2005; 16 pages.

USPTO Non-Final Rejection for U.S. Appl. No. 09/994,600 dated Oct. 21, 2004; 37 pages.

USPTO Notice of Allowance for U.S. Appl. No. 10/001,477 dated Nov. 10, 2008; 13 pages.

USPTO Final Rejection for U.S. Appl. No. 10/001,477 dated Jun. 30, 2008; 19 pages.
USPTO Non-Final Rejection for U.S. Appl. No. 10/001,477 dated Dec. 6, 2007; 17 pages.
USPTO Final Rejection for U.S. Appl. No. 10/001,477 dated Jul. 23, 2007; 19 pages.
USPTO Non-Final Rejection for U.S. Appl. No. 10/001,477 dated Jan. 22, 2007; 17 pages.
USPTO Final Rejection for U.S. Appl. No. 10/001,477 dated Aug. 24, 2006; 15 pages.
USPTO Non-Final Rejection for U.S. Appl. No. 10/001,477 dated Mar. 2, 2006; 17 pages.
USPTO Final Rejection for U.S. Appl. No. 10/001,477 dated Oct. 24, 2005; 18 pages.
USPTO Non-Final Rejection for U.S. Appl. No. 10/001,477 dated May 11, 2005; 31 pages.
Ito, Sergio Akira and Carro, Luigi; "A Comparison of Microcontrollers Targeted to FPGA-Based Embedded Applications", Sep. 2000, Proceedings of 13th Symposium on Integrated Circuits and Systems Design, Sep. 18-24, 2000; 6 pages.
Julio Faura et al.; "A Novel Mixed Signal Programmable Device With On-Chip Microprocessor", 1997, IEEE 1997 Custom Integrated Circuits Conference; 4 pages.
Monte Mar, Bert Sullam, Eric Blom; "An architecture for a configurable Mixed-signal device", 2003, IEEE Journal of Solid-State Circuits, vol. 3; 4 pages.
Robinson, Gordon D; "Why 1149.1 (JTAG) Really Works", May 1994, Conference Proceedings Electro/1994 International, May 10-12, 1994, Combined Volumes; 6 pages.
USPTO Non-Final Rejection for U.S. Appl. No. 09/994,601 dated Oct. 4, 2007; 20 pages.
"PSoC designer: Integrated development environment, getting started 25-minute tutorial, version 1.0", Cypress Microsystems., Cypress Microsystems, Inc. CMS10006A, Jul. 3, 2001; 25 pages.
"PSoC technology complete changes 8-bit MCU system design", Cypress Microsystems, Inc. retrieved from <http>://www.archive.org/web/20010219005250/http://cypressmicro.com- It...>, Feb. 19, 2001; 21 pages.
Specks et al., "A Mixed Digital-Analog 16B Microcontroller with 0.5MB Flash Memory, On-Chip Power Supply, Physical Nework Interface, and 40V I/O for Automotive Single-Chip Mechatronics," IEEE, Feb. 9, 2000; 1 page.
Hsieh et al., "Modeling Micro-Controller Peripherals for High-Level Co-Simulation and Synthesis," IEEE, 1997; 4 pages.
USPTO Notice of Allowance for U.S. Appl. No. 09/989,777 dated Nov. 4, 2008; 3 pages.
USPTO Notice of Allowance for U.S. Appl. No. 09/989,777 dated Sep. 15, 2008; 28 pages.
USPTO Notice of Allowance for U.S. Appl. No. 09/989,777 dated Jul. 7, 2008; 23 pages.
USPTO Final Rejection for U.S. Appl. No. 09/989,777 dated Jan. 30, 2008; 14 pages.
USPTO Non-Final Rejection for U.S. Appl. No. 09/989,777 dated Sep. 11, 2007; 18 pages.
USPTO Final Rejection for U.S. Appl. No. 09/989,777 dated Mar. 13, 2007; 24 pages.
USPTO Non-Final Rejection for U.S. Appl. No. 09/989,777 dated Sep. 13, 2006; 18 pages.
USPTO Non-Final Rejection for U.S. Appl. No. 09/989,777 dated Apr. 11, 2006; 21 pages.
USPTO Final Rejection for U.S. Appl. No. 09/989,777 dated Dec. 21, 2005; 29 pages.
USPTO Non-Final Rejection for U.S. Appl. No. 09/989,777 dated Jul. 5, 2005; 36 pages.
USPTO Notice of Allowance for U.S. Appl. No. 09/994,601 dated Dec. 22, 2008; 15 pages.
USPTO Final Rejection for U.S. Appl. No. 09/994,601 dated Apr. 17, 2008; 24 pages.
USPTO Non-Final Rejection for U.S. Appl. No. 09/975,115 dated Oct. 9, 2008; 34 pages.
USPTO Final Rejection for U.S. Appl. No. 09/975,115 dated May 12, 2008; 33 pages.
USPTO Non-Final Rejection for U.S. Appl. No. 09/975,115 dated Jan. 7, 2008; 30 pages.
USPTO Non-Final Rejection for U.S. Appl. No. 09/975,115 dated Jul. 31, 2007; 28 pages.
USPTO Final Rejection for U.S. Appl. No. 09/975,115 dated Feb. 21, 2007; 25 pages.
USPTO Non-Final Rejection for U.S. Appl. No. 09/975,115 dated Oct. 31, 2006; 19 pages.
USPTO Final Rejection for U.S. Appl. No. 09/975,115 dated Jun. 23, 2006; 20 pages.
USPTO Non-Final Rejection for U.S. Appl. No. 09/975,115 dated Jan. 11, 2006; 15 pages.
USPTO Non-Final Rejection for U.S. Appl. No. 09/975,115 dated Jul. 27, 2005; 11 pages.
USPTO Non-Final Rejection for U.S. Appl. No. 09/975,115 dated Feb. 11, 2005; 86 pages.
USPTO Final Rejection for U.S. Appl. No. 09/975,338 dated Jan. 31, 2008; 21 pages.
USPTO Non-Final Rejection for U.S. Appl. No. 09/975,338 dated Aug. 14, 2007; 19 pages.
USPTO Final Rejection for U.S. Appl. No. 09/975,338 dated Feb. 27, 2007; 23 pages.
USPTO Non-Final Rejection for U.S. Appl. No. 09/975,338 dated Sep. 6, 2006; 11 pages.
USPTO Advisory Action for U.S. Appl. No. 09/975,338 dated May 15, 2006; 4 pages.
USPTO Final Rejection for U.S. Appl. No. 09/975,338 dated Jan. 18, 2006; 12 pages.
USPTO Non-Final Rejection for U.S. Appl. No. 09/975,338 dated Apr. 5, 2005; 13 pages.
USPTO Final Rejection for U.S. Appl. No. 10/008,096 dated Feb. 10, 2005; 15 pages.
USPTO Final Rejection for U.S. Appl. No. 10/008,096 dated Jun. 16, 2008; 23 pages.
USPTO Final Rejection for U.S. Appl. No. 10/008,096 dated Sep. 4, 2007; 19 pages.
USPTO Final Rejection for U.S. Appl. No. 10/008,096 dated Oct. 13, 2006; 17 pages.
USPTO Final Rejection for U.S. Appl. No. 10/008,096 dated Nov. 25, 2005; 17 pages.
USPTO Non-Final Rejection for U.S. Appl. No. 10/008,096 dated Mar. 7, 2007; 19 pages.
USPTO Non-Final Rejection for U.S. Appl. No. 10/008,096 dated Apr. 17, 2006; 18 pages.
USPTO Non-Final Rejection for U.S. Appl. No. 10/008,096 dated Jun. 14, 2004; 24 pages.
USPTO Non-Final Rejection for U.S. Appl. No. 10/008,096 dated Jun. 24, 2005; 15 pages.
USPTO Non-Final Rejection for U.S. Appl. No. 10/008,096 dated Dec. 12, 2007; 14 pages.
USPTO Notice of Allowance for U.S. Appl. No. 10/008,096 dated Dec. 22, 2008; 24 pages.
USPTO Notice of Allowance for U.S. Appl. No. 09/975,105 dated Dec. 4, 2006; 4 pages.
USPTO Final Rejection for U.S. Appl. No. 09/975,105 dated Jul. 13, 2006; 7 pages.
USPTO Non-Final Rejection for U.S. Appl. No. 09/975,105 dated Jan. 19, 2006; 5 pages.
USPTO Non-Final Rejection for U.S. Appl. No. 09/975,105 dated Apr. 19, 2005; 9 pages.
From U.S. Appl. No. 10/033,027 : Goodenough, F. "Analog Counterparts of FPGAS Ease System Design" Electronic Design, Penton Publishing, Cleveland, OH, US vol. 42, No. 21, Oct. 14, 1994; 10 pages.
From U.S. Appl. No. 10/033,027 : Harbaum, T. et al. "Design of a Flexible Coprocessor Unit" Proceedings of the Euromicro Conference, XX XX, Sep. 1999; 10 pages.
From U.S. Appl. No. 10/033,027; : "Programmable Microcontroller (PSoC) Architecture (Mixed Analog/Digital)"; Aug. 7, 2001; U.S. Appl. No. 09/924,734 Snyder at al.; 28 pages.
From U.S. Appl. No. 10/033,027; : "Digital Configurable Macro Architecture"; Jul. 18, 2001; U.S. Appl. No. 09/909,045; Snyder; 37 pages.

From U.S. Appl. No. 10/033,027: "Configuring Digital Functions in a Digital Configurable Macro Architecture"; Jul. 18, 2001; U.S. Appl. No. 09/909,109; Snyder; 38 pages.

From U.S. Appl. No. 101033,027: "A Programmable Analog System Architecture (As Amended)"; Jul. 18, 2001; U.S. Appl. No. 09/909,047; Mar; 60 pages.

From U.S. Appl. No. 10/033,027: "Programmable Methodology and Architecture for a Programmable Analog System (As Amended)"; Aug. 14, 2001; U.S. Appl. No. 09/930,021; Mar et al.; 87 pages.

From U.S. Appl. No. 10/033,027: "Method for Synchronizing and Resetting Clock Signals Supplied to Multiple Programmable Analog Blocks (As Amended)"; Oct. 1, 2001; U.S. Appl. No. 09/969;311; Sullam; 57 pages.

From U.S. Appl. No. 10/033,027: "Method and Apparatus for Programming a Flash Memory"; Jun. 5, 2001; U.S. Appl. No. 09/875,599; Snyder; 23 pages.

From U.S. Appl. No. 10/033,027: "In-System Chip Emulator Architecture"; Oct. 10, 2001; U.S. Appl. No. 09/975,115; Snyder et al.; 38 pages.

From U.S. Appl. No. 10/033,027: "A Configurable InpuVOutput Interface for a Microcontroller"; Sep. 14, 2001; U.S. Appl. No. 09/953,423; Kutz et al.; 28 pages.

From U.S. Appl. No. 10/033,027: "Multiple Use of Microcontroller Pad"; Jun. 26, 2001; U.S. Appl. No. 09/893,050; Kutz et al.; 21 pages.

From U.S. Appl. No. 10/033,027: "Programming Architecture for a Programmable Analog System"; Aug. 14, 2001; U.S. Appl. No. 09/929,891; Mar et al.; 82 pages.

From U.S. Appl. No. 10/033,027: "Architecture for Synchronizing and Resetting Clock Signals Supplied to Multiple Analog Programmable Analog Blocks"; Oct. 1, 2001; U.S. Appl. No. 09/969,313; Sullam; 50 pages.

USPTO Non-Final Rejection for U.S. Appl. No. 09/994,601 dated Nov. 14, 2006; 15 pages.

USPTO Final Rejection for U.S. Appl. No. 09/994,601 dated Mar. 8, 2006; 14 pages.

USPTO Non-Final Rejection for U.S. Appl. No. 09/994,601 dated Sep. 21, 2005; 12 pages.

USPTO Final Rejection for U.S. Appl. No. 09/994,601 dated Mar. 24, 2005; 13 pages.

Hintz et al.; "Microcontrollers", 1992, McGraw-Hill; 11 pages.

Ganapathy, Gopi, and Narayan, Ram, and Jorden, Glen, and Fernandez, Denzil, and Wang, Ming, and Nishimura, Jim; "Hardware Emulation for Functional Verification of K5", Jun. 1996, 33rd Design Automation Conference Proceedings, Jun. 3-7, 1996; 4 pages.

Five unnumbered pages from the Provisional U.S. Appl. No. 60/243,708; 5 pages.

"Webster's Third New International Dictionary", 1996, G. & C. Merriam Company; 3 pages.

USPTO Advisory Action for U.S. Appl. No. 09/998,848 dated Sep. 7, 2005; 3 pages.

"Pod-Wikipedia, the free encyclopedia"; retrieved on Nov. 14, 2005 from http://en.wikipedia.org/wiki/Pod; 3 pages.

"pod-defintion by dict.die.net"; retrieved on Nov. 14, 2005 from http://dict.die.net/pod; 2 pages.

"In-Curcuit Emulators - descriptions of the major ICEs around"; retrieved on Nov. 14, 2005 from http://www.algonet.se/~staffann/developer/emulator.htm; 6 pages.

"Capturing Test/Emulation and Enabling Real-Time Debugging Using FPGA for In-Circuit Emulation;" Oct. 10,2001; U.S. Appl. No. 09/975,104; Snyder; 35 pages.

USPTO Non-Final Rejection for U.S. Appl. No. 09/989,767 dated Jul. 24, 2008; 21 pages.

Anonymous; "Using Debug"; 1999; Prentice-Hall Publishing; 20 pages.

Harrison et al.; "Xilinx FPGA Design in a Group Environment Using VHDS and Synthesis Tools"; Colloquium on Digital System Design Using Synthesis Techniques; Feb. 15, 1996; 4 pages.

Microsoft Press Computer User's Dictionary; 1998; 3 pages.

Sreerani Duvvuru and Siamak Arya, "Evaluation of a Branch Target Address Cache," 1995; IEEE; 8 pages.

Andrew S. Tanenbaum with contributions from James R. Goodman, "Structured Computer Organization," 1999, Prentice Hall, Fourth Edition; 32 pages.

"Method for Breaking Execution of a Test Code in DUT and Emulator Chip Essentially Simultaneously and Handling Complex Breakpoint Events;" Oct. 10, 2001; U.S. Appl. No. 09/975,338; Nemecek et al.; 34 pages.

"Emulator Chip-Board Architecture for Interface;" Oct. 10, 2001; U.S. Appl. No. 09/975,030; Snyder et al.; 37 pages.

Wikipedia - Main Page, retrieved on Mar. 8, 2006 from http://en.wikipedia.org/wiki/Main_Page and http://en.wikipedia.org/wiki/Wikipedia:Introduction; 5 pages.

Wikipedia - Processor register, retrieved on Mar. 7, 2006 from http://en.wikipedia.org/wiki/Processor_register, 4 pages.

Jonathan B. Rosenburg, "How Debuggers Work" John Wiley & Sons, Inc. 1996; 259 pages.

Dahl, et al.; "Emulation of the Sparde Microprocessor with the MIT Virtual Wires Emulation System"; 1994; IEEE; 9 pages.

Bauer at al.; "A Reconfigurable Logic Machine for Fast Event-Driven Simulation"; 1998; Design Automation Conference Proceedings; 8 pages.

"Host to FPGA Interface in an In-Circuit Emulation System;" Oct. 10, 2001; U.S. Appl. No. 09/975,105; Nemecek; 44 pages.

USPTO Advisory Action for U.S. Appl. No. 09/994,601 dated May 23, 2006; 3 pages.

USPTO Non-Final Rejection for U.S. Appl. No. 09/994,601 dated Jul 29, 2004; 10 pages.

USPTO Ex Parte Oualyle Action for U.S. Appl. No. 09/992,076 dated Jun. 18, 2007; 6 pages.

USPTO Non-Final Rejection for U.S. Appl. No. 09/992,076 dated Aug. 10, 2006; 19 pages.

USPTO Notice of Allowance for U.S. Appl. No. 09/992,076 dated Mar. 26, 2008; 23 pages.

USPTO Notice of Allowance for U.S. Appl. No. 09/992,076 dated Jul. 29, 2008; 6 pages.

USPTO Advisory Action for U.S. Appl. No. 09/989,778 dated May 15, 2006; 4 pages.

USPTO Final Rejection for U.S. Appl. No. 09/989,778 dated Jan. 8, 2009; 25 pages.

USPTO Final Rejection for U.S. Appl. No. 09/989,778 dated Feb. 5, 2007; 17 pages.

USPTO Final Rejection for U.S. Appl. No. 09/989,778 dated Feb. 15, 2006; 9 pages.

USPTO Final Rejection for U.S. Appl. No. 09/989,778 dated Dec. 20, 2007; 14 pages.

USPTO Non-Final Rejection for U.S. Appl. No. 09/989,778 dated Mar. 29, 2005; 14 pages.

USPTO Non-Final Rejection for U.S. Appl. No. 09/989,778 dated Jul. 14, 2008; 24 pages.

USPTO Non-Final Rejection for U.S. Appl. No. 09/989,778 dated Jul. 19, 2007; 18 pages.

USPTO Non-Final Rejection for U.S. Appl. No. 09/989,778 dated Sep. 1, 2005; 10 pages.

USPTO Non-Final Rejection for U.S. Appl. No. 09/989,778 dated Sep. 18, 2006; 11 pages.

USPTO Final Rejection for U.S. Appl. No. 09/998,848 dated Jun. 14, 2005; 17 pages.

USPTO Final Rejection for U.S. Appl. No. 09/998,848 dated Jul. 25, 2006; 16 pages.

USPTO Final Rejection for U.S. Appl. No. 09/998,848 dated Aug. 10, 2007; 14 pages.

USPTO Final Rejection for U.S. Appl. No. 09/998,848 dated Nov. 24, 2008; 15 pages.

USPTO Non-Final Rejection for U.S. Appl. No. 09/998,848 dated Jan. 26, 2006; 17 pages.

USPTO Non-Final Rejection for U.S. Appl. No. 09/998,848 dated Jan. 29, 2007; 13 pages.

USPTO Non-Final Rejection for U.S. Appl. No. 09/998,848 dated Feb. 22, 2008; 15 pages.

USPTO Non-Final Rejection for U.S. Appl. No. 09/998,848 dated Dec. 21, 2004; 14 pages.

USPTO Final Rejection for U.S. Appl. No. 09/989,767 dated Jan. 11, 2007; 12 pages.

USPTO Final Rejection for U.S. Appl. No. 09/989,767 dated Jan. 15, 2009; 21 pages.

USPTO Final Rejection for U.S. Appl. No. 09/989,767 dated Mar. 6, 2006; 15 pages.
USPTO Final Rejection for U.S. Appl. No. 09/989,767 dated Apr. 6, 2005; 13 pages.
USPTO Final Rejection for U.S. Appl. No. 09/989,767 dated Dec. 27, 2007; 21 pages.
USPTO Non-Final Rejection for U.S. Appl. No. 09/989,767 dated Jul. 17, 2006; 12 pages.
USPTO Non-Final Rejection for U.S. Appl. No. 09/989,767 dated Jul. 2, 2007; 22 pages.
Bursky, "FPGA Combines Multiple Interfaces and Logic," Electronic Design, vol. 48 No. 20, pp. 74-78 (Oct. 2, 2000); 5 pages.
Anonymous, "Warp Nine Engineering—The IEEE 1284 Experts-F/Port Product Sheet," undated web page found at http://wvvw.fapo.com/fport.htm; 2 pages.
Anonymous, "F/Port:Fast Parallel Port for the PC" Installation Manual Release 7.1, circa 1997, available for download from http://www.fapo.com/fport.htm; 25 pages.
Nam et al.; "Fast Development of Source-Level Debugging System Using Hardware Emulation"; IEEE 2000; 4 pages.
Huang et al.; "Iceberg: An Embedded In-Cicuit Emulator Synthesizer for Microcontrollers"; ACM 1999; 6 pages.
Khan et al.; "FPGA Architectures for Asic Hardware Emulators"; IEEE 1993; 5 pages.
Oh et al.; Emulator Environment Based on an FPGA Prototyping Board; IEEE 21-23; Jun. 2000; 6 pages.
Hong et al.; "An FPGA-Based Hardware Emulator for Fast Fault Emulation"; IEEE 1997; 4 pages.
Ching et al.; "An In-Curcuit-Emulator for TMS320C25"; IEEE 1994; 6 pages.
Pasternak; "In-Circuit-Emulation in ASIC Architecture Cor Designs"; IEEE 1989; 4 pages.
Melear; "Using Background Modes for Testing, Debugging and Emulation of Microcontrollers"; IEEE 1997; 8 pages.
Walters, Stephen; "Computer-Aided Prototyping for ASIC-Based Systems", 1991, IEEE Design & Test of Computers; vol. 8, Issue 2; 8 pages.
Anonymous; "JEEN JTAG Embedded Ice Ethernet Interface"; Aug. 1999; Embedded Performance, Inc.; 3 pages.
Sedory; "A Guide to Debug"; 2004; retrieved on May 20, 2005; 7 pages.
"Microsoft Files Summary Judgement Motions"; Feb. 1999; Microsoft PressPass; retrieved on May 20, 2005 from http://www.microsoft.com/presspass/press/1999/feb99/Feb99/Calderapr.asp; 3 pages.
Xerox; "Mesa Debugger Documentation"; Apr. 1979; Xerox Systems Development Department; Version 5.0; 33 pages.
Stallman et al.; "Debugging with the GNU Source-Level Debugger"; Jan. 1994; retrieved on May 2, 2005 from http://www.cs.utah.edu; 4 pages.
Wikipedia.org; "Von Neumann architecture"; retrieved from http://en.wikipedia.org/wikiNon_Neumann_architecture on Jan. 22, 2007; 4 pages.
Stan Augarten; "The Chip Collection - Introduction - Smithsonian Institute"; "State of the Art"; "The First 256-Bit Static RAM"; retrieved on Nov. 14, 2005 from http://smithsonianchips.si.edu/augarten/p24.htm; 2 pages.
"POD —Piece of Data, Plain Old Documentation, Plain Old Dos . . . "; retrieved on Nov. 14, 2005 from http://www.auditmypc.com/acronym/POD.asp; 2 pages.
USPTO Non-Final Rejection for U.S. Appl. No. 09/989,767 dated Oct. 6, 2004; 15 pages.
USPTO Final Rejection for U.S. Appl. No. 09/989,771 dated Feb. 27, 2007; 8 pages.
USPTO Final Rejection for U.S. Appl. No. 09/989,771 dated Mar. 28, 2006; 9 pages.
USPTO Final Rejection for U.S. Appl. No. 09/989,771 dated Apr. 6, 2005; 7 pages.
USPTO Final Rejection for U.S. Appl. No. 09/989,771 dated Dec. 10, 2008; 12 pages.
USPTO Final Rejection for U.S. Appl. No. 09/989,771 dated Dec. 27, 2007; 15 pages.
USPTO Non-Final Rejection for U.S. Appl. No. 09/989,771 dated May 28, 2008; 14 pages.
USPTO Non-Final Rejection for U.S. Appl. No. 09/989,771 dated Jul. 16, 2007; 14 pages.
USPTO Non-Final Rejection for U.S. Appl. No. 09/989,771 dated Aug. 23, 2006; 7 pages.
USPTO Non-Final Rejection for U.S. Appl. No. 09/989,771 dated Sep. 12, 2005; 7 pages.
USPTO Non-Final Rejection for U.S. Appl. No. 09/989,771 dated Sep. 22, 2004; 7 pages.
USPTO Final Rejection for U.S. Appl. No. 09/989,765 dated Apr. 3, 2007; 12 pages.
USPTO Final Rejection for U.S. Appl. No. 09/989,765 dated Apr. 4, 2008; 16 pages.
USPTO Final Rejection for U.S. Appl. No. 09/989,765 dated Apr. 17, 2006; 12 pages.
USPTO Non-Final Rejection for U.S. Appl. No. 09/989,765 dated Sep. 19, 2007; 14 pages.
USPTO Non-Final Rejection for U.S. Appl. No. 09/989,765 dated Sep. 26, 2008; 17 pages.
USPTO Non-Final Rejection for U.S. Appl. No. 09/989,765 dated Oct. 2, 2006; 13 pages.
USPTO Non-Final Rejection for U.S. Appl. No. 09/989,765 dated Oct. 5, 2005; 9 pages.
USPTO Final Rejection for U.S. Appl. No. 09/989,782 dated Jul. 9, 2008; 10 pages.
USPTO Final Rejection for U.S. Appl. No. 09/989,782 dated Jul. 24, 2007; 9 pages.
USPTO Final Rejection for U.S. Appl. No. 09/989,782 dated Sep. 21, 2006; 10 pages.
USPTO Final Rejection for U.S. Appl. No. 09/989,782 dated Nov. 3, 2005; 11 pages.
USPTO Non-Final Rejection for U.S. Appl. No. 09/989,782 dated Jan. 29, 2007; 9 pages.
USPTO Non-Final Rejection for U.S. Appl. No. 09/989,782 dated Mar. 28, 2006; 8 pages.
USPTO Non-Final Rejection for U.S. Appl. No. 09/989,782 dated Apr. 29, 2005; 11 pages.
USPTO Non-Final Rejection for U.S. Appl. No. 09/989,782 dated Oct. 6, 2004; 11 pages.
USPTO Non-Final Rejection for U.S. Appl. No. 09/989,782 dated Nov. 26, 2008; 10 pages.
USPTO Non-Final Rejection for U.S. Appl. No. 09/989,782 dated Dec. 14, 2007; 8 pages.
USPTO Final Rejection for U.S. Appl. No. 09/989,765 dated Mar. 31, 2009; 18 pages.
USPTO Final Rejection for U.S. Appl. No. 09/989,778 dated Mar. 16, 2009; 26 pages.
"An Analog PPL-Based Clock and Data Recovery Circuit with High Input Jitter Tolerance;" Sun, Reprinted from IEEE Journal of Solid-State Circuits, 1989; 4 pages.
"WP 3.5: An Integrated Time Reference;" Blauschild, Digest of Technical Papers, 1994; 4 pages.
"Micropower CMOS Temperature Sensor with Digital Output;" Bakker et al., IEEE Journal of Solid-State Circuits, 1996; 3 pages.
U.S. Appl. No. 09/964,991: "A Novel Band-Gap Circuit for Providing an Accurate Reference Voltage Compensated for Process State, Process Variations and Temperature," Kutz et al., filed on Sep. 26, 2001; 25 pages.
U.S. Appl. No. 09/842,966: "Precision Crystal Oscillator Circuit Used in Microcontroller," Monte Mar, filed on Apr. 25, 2001; 28 pages.
U.S. Appl. No. 09/943,062: "Apparatus and Method for Programmable Power Management in a Programmable Analog Circuit Block," Monte Mar, filed on Aug. 29, 2001; 46 pages.
USPTO Notice of Allowance for U.S. Appl. No. 10/324,455 dated Feb. 12, 2004; 4 pages.
USPTO Non-Final Rejection for U.S. Appl. No. 10/324,455 dated Nov. 6, 2003; 4 pages.
USPTO Non-Final Rejection for U.S. Appl. No. 10/324,455 dated Aug. 21, 2003; 4 pages.
USPTO Notice of Allowance for U.S. Appl. No. 09/998,859 dated Mar. 14, 2005; 6 pages.

USPTO Non-Final Rejection for U.S. Appl. No. 09/998,859 dated Nov. 4, 2004; 6 pages.
USPTO Final Rejection for U.S. Appl. No. 09/998,859 dated 11/1912003; 5 pages.
USPTO Non-Final Rejection for U.S. Appl. No. 09/998,859 dated May 28, 2003; 6 pages.
USPTO Non-Final Rejection for U.S. Appl. No. 09/998,859 dated May 15, 2003; 6 pages.
USPTO Notice of Allowance for U.S. Appl. No. 09/998,834 dated May 19, 2005; 7 pages.
USPTO Non-Final Rejection for U.S. Appl. No. 09/998,834 dated Sep. 20, 2004; 11 pages.
USPTO Notice of Allowance for U.S. Appl. No. 10/113,065 dated Apr. 6, 2006; 8 pages.
USPTO Final Rejection for U.S. Appl. No. 10/113,065 dated Oct. 26, 2005; 17 pages.
USPTO Non-Final Rejection for U.S. Appl. No. 10/113,065 dated May 20, 2005; 14 pages.
U.S. Appl. No. 09/207,912: "Circuit(s), Architecture and Method(s) for Operating and/or Tuning a Ring Oscillator," Monte Mar, filed on Dec. 9, 1998; 23 pages.
USPTO Notice of Allowance for U.S. Appl. No. 10/001,447 dated May 8, 2009; 6 pages.
The Provisional U.S. Appl. No. 60/243,708 "Advanced Programmable Microcontroller Device"; Oct. 26, 2000; 277 pages.
USPTO U.S. Appl. No. 09/957,084: "A Crystal-Less Oscillator with Trimmable Analog Current Control for Increased Stability," Mar et al., filed on Sep. 19, 2001; 28 pages.
USPTO U.S. Appl. No. 09/969,313: "Architecture for Synchronizing and Resetting Clock Signals Supplied to Multiple Analog Programmable Analog Blocks," Bert Sullam, filed on Oct. 1, 2001: 50 pages.
USPTO U.S. Appl. No. 09/972,319: "Method for Applying Instructions to Microprocessor in Test Mode," Warren Snyder, filed on Oct. 5, 2001; 31 pages.
USPTO U.S. Appl. No. 09/972,003: "Test Architecture for Microcontroller Providing for a Serial Communication Interface," Warren Snyder, filed on Oct. 5, 2001; 32 pages.
USPTO U.S. Appl. No. 09/972,133: "Method for Entering Circuit Test Mode," Warren Snyder, filed on Oct. 5, 2001; 30 pages.
USPTO U.S. Appl. No. 09/973,535: "Architecture for Decimation Algorithm," Warren Snyder, filed on Oct. 9, 2001; 26 pages.
USPTO U.S. Appl. No. 10/011,214: "Method and Circuit for Synchronizing a Write Operation between an On-Chip Microprocessor and an On-Chip Programmable Analog Device Operating at Different Frequencies," Sullam et al., filed on Oct. 25, 2001; 49 pages.
USPTO U.S. Appl. No. 09/935,454: "Method and Apparatus for Local and Global Power Management in a Programmable Analog Circuit," Monte Mar, filed on Aug. 22, 2001; 51 pages.
USPTO U.S. Appl. No. 09/923,46: "Non-Interfering Multiply-Mac (Multiply Accumulate) Circuit," Warren Snyder, filed on Aug. 6, 2001; 25 pages.
USPTO U.S. Appl. No. 09/922,579: "A Method for a Efficient Supply to a Microcontroller," Kutz et al., filed on Aug. 3, 2001; 37 pages.
USPTO U.S. Appl. No. 09/922,419: "A Power Supply Pump Circuit for a Microcontroller," Kutz et al., filed on Aug. 3, 2001; 38 pages.
USPTO U.S. Appl. No. 09/912,768: "A Microcontroller having a Dual Mode Relax Oscillator that is Trimmable," James Shutt; filed on Jul. 24, 2001; 33 pages.
USPTO U.S. Appl. No. 09/893,048: "A Microcontroller having an On-Chip High Gain Amplifier," Kutz et al., filed on Jun. 26, 2001; 22 pages.
USPTO U.S. Appl. No. 09/826,397: "Method and Circuit for Allowing a Microprocessor to Change its Operating Frequency on-the-Fly," Bert Sullam, filed on Apr. 2, 2001; 24 pages.
USPTO U.S. Appl. No. 09/887,955: "Novel Power on Reset Circuit for Microcontroller," Kutz et al., filed on Jun. 22, 2001; 42 pages.
USPTO U.S. Appl. No. 10/001,478: "In-Circuit Emulator and Pod Synchronized Boot," Nemecek et al., filed on Nov. 1, 2001; 44 pages.
USPTO U.S. Appl. No. 10/001,568: "Combined In-Circuit Emulator and Programmer," Nemecek et al., filed on Nov. 1, 2001; 47 pages.
USPTO U.S. Appl. No. 10/002,217: "Conditional Branching in an In-Circuit Emulation System," Craig Nemecek, filed on Nov. 1, 2001; 43 pages.

USPTO U.S. Appl. No. 10/004,039: "In-Circuit Emulator with Gatekeeper for Watchdog Timer," Nemecek et al., filed on Nov. 14, 2001; 46 pages.
USPTO U.S. Appl. No. 10/004,197; "In-Circuit Emulator with Gatekeeper Based Halt Control," Nemecek et al., filed on Nov. 14, 2001; 47 pages.
USPTO U.S. Appl. No. 10/001,477: "Breakpoint Control in an In-Circuit Emulation System," Roe et al., filed on Nov. 1, 2001; 43 pages.
USPTO U.S. Appl. No. 10/000,383: "System and Method of Providing a Programmable Clock Architecture for an Advanced Microcontroller," Sullam et al., filed on Oct. 24, 2001; 34 pages.
USPTO U.S. Appl. No. 09/887,923: "Novel Method and System for Interacting between a Processor and a Power on Reset to Dynamically Control Power States in a Microcontroller," Kutz et al., filed on Jun. 22, 2001; 44 pages.
USPTO U.S. Appl. No. 09/855,868: "Protecting Access to Microcontroller Memory Blocks," Warren Snyder, filed on May 14, 2001; 28 pages.
USPTO U.S. Appl. No. 11/125,554: "A Method for a Efficient Supply to a Microcontroller," Kutz et al., filed on May 9, 2005; 1 page.
USPTO U.S. Appl. No. 10/272,231: "Digital Configurable Macro Architecture," Warren Snyder, filed on Oct. 15, 2002; 36 pages.
USPTO U.S. Appl. No. 09/977,111: "A Frequency Doubler Circuit with Trimmable Current Control," Shutt et al., filed on Oct. 11, 2001; 35 pages.
USPTO U.S. Appl. No. 10/033,027: "Microcontrollable Programmable System on a Chip," Warren Snyder; filed on Oct. 22, 2001; 117 pages.
USPTO U.S. Appl. No. 10/803,030: "Programmable Microcontrollable Architecture (Mixed Analog/ Digital)," Snyder et al., filed on Mar. 16, 2004; 13 pages.
USPTO Notice of Allowance for U.S. Appl. No. 09/930,021 dated Nov. 26, 2004; 4 pages.
USPTO Final Rejection for U.S. Appl. No. 09/930,021 dated Aug. 31, 2004; 8 pages.
USPTO Non-Final Rejection for U.S. Appl. No. 09/930,021 dated Apr. 26, 2004; 6 pages.
USPTO Miscellaneous Action with SSP for U.S. Appl. No. 09/930,021 dated Oct. 1, 2001; 1 page.
USPTO Notice of Allowance for U.S. Appl. No. 09/953,423 dated Jul. 12, 2004; 6 pages.
USPTO Non-Final Rejection for U.S. Appl. No. 09/953,423 dated Feb. 6, 2004; 5 pages.
USPTO Notice of Allowance for U.S. Appl. No. 09/957,084 dated May 18, 2004; 5 pages.
USPTO Final Rejection for U.S. Appl. No. 09/957,084 dated Jan. 29, 2004; 8 pages.
USPTO Non-Final Rejection for U.S. Appl. No. 09/957,084 dated Aug. 27, 2003; 8 pages.
USPTO Final Rejection for U.S. Appl. No. 09/957,084 dated Apr. 23, 2003; 8 pages.
USPTO Non-Final Rejection for U.S. Appl. No. 09/957,084 dated Aug. 23, 2002; 6 pages.
USPTO Notice of Allowance for U.S. Appl. No. 09/969,313 dated Oct. 4, 2005; 6 pages.
USPTO Non-Final Rejection for U.S. Appl. No. 09/969,313 dated May 6, 2005; 9 pages.
USPTO Requirement for Restriction/Election for U.S. Appl. No. 09/969,313 dated Mar. 18, 2005; 6 pages.
USPTO Notice of Allowance for U.S. Appl. No. 09/969,311 dated Mar. 1, 2005; 4 pages.
USPTO Non-Final Rejection for U.S. Appl. No. 09/969,311 dated Sep. 21, 2004; 4 pages.
USPTO Advisory Action for U.S. Appl. No. 09/969,311 dated Jul. 21, 2003; 2 pages.
USPTO Final Rejection for U.S. Appl. No. 09/969,311 dated Apr. 7, 2003; 7 pages.
USPTO Non-Final Rejection for U.S. Appl. No. 09/969,311 dated Nov. 6, 2002; 8 pages.
USPTO Notice of Allowance for U.S. Appl. No. 09/972,319 dated Dec. 30, 2004; 4 pages.

USPTO Non-Final Rejection for U.S. Appl. No. 09/972,319 dated Sep. 16, 2004; 9 pages.
USPTO Notice of Allowance for U.S. Appl. No. 09/972,003 dated Jul. 14, 2004; 4 pages.
USPTO Requirement for Restriction/Election for U.S. Appl. No. 09/972,003 dated May 6, 2004; 4 pages.
USPTO Non-Final Rejection for U.S. Appl. No. 09/972,003 dated Feb. 2, 2004; 10 pages.
USPTO Non-Final Rejection for U.S. Appl. No. 09/972,003 dated Aug. 19, 2003; 11 pages.
USPTO Notice of Allowance for U.S. Appl. No. 09/972,133 dated Jun. 9, 2006; 6 pages.
USPTO Final Rejection for U.S. Appl. No. 09/972,133 dated Mar. 30, 2006; 8 pages.
USPTO Non-Final Rejection for U.S. Appl. No. 09/972,133 dated Nov. 25, 2005; 9 pages.
USPTO Advisory Action for U.S. Appl. No. 09/972,133 dated Aug. 31, 2005; 3 pages.
USPTO Final Rejection for U.S. Appl. No. 09/972,133 dated Jun. 29, 2005; 10 pages.
USPTO Non-Final Rejection for U.S. Appl. No. 09/972,133 dated Mar. 8, 2005; 9 pages.
USPTO Notice of Allowance for U.S. Appl. No. 09/975,104 dated Oct. 19, 2006; 6 pages.
USPTO Non-Final Rejection for U.S. Appl. No. 09/975,104 dated Jun. 16, 2006; 8 pages.
USPTO Final Rejection for U.S. Appl. No. 09/975,104 dated Feb. 15, 2006; 7 pages.
USPTO Non-Final Rejection for U.S. Appl. No. 09/975,104 dated Aug. 16, 2005; 6 pages.
USPTO Non-Final Rejection for U.S. Appl. No. 09/975,104 dated Mar. 21, 2005; 7 pages.
USPTO Notice of Allowance for U.S. Appl. No. 09/975,030 dated Feb. 6, 2006; 7 pages.
USPTO Non-Final Rejection for U.S. Appl. No. 09/975,030 dated Oct. 20, 2005; 7 pages.
USPTO Non-Final Rejection for U.S. Appl. No. 09/975,030 dated Mar. 29, 2005; 13 pages.
USPTO Notice of Allowance for U.S. Appl. No. 09/977,111 dated Sep. 28, 2006; 6 pages.
USPTO Notice of Allowance for U.S. Appl. No. 10/272,231 dated Mar. 8, 2004; 6 pages.
USPTO Final Rejection for U.S. Appl. No. 10/272,231 dated Nov. 5, 2003; 5 pages.
USPTO Non-Final Rejection for U.S. Appl. No. 10/272,231 dated Jul. 14, 2003; 6 pages.
USPTO Notice of Allowance for U.S. Appl. No. 11/125,554 dated Feb. 7, 2008; 4 pages.
USPTO Notice of Allowance for U.S. Appl. No. 11/125,554 dated Apr. 24, 2007; 7 pages.
USPTO Non-Final Rejection for U.S. Appl. No. 11/125,554 dated Dec. 11, 2006; 9 pages.
USPTO Notice of Allowance for U.S. Appl. No. 09/855,868 dated Apr. 25, 2005; 6 pages.
USPTO Non-Final Rejection for U.S. Appl. No. 09/855,868 dated Aug. 26, 2004; 7 pages.
USPTO Notice of Allowance for U.S. Appl. No. 09/887,923 dated Sep. 27, 2004; 5 pages.
USPTO Non-Final Rejection for U.S. Appl. No. 09/887,923 dated May 25, 2004; 7 pages.
USPTO Notice of Allowance for U.S. Appl. No. 09/875,599 dated Oct. 17, 2006; 4 pages.
USPTO Non-Final Rejection for U.S. Appl. No. 09/875,599 dated May 31, 2006; 18 pages.
USPTO Final Rejection for U.S. Appl. No. 09/875,599 dated Feb. 15, 2006; 18 pages.
USPTO Final Rejection for U.S. Appl. No. 09/875,599 dated Nov. 21, 2005; 16 pages.
USPTO Advisory Action for U.S. Appl. No. 09/875,599 dated Jun. 8, 2005; 3 pages.
USPTO Final Rejection for U.S. Appl. No. 09/875,599 dated Mar. 29, 2005; 20 pages.
USPTO Non-Final Rejection for U.S. Appl. No. 09/875,599 dated Dec. 3, 2004; 16 pages.
USPTO Final Rejection for U.S. Appl. No. 09/875,599 dated Aug. 25, 2004; 17 pages.
USPTO Final Rejection for U.S. Appl. No. 09/875,599 dated Apr. 26, 2004; 15 pages.
USPTO Non-Final Rejection for U.S. Appl. No. 09/875,599 dated Oct. 27, 2003; 13 pages.
USPTO Notice of Allowance for U.S. Appl. No. 10/004,197 dated Feb. 9, 2007; 7 pages.
USPTO Notice of Allowance for U.S. Appl. No. 10/004,197 dated Oct. 6, 2006; 7 pages.
USPTO Non-Final Rejection for U.S. Appl. No. 10/004,197 dated Apr. 3, 2006; 13 pages.
USPTO Final Rejection for U.S. Appl. No. 10/004,197 dated Nov. 23, 2005; 17 pages.
USPTO Non-Final Rejection for U.S. Appl. No. 10/004,197 dated Jun. 6, 2005; 21 pages.
USPTO Notice of Allowance for U.S. Appl. No. 10/004,039 dated Aug. 15, 2006; 7 pages.
USPTO Non-Final Rejection for U.S. Appl. No. 10/004,039 dated Apr. 11, 2006; 14 pages.
USPTO Final Rejection for U.S. Appl. No. 10/004,039 dated Nov. 22, 2005; 19 pages.
USPTO Non-Final Rejection for U.S. Appl. No. 10/004,039 dated Jun. 6, 2005; 17 pages.
USPTO Notice of Allowance for U.S. Appl. No. 10/001568 dated Mar. 17, 2006; 9 pages.
USPTO Final Rejection for U.S. Appl. No. 10/001,568 dated Oct. 26, 2005; 16 pages.
USPTO Non-Final Rejection for U.S. Appl. No. 10/001,568 dated May 19, 2005; 16 pages.
USPTO Notice of Allowance for U.S. Appl. No. 09/887,955 dated Oct. 12, 2004; 5 pages.
USPTO Non-Final Rejection for U.S. Appl. No. 09/887,955 dated May 26, 2004; 5 pages.
USPTO Notice of Allowance for U.S. Appl. No. 09/826,397 dated Oct. 7, 2004; 8 pages.
USPTO Non-Final Rejection for U.S. Appl. No. 09/826,397 dated Apr. 21, 2004; 6 pages.
USPTO Notice of Allowance for U.S. Appl. No. 09/893,048 dated Jul. 25, 2006; 4 pages.
USPTO Non-Final Rejection for U.S. Appl. No. 09/893,048 dated Jan. 12, 2006; 6 pages.
USPTO Non-Final Rejection for U.S. Appl. No. 09/893,048 dated Jul. 27, 2005; 6 pages.
USPTO Non-Final Rejection for U.S. Appl. No. 09/893,048 dated 10/0612004; 5 pages.
USPTO Notice of Allowance for U.S. Appl. No. 09/893,050 dated Jul. 5, 2005; 6 pages.
USPTO Non-Final Rejection for U.S. Appl. No. 09/893,050 dated Jan. 5, 2005; 13 pages.
USPTO Final Rejection for U.S. Appl. No. 09/893,050 dated Aug. 30, 2004; 13 pages.
USPTO Non-Final Rejection for U.S. Appl. No. 09/893,050 dated Jan. 15, 2004; 9 pages.
USPTO Notice of Allowance for U.S. Appl. No. 09/909,047 dated May 11, 2005; 25 pages.
USPTO Notice of Allowance for U.S. Appl. No. 09/909,047 dated Feb. 15, 2005; 6 pages.
USPTO Non-Final Rejection for U.S. Appl. No. 09/909,047 dated Jul. 6, 2004; 9 pages.
USPTO Notice of Allowance for U.S. Appl. No. 09/912,768 dated Sep. 13, 2005; 5 pages.
USPTO Non-Final Rejection for U.S. Appl. No. 09/912,768 dated Apr. 11, 2005; 14 pages.
USPTO Final Rejection for U.S. Appl. No. 09/912,768 dated Nov. 17, 2004; 13 pages.
USPTO Non-Final Rejection for U.S. Appl. No. 09/912,768 dated Jun. 22, 2004; 11 pages.
USPTO Notice of Allowance for U.S. Appl. No. 09/922,579 dated Dec. 28, 2004; 6 pages.

USPTO Non-Final Rejection for U.S. Appl. No. 09/922,579 dated Aug. 18, 2004; 6 pages.
USPTO Notice of Allowance for U.S. Appl. No. 09/923,461 dated May 12, 2005; 6 pages.
USPTO Non-Final Rejection for U.S. Appl. No. 09/923,461 dated Jul. 16, 2004; 6 pages.
USPTO Notice of Allowance for U.S. Appl. No. 09/929,891 dated Dec. 23, 2005; 4 pages.
USPTO Notice of Allowance for U.S. Appl. No. 09/929,891 dated Jun. 15, 2005; 6 pages.
USPTO Non-Final Rejection for U.S. Appl. No. 09/929,891 dated Sep. 13, 2004; 6 pages.
USPTO Notice of Allowance for U.S. Appl. No. 10/803,030 dated Jan. 8, 2007; 6 pages.
USPTO Non-Final Rejection for U.S. Appl. No. 10/803,030 dated Jun. 8, 2005; 4 pages.
USPTO Notice of Allowance for U.S. Appl. No. 10/011,214 dated Apr. 11, 2005; 4 pages.
USPTO Final Rejection for U.S. Appl. No. 10/011,214 dated Jan. 21, 2005; 8 pages.
USPTO Non-Final Rejection for U.S. Appl. No. 10/011,214 dated Aug. 13, 2004; 10 pages.
Hong et al., "Hierarchial System Test by an IEEE 1149.5 MTM-Bus Slave-Module Interface Core," IEEE, 2000; 14 pages.
Haberl et al., "Self Testable Boards with Standard IEEE 1149.5 Module Test and Maintenance (MTM) Bus Interface," IEEE, 1994; 6 pages.
Varma et al., "A Structured Test Re-Use Methodology for Core-Based System Chips," IEEE, 1998; 9 pages.
Andrews, "Roadmap for Extending IEEE 1149.1 for Hierarchical Control of Locally-Stored, Standardized command Set, Test Programs," IEEE, 1994; 7 pages.
Adham et al., "Preliminary Outline of the IEEE P1500 Scalable Architecture for Testing Embedded Cores," 1999, IEEE; 6 pages.
Ghosh et al., "A Low Overhead Design for Testability and Test Generation Technique for Core-based Systems," IEEE, 1997; 10 pages.
Zorian, "Test Requirements for Embedded Core-based Systems and IEEE P1500," IEEE, 1997; 9 pages.
Zorian et al., "Testing Embedded-Core Based System Chips," IEEE, 1998; 14 pages.
Papachristou et al., "Microprocessor Based Testing for Core-Based System on a Chip," IEEE, 1999; 6 pages.
Maroufi et al., "Solving the I/O Bandwidth Problem in System on a Chip Testing," IEEE, 2000; 6 pages.
Marsh, "Smart Tools Illuminate Deeply Embedded Systems," EDN, 2000; 7 pages.
York et al., "On-chip Support Needed for SOC Debug," Electronic Engineering Times, 1999; 2 pages.
Atmel Corporation: AT9OSC Summary: "Secure Microcontrollers for Smart Cards," 1999; 7 pages.
Hwang at al., "Integrated circuit for automatically varying resistance in computer system, has pair of transistors connected in parallel with respective resistors such that resistors are bypassed when corresponding transistors are enabled," Derwent information LTD; 2002; 2 pages.
Morrison, "IBM Eyes Merchant Packaging Services," Jul. 13, 1998; Electronic News <http://www.findarticles.com>; 4 pages.
Charles, Jr. et al., "Wirebonding: Reinventing the Process for MCMs," Apr. 1998; IEEE 7th International Conference on Multichip Modules and High Density Packaging; 3 pages.
Tran et al., "Fine Pitch and Wirebonding and Reliability of Aluminum Capped Copper Bond Pads," May 2000, IEEE Electronic Components and Technology Conference; 8 pages.
Song et al., "A 50% Power Reduction Scheme for CMOS Relaxation Oscillator," IEEE, 1999; 4 pages.
"Electronic Circuit Protector-Circuit Breaker;" IBM Technical Disclosure Bulletin; vol. 36, Issue 8, Aug. 1, 1993; 1 page.
USPTO Final Rejection for U.S. Appl. No. 10/001,478 dated Apr. 20, 2009; 16 pages.
USPTO Notice of Allowance for U.S. Appl. No. 09/994,600 dated Apr. 3, 2009; 5 pages.

USPTO Notice of Allowance for U.S. Appl. No. 09/989,777 dated Mar. 9, 2009; 7 pages.
USPTO Notice of Allowance for U.S. Appl. No. 09/992,076 dated Feb. 27, 2009; 6 pages.
USPTO Non-Final Rejection for U.S. Appl. No. 09/989,771 dated Apr. 30, 2009; 11 pages.
USPTO Notice of Allowance for U.S. Appl. No. 09/989,762 dated Mar. 25, 2009; 7 pages.
USPTO Notice of Allowance for U.S. Appl. No. 09/989,762 dated Oct. 24, 2008; 7 pages.
USPTO U.S. Appl. No. 09/989,815: "A Data Driven Method and System for Monitoring Hardware Resource Usage for Programming an Electric Device," Bartz et al., filed on Nov. 19, 2001; 36 pages.
USPTO Notice of Allowance for U.S. Appl. No. 09/989,762 dated Jun. 2, 2008; 6 pages.
USPTO Notice of Allowance for U.S. Appl. No. 09/989,762 dated Jan. 2, 2008; 6 pages.
USPTO Non-Final Rejection for U.S. Appl. No. 09/989,762 dated Jul. 23, 2007; 15 pages.
USPTO Final Rejection for U.S. Appl. No. 09/989,762 dated Jan. 26, 2007; 13 pages.
USPTO Non-Final Rejection for U.S. Appl. No. 09/989,762 dated Aug. 10, 2006; 18 pages.
USPTO Final Rejection for U.S. Appl. No. 09/989,762 dated Mar. 14, 2006; 19 pages.
USPTO Non-Final Rejection for U.S. Appl. No. 09/989,762 dated Jul. 27, 2005; 15 pages.
USPTO U.S. Appl. No. 09/275,336: "Programmable Oscillator Scheme," Mar et al., filed on Mar. 24, 1999; 25 pages.
USPTO U.S. Appl. No. 09/721,316: "Programmable Oscillator Scheme," Mar et al., filed on Nov. 22, 2000; 26 pages.
USPTO U.S. Appl. No. 10/324,455: "Programmable Oscillator Scheme," Mar et al., filed on Dec. 20, 2002; 23 pages.
USPTO U.S. Appl. No. 09/998,859: "A System and a Method for Checking Lock Step Consistency between in Circuit Emulation and a Microcontroller while Debugging Process is in Progress," Craig Nemecek, filed on Nov. 15, 2001; 33 pages.
USPTO U.S. Appl. No. 09/998,834: "A System and a Method for Communication between and ice and a Production Microcontroller while in a Halt State," Craig Nemecek, filed on Nov. 15, 2001; 33 pages.
USPTO U.S. Appl. No. 10/113,065: "System and Method for Automatically Matching Components in a Debugging System," Nemecek et al., filed on Mar. 29, 2002; 32 pages.
USPTO U.S. Appl. No. 09/989,574: "Method and System for using a Graphics user Interface for Programming an Electronic Device," Bartz at al., filed on Nov. 19, 2001; 43 pages.
USPTO U.S. Appl. No. 09/989,816: "Datasheet Browsing and Creation with Data-Driven Datasheet Tabs within a Microcontroller Design Tool," Bartz et al., filed on Nov. 19, 2001; 55 pages.
"New Object Domain R3 Beta Now Available (Build 134)!" Mar. 13, 2001; <http://web.archive.org/web/200100331202605/www.objectdomain.com/domain30/index.html>; 2 pages.
"OMG XML Metadata Interchange (XMI) Specifications" 2000; 17 pages.
Electronic Tools Company; E-Studio User Manuel; 2000; retrieved from http://web.archive.org for site http://e-tools.com on Mar. 23, 2005; 77 pages.
Cover Pages Technology Reports; XML and Electronic Design Automation (EDA); Aug. 2000; retrieved from http://xml.coverpages.org on Mar. 23, 2005; 5 pages.
Microsoft Computer Dictionary "ActiveX", 2002; Microsoft Press; 5th Edition; 3 pages.
Wikipedia "XML" retrieved on Jan. 29, 2007 from http://en.wikipedia.org/wiki/XML; 16 pages.
"VHDL Samples" retrieved on Jan. 29, 2007 from http://www.csee.umbc.edu/help/VHDL/samples/samples.shtml; 10 pages.
Anonymous, "Lotus Notes FAQ —How do you generate unique document numbers?" Sep. 19, 1999; retrieved from www.keysolutions.com on Jul. 9, 2008; 1 page.
Ashok Bindra, "Programmable SoC Delivers A New Level of System Flexibility"; Electronic Design; Nov. 6, 2000; 11 pages.

Cypress MicroSystem, Inc. "Cypress Customer Forums" retrieved from <http://www.cypress.com/forums/messageview>; Nov. 30, 2004; 1 page.

Cypress MicroSystem, Inc. "PsoC Designer: Integrated Development Environment User Guide"; Rev. 1.18; Sep. 8, 2003; 193 pages.

Hamblen, "Rapid Prototyping Using Field-Programmable Logic Devices" Jun. 2000, IEEE; 9 pages.

USPTO Final Rejection for U.S. Appl. No. 09/943,062 dated Apr. 30, 2004; 9 pages.

Snyder et al., "Xilinx's A-to-Z Systems Platform" Cahners Microprocessor, The Insider's Guide to Microprocessor Hardware, Feb. 6, 2001; 6 pages.

"PSoC Technology Completely Changes 8-bit MCU System Design" Cypress MicroSystem, Inc. Feb. 19, 2001; 21 pages.

USPTO Non-Final Rejection for U.S. Appl. No. 09/943,062 dated Dec. 8, 2003; 9 pages.

USPTO Advisory Action for U.S. Appl. No. 09/943,062 dated Sep. 25, 2003; 3 pages.

USPTO Final Rejection for U.S. Appl. No. 09/943,062 dated Jun. 27, 2003; 8 pages.

USPTO Non-Final Rejection for U.S. Appl. No. 09/943,062 dated Jan. 27, 2003; 7 pages.

USPTO Non-Final Rejection for U.S. Appl. No. 09/943,062 dated Sep. 11, 2002; 9 pages.

"PSoC Designer: Integrated Development Environment" User Guide; Revision 1.11; Last Revised Jul. 17, 2001; 109 pages.

Cypress Microsystems, "Cypress Microsystems Unveils Programmable System-on-a-Chip for Embedded Internet, Communications and Consumer Systems;" 2000, <http://www.cypressmicro.com/corporate/CYAnnounces_nov_13_2000.html; 3 pages.

Huang et al., ICEBERG, An Embedded In-Circuit Emulator Synthesizer for Microcontrollers, Proceedings of the 36th Design Automation Conference 1999; 6 pages.

Yoo et al., "Fast Hardware-Software Co-verification by Optimistic Execution of Real Processor," Proceedings of Design, Automation and Test in Europe Conference and Exhibition 2000; 6 pages.

USPTO Advisory Action for U.S. Appl. No. 09/943,062 dated Mar. 27, 2008; 3 pages.

USPTO Final Rejection for U.S. Appl. No. 09/943,062 dated Jan. 18, 2008; 8 pages.

USPTO Non-Final Rejection for U.S. Appl. No. 09/943,062 dated Jun. 22, 2007; 12 pages.

USPTO Miscellaneous Action for U.S. Appl. No. 09/943,062 dated Jan. 30, 2006; 2 pages.

USPTO Notice of Allowance for U.S. Appl. No. 10/113,064 dated Sep. 21, 2006; 7 pages.

USPTO Non-Final Rejection for U.S. Appl. No. 10/113,064 dated Apr. 6, 2006; 19 pages.

USPTO Final Rejection for U.S. Appl. No. 10/113,064 dated Oct. 18, 2005; 22 pages.

USPTO Non-Final Rejection for U.S. Appl. No. 10/113,064 dated Apr. 25, 2005; 15 pages.

USPTO U.S. Appl. No. 10/113,064: "Method and System for Debugging through Supervisory Operating Codes and Self Modifying Codes," Roe et al., filed on Mar. 29, 2002; 36 pages.

U.S. Appl. No. 10/002,726: "Method and Apparatus for Generating Microcontroller Configuration Information," Ogami et al., filed on Oct. 24, 2001; 54 pages.

USPTO Notice of Allowance for U.S. Appl. No. 10/002,726 dated Feb. 6, 2007; 7 pages.

USPTO Non-Final Rejection for U.S. Appl. No. 10/002,726 dated Aug. 28, 2006; 10 pages.

USPTO Final Rejection for U.S. Appl. No. 10/002,726 dated Mar. 27, 2006; 8 pages.

USPTO Final Rejection for U.S. Appl. No. 10/002,726 dated Nov. 30, 2005; 10 pages.

USPTO Non-Final Rejection for U.S. Appl. No. 10/002,726 dated Jun. 10, 2005; 10 pages.

USPTO Non-Final Rejection for Application No. 10/002,726 dated Dec. 13, 2004; 7 pages.

U.S. Appl. No. 11/818,005: "Techniques for Generating Microcontroller Configuration Information," Ogami et al., filed on Jun. 12, 2007; 61 pages.

USPTO Requirement for Restriction/Electrion for U.S. Appl. No. 11/818,005 dated Jul. 14, 2009; 5 pages.

USPTO U.S. Appl. No. 11/850,260: "Circuit and Method for Improving the Accuracy of a Crystal-less Oscillator Having Dual-Frequency Modes," Wright et al., filed on Sep. 5, 2007; 33 pages.

USPTO Non-Final Rejection for U.S. Appl. No. 11/850,260 dated Mar. 6, 2009; 7 pages.

USPTO Non-Final Rejection for U.S. Appl. No. 11/644,100 dated Mar. 9, 2009; 11 pages.

USPTO Advisory Action for U.S. Appl. No. 11/644,100 dated Feb. 9, 2009; 3 pages.

USPTO Final Rejection for U.S. Appl. No. 11/644,100 dated Nov. 18, 2008; 12 pages.

USPTO Non-Final Rejection for U.S. Appl. No. 11/644,100 dated Apr. 14, 2008; 10 pages.

USPTO Notice of Allowance for U.S. Appl. No. 11/415,588 dated Mar. 11, 2008; 6 pages.

USPTO Advisory Action for U.S. Appl. No. 11/415,588 dated Jan. 14, 2008; 3 pages.

USPTO Final Rejection for U.S. Appl. No. 11/415,588 dated Oct. 19, 2007; 8 pages.

USPTO Non-Final Rejection for U.S. Appl. No. 11/415,588 dated Jun. 13, 2007; 8 pages.

USPTO Notice of Allowance for U.S. Appl. No. 12/218,404 dated Mar. 19, 2009; 7 pages.

USPTO Non-Final Rejection for U.S. Appl. No. 12/218,404 dated Sep. 30, 2008; 8 pages.

USPTO U.S. Appl. No. 11/644,100: "Differential-to-single ended signal converter circuit and method," Jonathon Stiff, filed on Dec. 21, 2006; 33 pages.

USPTO U.S. Appl. No. 11/415,588: "Voltage Controlled Oscillator Delay Cell and Method," Sivadasan et al., filed on May 1, 2006; 24 pages.

USPTO U.S. Appl. No. 12/218,404: "Voltage Controlled Oscillator Delay Cell and Method," Sivadasan et al., filed on Jul. 14, 2008; 23 pages.

USPTO Notice of Allowance for U.S. Appl. No. 11/132,894 dated Apr. 26, 2007; 4 pages.

USPTO Non-Final Rejection for U.S. Appl. No. 11/132,894 dated Dec. 19, 2006; 12 pages.

USPTO U.S. Appl. No. 11/132,894: "Open Loop Bandwidth Test Architecture and Method for Phase Locked Loop (PLL)," Jonathon Stiff, filed on May 19, 2005; 38 pages.

USPTO Non-Final Rejection for U.S. Appl. No. 11/322,044 dated May 4, 2009; 18 pages.

USPTO Non-Final Rejection for U.S. Appl. No. 11/322,044 dated Nov. 25, 2008; 15 pages.

USPTO Non-Final Rejection for U.S. Appl. No. 11/322,044 dated Apr. 11, 2008; 11 pages.

USPTO Advisory Action for U.S. Appl. No. 11/322,044 dated Nov. 30, 2007; 2 pages.

USPTO Final Rejection for U.S. Appl. No. 11/322,044 dated Sep. 21, 2007; 14 pages.

USPTO Non-Final Rejection for U.S. Appl. No. 11/322,044 dated Apr. 24, 2007; 13 pages.

USPTO U.S. Appl. No. 11/322,044: "Split charge pump PLL architecture," Jonathon Stiff, filed on Dec. 28, 2005; 19 pages.

USPTO Notice of Allowance for U.S. Appl. No. 10/305,589 dated Feb. 4, 2005; 5 pages.

USPTO Final Rejection for U.S. Appl. No. 10/305,589 dated Oct. 21, 2004; 7 pages.

USPTO Non-Final Rejection for U.S. Appl. No. 10/305,589 dated Oct. 7, 2003; 6 pages.

USPTO U.S. Appl. No. 10/305,589: "Current Controlled Delay Circuit," Jonathon Stiff, filed on Nov. 26, 2002; 18 pages.

USPTO U.S. Appl. No. 09/849,164: "Reduced Static Phase Error CMOS PLL Charge Pump," Jonathon Stiff, filed on May 4, 2001; 30 pages.

Maneatis, "Low-Jitter Process-Independent DLL and PLL Based on Self-Biased Techniques," IEEE Journal of Solid-State Circuits, vol. 31, No. 11, Nov. 1996; 10 pages.

Larsson, "A 2-1600-MHz CMOS Clock Recovery PLL with Low-Vdd Capability," IEEE Journal of Solid-State Circuits, vol. 34, No. 12, Dec. 1999; 10 pages.

USPTO Notice of Allowance for U.S. Appl. No. 10/327,217 dated Aug. 12, 2004; 6 pages.

USPTO Non-Final Rejection for U.S. Appl. No. 10/327,217 dated Apr. 30, 2004; 5 pages.

USPTO Miscellaneous Action for U.S. Appl. No. 10/327,217 dated Feb. 10, 2004; 1 page.

USPTO U.S. Appl. No. 10/327,217: "Single Ended Clock Signal Generator Having a Differential Output," Richmond et al., filed on Dec. 20, 2002; 27 pages.

USPTO Notice of Allowance for U.S. Appl. No. 10/871,582 dated Mar. 30, 2006; 6 pages.

USPTO Final Rejection for U.S. Appl. No. 10/871,582 dated Feb. 1, 2006; 5 pages.

USPTO Non-Final Rejection for U.S. Appl. No. 10/871,582 dated Sep. 7, 2005; 7 pages.

USPTO U.S. Appl. No. 10/871,582: "LVDS Input Circuit with Extended Common Mode Range," Reinschmidt et al., filed on Jun. 17, 2004; 25 pages.

USPTO Notice of Allowance for U.S. Appl. No. 09/404,891 dated Mar. 4, 2005; 6 pages.

USPTO Final Rejection for U.S. Appl. No. 09/404,891 dated Dec. 8, 2004; 7 pages.

USPTO Non-Final Rejection for U.S. Appl. No. 09/404,891 dated Jun. 25, 2004; 6 pages.

USPTO Non-Final Rejection for U.S. Appl. No. 09/404,891 dated Jan. 5, 2004; 5 pages.

USPTO Non-Final Rejection for U.S. Appl. No. 09/404,891 dated Jul. 10, 2003; 6 pages.

USPTO Non-Final Rejection for U.S. Appl. No. 09/404,891 dated Mar. 5, 2003; 6 pages.

USPTO Non-Final Rejection for U.S. Appl. No. 09/404,891 dated Oct. 11, 2002; 5 pages.

USPTO U.S. Appl. No. 09/404,891: "Method, Architecture and Circuitry for Controlling Pulse Width in a Phase and/or Frequency Detector," Scott et al., filed on Sep. 24, 1999; 17 pages.

USPTO Notice of Allowance for U.S. Appl. No. 10/226,911 dated Aug. 20, 2004; 4 pages.

USPTO Non-Final Rejection for U.S. Appl. No. 10/226,911 dated Mar. 19, 2004; 6 pages.

USPTO U.S. Appl. No. 10/226,911: "Calibration of Integrated Circuit Time Constants," Gehring et al.; filed on Aug. 22, 2002; 32 pages.

USPTO Notice of Allowance for U.S. Appl. No. 09/943,149 dated Jan. 12, 2004; 7 pages.

USPTO Non-Final Rejection for U.S. Appl. No. 09/943,149 dated Aug. 28, 2003; 9 pages.

USPTO Final Rejection for U.S. Appl. No. 09/943,149 dated May 7, 2003; 10 pages.

USPTO Non-Final Rejection for U.S. Appl. No. 09/943,149 dated Nov. 20, 2002; 7 pages.

USPTO U.S. Appl. No. 09/943,149: "Method for Phase Locking in a Phase Lock Loop," Moyal et al., filed on Aug. 30, 2001; 21 pages.

Durham at al., "Integrated Continuous-Time Balanced Filters for 16-bit DSP Interfaces," IEEE, 1993; 6 pages.

Durham et al., "Circuit Architectures for High Linearity Monolithic Continuous-Time Filtering," IEEE, 1992; 7 pages.

Durham et al., "High-Linearity Conitnuous-Time Filter in 5-V VLSI CMOS," IEEE, 1992; 8 pages.

USPTO U.S. Appl. No. 09/047,595: "Roving Range Control to Limit Receive PLL Frequency of Operation," Paul H. Scott, filed on Mar. 29, 1998; 35 pages.

USPTO U.S. Appl. No. 09/216,460: "Circuit and Method for Controlling an Output of a Ring Oscillator," Abugharbieh et al., filed on Dec. 18, 1998; 21 pages.

USPTO U.S. Appl. No. 09/471,914: "Reference-Free Clock Generator and Data Recovery PLL," Dalmia et al., filed on Dec. 23, 1999; 32 pages.

USPTO U.S. Appl. No. 09/471,576: "Reference-Free Clock Generation and Data Recovery PLL," Kamal Dalmia, filed on Dec. 23, 1999; 30 pages.

USPTO U.S. Appl. No. 10/083442: "Method/Architecture for a Low Gain PLL with Wide Frequency Range," Meyers et al., filed on Feb. 26, 2002; 28 pages.

USPTO U.S. Appl. No. 09/470,665: "Digital Phase/Frequency Detector, and Clock Generator and Data Recovery PLL Containing the Same," Kamal Dalmia, filed on Dec. 23, 1999; 26 pages.

USPTO U.S. Appl. No. 09/893,161: "Architecture of a PLL with Dynamic Frequency Control on a PLD," Michael T. Moore, filed on Jun. 27, 2001; 32 pages.

USPTO U.S. Appl. No. 09/608,753: "PLL Lockout Watchdog," Wilson et al., filed on Aug. 24, 2004; 24 pages.

USPTO U.S. Appl. No. 09/398,956: "Frequency Acquisition Rate Control in Phase Lock Loop Circuits," Moyal et al., filed on Sep. 17, 1999; 35 pages.

USPTO U.S. Appl. No. 09/747,262: "Linearized Digital Phase-Locked Loop," Williams et al., filed on Dec. 22, 2000; 9 pages.

USPTO U.S. Appl. No. 09/981,448: "Oscillator Tuning Method," Lane T. Hauck, filed on Oct. 17, 2001; 28 pages.

USPTO U.S. Appl. No. 09/538,989: "Memory Based Phase Locked Loop," Rengarajan S. Krishnan, filed on Mar. 30, 2000; 27 pages.

USPTO U.S. Appl. No. 09/048,905: "Programmable Clock Generator," Mann et al., filed on Mar. 26, 1998; 42 pages.

USPTO U.S. Appl. No. 08/865,342: "Programmable Clock Generator," Mann et al., filed on May 29, 1997; 41 pages.

USPTO Notice of Allowance for U.S. Appl. No. 10/293,392 dated Mar. 10, 2004; 6 pages.

USPTO Non-Final Rejection for U.S. Appl. No. 10/293,392 dated Oct. 16, 2003; 6 pages.

USPTO U.S. Appl. No. 10/293,392: "Low Voltage Receiver Circuit and Method for Shifting the Differential Input Signals of the Receiver Depending on a Common Mode Voltage of the Input Signals," Maher et al., filed on Nov. 13, 2002; 20 pages.

USPTO Notice of Allowance for U.S. Appl. No. 10/288,003 dated Jan. 14, 2005; 6 pages.

USPTO Final Rejection for Application No. 10/288,003 dated Oct. 6, 2004; 6 pages.

USPTO Non-Final Rejection for U.S. Appl. No. 10/288,003 dated Apr. 7, 2004; 9 pages.

USPTO U.S. Appl. No. 10/288,003: "Low Voltage Differential Signal Driver Circuit and Method," Roper et al., filed on Nov. 4, 2002; 30 pages.

USPTO Notice of Allowance for U.S. Appl. No. 09/989,777 dated Mar. 9, 2009; 7 pages.

USPTO Advisory Action for U.S. Appl. No. 11/200,619 dated May 11, 2009; 3 pages.

USPTO Final Rejection for U.S. Appl. No. 11/200,619 dated Mar. 3, 2009; 14 pages.

USPTO Non-Final Rejection for U.S. Appl. No. 11/200,619 dated Aug. 27, 2005; 13 pages.

USPTO U.S. Appl. No. 11/200,619: "Providing hardware independence to automate code generation of processing device firmware," Snyder et al., filed on Aug. 10, 2005; 41 pages.

USPTO Notice of Allowance for U.S. Appl. No. 11/201,922 dated Apr. 9, 2009; 4 pages.

USPTO Non-Final Rejection for U.S. Appl. No. 11/201,922 dated Oct. 21, 2008; 12 pages.

USPTO Final Rejection for U.S. Appl. No. 11/201,922 dated Apr. 30, 2008; 10 pages.

USPTO Non-Final Rejection for U.S. Appl. No. 11/201,922 dated Oct. 15, 2007; 10 pages.

USPTO U.S. Appl. No. 111201,922: "Design model for a hardware device-independent method of defining embedded firmware for programmable systems," McDonald et al., filed on Aug. 10, 2005; 31 pages.

USPTO Non-Final Rejection for U.S. Appl. No. 11/201,627 dated Dec. 12, 2008; 17 pages.

USPTO Final Rejection for U.S. Appl. No. 11/201,627 dated Apr. 29, 2008; 21 pages.

USPTO Non-Final Rejection for U.S. Appl. No. 11/201,627 dated Nov. 16, 2007; 16 pages.

USPTO U.S. Appl. No. 11/201,627: "Method and an apparatus to design a processing system using a graphical user interface," Ogami et al., filed on Aug. 10, 2005; 37 pages.

USPTO Notice of Allowance for U.S. Appl. No. 09/989,808 dated Feb. 13, 2006; 4 pages.
USPTO Non-Final Rejection for U.S. Appl. No. 09/989,808 dated Oct. 19, 2005; 8 pages.
USPTO Non-Final Rejection for U.S. Appl. No. 09/989,808 dated Apr. 14, 2005; 8 pages.
USPTO U.S. Appl. No. 09/989,808: "Automatic generation of application program interfaces, source code, interrupts, and data sheets for microcontroller programming," Bartz et al., filed on Nov. 19, 2001; 67 pages.
USPTO Notice of Allowance for U.S. Appl. No. 10/109,979 dated Mar. 14, 2006; 6 pages.
USPTO Non-Final Rejection for U.S. Appl. No. 10/109,979 dated Jun. 30, 2005; 6 pages.
USPTO U.S. Appl. No. 10/109,979: "Graphical user interface with logic unifying functions," Anderson et al., filed on Mar. 29, 2002; 100 pages.
USPTO U.S. Appl. No. 09/989,781: "System and method for decoupling and iterating resources associated with a module," Ogami et al., filed on Nov. 19, 2001; 40 pages.
USPTO U.S. Appl. No. 09/989,775: "User defined names for registers in memory banks derived from configurations," Ogami et al., filed on Nov. 19, 2001; 29 pages.
USPTO Notice of Allowance for U.S. Appl. No. 09/989,819 dated Jan. 11, 2005; 7 pages.
USPTO Non-Final Rejection for U.S. Appl. No. 09/989,819 dated Jul. 13, 2004; 4 pages.
USPTO Miscellaneous Action for U.S. Appl. No. 09/989,819 dated Dec. 14, 2001; 1 page.
USPTO U.S. Appl. No. 09/989,819: "System and method for creating a boot file utilizing a boot template," Ogami et al., filed on Nov. 19, 2001; 43 pages.
USPTO Notice of Allowance for U.S. Appl. No. 09/989,761 dated Jan. 14, 2005; 6 pages.
USPTO Final Rejection for U.S. Appl. No. 09/989,761 dated Aug. 26, 2004; 7 pages.
USPTO Non-Final Rejection for U.S. Appl. No. 09/989,761 dated Mar. 10, 2004; 6 pages.
USPTO Final Rejection for U.S. Appl. No. 09/989,761 dated Oct. 3, 2003; 7 pages.
USPTO Non-Final Rejection for U.S. Appl. No. 09/989,761 dated Apr. 18, 2003; 5 pages.
USPTO U.S. Appl. No. 09/989,761: "Storing of global parameter defaults and using them over two or more design projects," Ogami et al., filed on Nov. 19, 2001; 37 pages.
Wang, et al. "Synthesizing Operating System Based Device Drivers in Embedded Systems," 2003, ACM; 8 pages.
Lutovac et al. "Symbolic Computation of Digital Filter Transfer Function Using Matlab," Proceedings of 23rd International Conference on Microelectronics (MIEL 2002), vol. 2 NIS, Yugoslavia; 4 pages.
Nouta et al. "Design and FPGA-Implementation of Wave Digital Bandpass Filters with Arbitrary Amplitude Transfer Characteristics," Proceedings of IEEE International Symposium on Industrial Electronics; 1998, vol, 2; 5 pages.
Xilinx, Virtex-II Pro Platform FPGA Developer's Kit, "How Data2BRAM Fits in with Hardware and Software Flows," Chapter 2: Using Data2BRAM; Jan. 2003 Release; 2 pages.
PCT Preliminary Report on Patentability (Chapter 1 of the Patent Cooperation Treaty), PCT/US2005/028793, filed Aug. 12, 2005, mailed Dec. 21, 2007; 2 pages.
PCT Written Opinion of the International Searching Authority for PCT/US2005/028793, filed Aug. 12, 2005, mailed Nov. 19, 2007; 7 pages.
PCT International Search Report of the International Searching Authority for PCT/US05/28793, filed Aug. 12, 2005, mailed Nov. 19, 2007; 5 pages.
International Search Report and Written Opinion of the International Searching Authority for PCT/US05/28898, filed Aug. 12, 2005, mailed Mar. 6, 2007; 6 pages.
Burogs et al., "Power Converter Analysis and Design using Matlab: A Transfer Function Approach," Proceedings of IEEE International Symposium on Industrial Electronics 1998, vol. 2; 6 pages.

Efstathiou, "Analog Electronics: Basic Circuits of Operational Amplifiers," <http://web.archive.org/web/20021231045232> Dec. 31, 2002, version, retrieved from the Internet Archives; 10 pages.
PCT International Search Report for PCT/US05/28791, filed Aug. 12, 2005, mailed Mar. 31, 2008; 4 pages.
PCT International Written Opinion for PCT/US05/28791, filed Aug. 12, 2005, mailed Mar. 31, 2008; 8 pages.
Kory Hopkins, "Definition;" Jan. 16, 1997; <http://www.cs.sfu.ca/cs/people/GradStudent.html>; 1 page.
Ebeling et al., "Validating VLSI Circuit Layout by Wirelist Comparison;" Sep. 1983; in proceedings of the IEEE International Conference on Computer Aided Design (ICCAD-83); 2 pages.
"The Gemini Netlist Comparison Project;" <http://www.cs.washington.edu/research/projects/lis/www/gemini/gemini.html> larry@cs.washington.edu: Mar. 19, 2002; 2 pages.
Ohlrich et al., "Sub-Gemini: Identifying Subcircuits using a Fast Subgraph Isomorphism Algorithm;" Jun. 1993; in proceedings of the 30th IEEE/ACM Design Automation Conference; 7 pages.
Ebling, "Gemini II: A Second Generation Layout Validation Program-," 1988; in proceedings of the IEEE International Conference on Computer Aided Design (ICCAD-88); 4 pages.
USPTO U.S. Appl. No. 12/132,527: "System and Method for Performing Next Placements and Pruning of Disallowed Placements for Programming an Integrated Circuit;" Ogami et al., filed on Jun. 3, 2008; 44 pages.
U.S. Appl. No. 12/356,468: "System and Method for Dynamically Generating a Configuration Datasheet," Anderson et al.; filed on Jan. 20, 2009; 27 pages.
Written Opinion of the International Search Authority for International Application No. PCT/US08/60680 dated Aug. 15, 2008; 4 pages.
USPTO Notice of Allowance for U.S. Appl. No. 09/475,879 dated Oct. 22, 2004; 7 pages.
USPTO Advisory Action for U.S. Appl. No. 09/475,879 dated Mar. 4, 2002; 3 pages.
USPTO Advisory Action for U.S. Appl. No. 09/475,879 dated Dec. 31, 2001; 3 pages.
USPTO Final Rejection for U.S. Appl. No. 09/475,879 dated Oct. 11, 2001; 10 pages.
USPTO Non-Final Rejection for U.S. Appl. No. 09/475,879 dated Mar. 8, 2001; 6 pages.
USPTO U.S. Appl. No. 09/475,879: "Programmable Logic Device," Lacey et al.; filed on Dec. 30, 1999; 50 pages.
USPTO U.S. Appl. No. 09/475,808: "Configurable Memory for Programmable Logic Circuits," Lacey et al., filed on Dec. 30, 1999; 24 pages.
USPTO Non-Final Rejection for U.S. Appl. No. 09/475,808 dated Jun. 6, 2001; 8 pages.
USPTO Notice of Allowance for U.S. Appl. No. 09/475,808 dated Nov. 6, 2001; 8 pages.
U.S. Appl. No. 10/137,497: "Reconfigurable Testing System and Method," Pleis et al.; flied on May 1, 2002; 40 pages.
USPTO Non-Final Rejection for U.S. Appl. No. 10/137,497 dated Nov. 52004; 17 pages.
USPTO Final Rejection for U.S. Appl. No. 10/137,497 dated May 5, 2005; 13 pages.
USPTO Non-Final Rejection for U.S. Appl. No. 10/137,497 dated Sep. 22, 2005; 21 pages.
USPTO Final Rejection for U.S. Appl. No. 10/137,497 dated Mar. 13, 2006; 15 pages.
USPTO Non-Final Rejection for U.S. Appl. No. 10/137,497 dated Aug. 2, 2006; 21 pages.
USPTO Notice of Allowance for U.S. Appl. No. 10/137,497 dated Jan. 24, 2007; 12 pages.
USPTO Notice of Allowance for U.S. Appl. No. 10/137,497 dated Jul. 20, 2007; 4 pages.
U.S. Appl. No. 10/653,050: "Method and System for Programming a Memory Device," Snyder et al.; filed on Aug. 29, 2003; 69 pages.
USPTO Non-Final Rejection for U.S. Appl. No. 10/653,050 dated Apr. 6, 2004; 7 pages.
USPTO Notice of Allowance for U.S. Appl. No. 10/653,050 dated Jul. 29, 2004; 3 pages.

U.S. Appl. No. 10/172,670: "Method and System for Programming a Memory Device," Snyder et al.; filed on Jun. 13, 2002; 66 pages.
U.S. Appl. No. 11/986,338: Reconfigurable Testing System and Method, Pleis et al., filed on Nov. 20, 2007; 41 pages.
USPTO Notice of Allowance for U.S Appl. No. 11/965,291 dated May 5, 2009; 7 pages.
USPTO Non-Final Rejection for U.S Appl. No. 11/965,291 dated Dec. 17, 2008; 8 pages.
U.S Appl. No. 11/965,291: "Universal Digital Block Interconnection and Channel Routing," Snyder et al., filed on Dec. 27, 2007; 31 pages.
USPTO Notice of Allowance for U.S Appl. No. 11/986,338 dated May 7, 2009; 1 page.
USPTO U.S. Appl. No. 11/273,708: "Capacitance Sensor Using Relaxation Oscillators," Snyder et al., filed on Nov. 14, 2005; 33 pages.
USPTO Non-Final Rejection for U.S. Appl. No. 11/273,708 dated Mar. 19, 2007; 16 pages.
USPTO Final Rejection for U.S. Appl. No. 11/273,708 dated Jul. 5, 2007; 8 pages.
USPTO Notice of Allowance for U.S. Appl. No. 11/273,708 dated Aug. 9, 2007; 4 pages.
USPTO U.S. Appl. No. 11/337,272: "Successive Approximate Capacitance Measurement Circuit;" Warren Snyder, filed on Jan. 20, 2006 29 pages.
USPTO Requirement for Restriction/Election for U.S. Appl. No. 11/337,272 dated Sep. 11, 2006; 5 pages.
USPTO Non-Final Rejection for U.S. Appl. No. 11/337,272 dated Oct. 24, 2006; 9 pages.
USPTO Final Rejection for U.S. Appl. No. 11/337,272 dated Feb. 2, 2007; 11 pages.
USPTO Advisory Action for U.S. Appl. No. 11/337,272 dated Apr. 3, 2007; 3 pages.
USPTO Non-Final Rejection for U.S. Appl. No. 11/337,272 dated May 17, 2007; 11 pages.
USPTO Notice of Allowance for U.S. Appl. No. 11/337,272 dated Aug. 15, 2007; 9 pages.
USPTO U.S. Appl. No. 11/983,291: "Successive Approximate Capacitance Measurement Circuit," Warren Snyder, filed on Nov. 7, 2007; 26 pages.
USPTO Non-Final Rejection for U.S. Appl. No. 11/983,291 dated Mar. 9, 2009; 9 pages.
USPTO U.S. Appl. No. 11/698,660: "Configurable Bus," Kutz et al,, filed on Jan. 25, 2007; 35 pages.
USPTO Non-Final Rejection for U.S. Appl. No. 11/698,660 dated Dec. 2, 2008; 12 pages.
USPTO Final Rejection for U.S. Appl. No. 11/698,660 dated May 28, 2009; 12 pages.
USPTO U.S. Appl. No. 11/709,866: "input/Output Multiplexer Bus," Dennis Sequine, filed on Feb. 21, 2007; 33 pages.
USPTO Non-Final Rejection for U.S. Appl. No. 11/709,866 dated Nov. 7, 2008; 14 pages.
USPTO Notice of Allowance for U.S. Appl. No. 11/709,866 dated Apr. 7, 2009; 8 pages.
Sedra et al., "Microelectronic Circuits," 3rd Edition, 1991, Oxford University Press; 20 pages.
Van Ess, David; "Simulating a 555 Timer with PSoC," Cypress Semiconductor Corporation, Application Note AN2286, May 19, 2005; 10 pages.
Cypress Semiconductor Corporation, "Fan Controller CG6457AM and CG6462AM," PSoC Mixed Signal Array Preliminary Data Sheet; May 24, 2005; 25 pages.
Cypress Semiconductor Corporation, "PSoC Mixed-Signal Controllers," Production Description; <http://www.cypress.com/portal/server>; retrieved on Sep. 27, 2005; 2 pages.
Cypress Semiconductor Corporation, "CY8C21x34 Data Sheet," CSR User Module, CSR V.1.0; Oct. 6, 2005; 36 pages.
Chapweske, Adam; "The PS/2 Mouse Interface," PS/2 Mouse Interlacing, 2001; 11 pages.
Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.

Seguine, Ryan; "Layout Guidelines for PSoC CapSense," Cypress Semiconductor Corporation, Application Note AN2292; Jul. 22, 2005; 13 pages.
Lee, Mark; "EMC Design Considerations for PSoC CapSense Applications," Cypress Semiconductor Corporation, Application Note AN2318; Sep. 16, 2005; 6 pages.
Cypress Semiconductor Corporation, "Release Notes srn017," Jan. 24, 2007; 3 pages.
Cypress Semiconductor Corporation, "PSoC CY8C20x34 Technical Reference Manual (TRM)," PSoC CY8C20x34 TRM, Version 1.0, 2006; 220 pages.
USPTO U.S. Appl. No. 11/166,622: "Touch wake for electronic devices," Beard et al., filed on Jun. 23, 2005; 22 pages.
International Written Opinion of the International Searching Authority for International Application No. PCT/US2006/09572 dated Jan. 10, 2008; 5 pages.
International Search Report for International Application No. PCT/US2006/09572 dated Jan. 10, 2008; 2 pages.
USPTO Notice of Allowance for U.S. Appl. No. 10/024,093 dated Sep. 10, 2002; 7 pages.
USPTO U.S. Appl. No. 10/024,093: "Configurable Memory for Programmable Logic Circuits," Lacey et al., filed on Dec. 18, 2001; 25 pages.
U.S. Appl. No. 11/088,028: "Method and Circuit for Rapid Alignment of Signals," Moyal et al., filed on Nov. 13, 2007; 34 pages.
USPT Notice of Allowance for U.S. Appl. No. 11/088,028 dated Jul. 2, 2007; 6 pages.
USPT Notice of Allowance for U.S. Appl. No. 11/088,028 dated Jan. 26, 2007; 6 pages.
USPT Non-Final Rejection for U.S. Appl. No. 11/088,028 dated Jun. 16, 2006; 8 pages.
U.S. Appl. No. 11/985,340: "Method and Circuit for Rapid Alignment of Signals," Moyal et al., filed on Nov. 13, 2007; 34 pages.
USPTO Notice of Allowance for U.S. Appl. No. 11/985,340 dated Jun. 2, 2009; 7 pages.
USPTO Requirement for Restriction for U.S. Appl. No. 11/985,340 dated Mar. 16, 2009; 7 pages.
USPTO Non-Final Rejection for U.S. Appl. No. 11/865,672 dated Jul. 17, 2009; 6 pages.
USPTO Non-Final Rejection for U.S. Appl. No. 11/859,547 dated Oct. 1, 2009; 9 pages.
USPTO Non-Final Rejection for U.S. Appl. No. 11/967,243 dated Sep. 17, 2009; 9 pages.
USPTO Non-Final Rejection for U.S. Appl. No. 11/967,240 dated Jun. 10, 2009; 7 pages.
USPTO Non-Final Rejection for U.S. Appl. No. 11/857,947 dated Mar. 30, 2009; 18 pages.
USPTO Non-Final Resection for U.S. Appl. No. 12/104,672 dated Aug. 26, 2009; 11 pages.
USPTO Non-Final Rejection for U.S. Appl. No. 12/060,128 dated Apr. 29, 2009; 11 pages.
International Search Report of the International Searching Authority for International Application No. PCT/US08/60695 dated Jul. 22, 2009; 3 pages.
Written Opinion of the International Searching Authority for International U.S. Appl. No. PCT/US08/60695 dated Jul. 22, 2009; 6 pages.
Azim et al., "A Custom DSP Chip to Implement a Robot Motion Controller Proceedings of the IEEE Custom Integrated Circuits Conference," May 1988, pp. 8.7.1-8.7.5; 6 pages.
Catthoor et al., "Architectural Strategies for an Application-Specific Synchronous Multiprocessor Environment," IEEE transactions on Acoustics, Speech, and Signal Processing; vol. 36, No. 2, Feb. 1988, pp. 265-284; 20 pages.
International Search Report of the International Searching Authority for International Application No. PCT/US08/60696 dated Sep. 22, 2008; 2 pages.
International Search Report of the International Searching Authority for International Application No. PCT/US08/60698 dated Sep. 5, 2008; 2 pages.
Shahbahrami at al., "Matrix Register File and Extended Subwords: Two Techniques for Embedded Media Processors," ACM, May 2005; 9 pages.

Jung et al., "A Register File with Transposed Access Mode," 2000, IEEE; 2 pages.

International Search Report of the International Searching Authority for International Application No. PCT/US08160681 dated Sep. 12, 2008; 2 pages.

Written Opinion of the International Searching Authority for International Application No. PCT/US08/60681 dated Sep. 12, 2008; 4 pages.

USPTO Final Rejection for U.S. Appl. No. 09/989,767 dated Dec. 7, 2009; 22 pages.

USPTO Notice of Allowance for U.S. Appl. No. 10/033,027 dated Sep. 2, 2009; 4 pages.

USPTO Non-Final Rejection for U.S. Appl. No. 10/001,478 dated Aug. 4, 2009; 17 pages.

USPTO Advisory Action for U.S. Appl. No. 10/001,478 dated Jun. 30, 2009; 3 pages.

USPTO Final Rejection for U.S. Appl. No. 10/001,478 dated Apr. 20, 2009; 16 pages.

USPTO Notice of Allowance for U.S. Appl. No. 10/002,217 dated Sep. 17, 2009; 6 pages.

USPTO Notice of Allowance for U.S. Appl. No. 10/002,217 dated Jun. 8, 2009; 8 pages.

USPTO Notice of Allowance for U.S. Appl. No. 10/001,477 dated Dec. 4, 2009; 7 pages.

USPTO Notice of Allowance for U.S. Appl. No. 10/001,477 dated Aug. 26, 2009; 6 pages.

USPTO Ex Parte Quayle Action for U.S. Appl. No. 09/975,115 dated Aug. 20, 2009; 7 pages.

USPTO Non-Final Rejection for U.S. Appl. No. 09/994,601 dated Jul. 9, 2009; 11 pages.

USPTO Non-Final Rejection for U.S. Appl. No. 11/818,005 dated Nov. 23, 2009; 8 pages.

USPTO Requirement for Restriction/Election for U.S. Appl. No. 11/818,005 dated Jul. 14, 2009; 5 pages.

USPTO Advisory Action for U.S. Appl. No. 09/989,778 dated Jun. 17, 2009; 3 pages.

USPTO Notice of Allowance for U.S. Appl. No. 09/994,600 dated Aug. 25, 2009; 4 pages.

USPTO Notice of Allowance for U.S. Appl. No. 09/994,600 dated Apr. 3, 2009; 5 pages.

USPTO Notice of Allowance for U.S. Appl. No. 09/989,762 dated Oct. 30, 2009; 6 pages.

USPTO Notice of Allowance for U.S. Appl. No. 09/989,762 dated Jul. 16, 2009; 6 pages.

USPTO Non-Final Rejection for U.S. Appl. No. 09/998,848 dated May 12, 2009; 16 pages.

USPTO Non-Final Rejection for U.S. Appl. No. 09/989,767 dated May 12, 2009; 21 pages.

USPTO Final Rejection for U.S. Appl. No. 09/989,771 dated Nov. 25, 2009; 12 pages.

USPTO Notice of Allowance for U.S. Appl. No. 09/989,765 dated Sep. 3, 2009; 7 pages.

USPTO Non-Final Rejection for U.S. Appl. No. 09/989,782 dated Oct. 27, 2009; 9 pages.

USPTO Final Rejection for U.S. Appl. No. 09/989,782 dated May 15, 2009; 10 pages.

USPTO Notice of Allowance for U.S. Appl. No. 11/986,338 dated Oct. 19, 2009; 4 pages.

USPTO Notice of Allowance for U.S. Appl. No. 09/989,777 dated Aug. 6, 2009; 8 pages.

USPTO Notice of Allowance for U.S. Appl. No. 10/008,096 dated Oct. 21, 2009; 6 pages.

USPTO Notice of Allowance for U.S. Appl. No. 10/008,096 dated Jun. 5, 2009; 12 pages.

USPTO Notice of Allowance for U.S. Appl. No. 11/985,340 dated Nov. 9, 2009; 7 pages.

USPTO Advisory Action for U.S. Appl. No. 11/201,627 dated Sep. 21, 2009; 3 pages.

USPTO Final Rejection for U.S. Appl. No. 11/201,627 dated Jul. 7, 2009; 19 pages.

USPTO Miscellaneous Action for U.S. Appl. No. 11/201,922 dated Oct. 1, 2009; 2 pages.

USPTO Non-Final Rejection for U.S. Appl. No. 11/200,619 dated Jun. 17, 2009; 12 pages.

USPTO Non-Final Rejection for U.S. Appl. No. 11/166,622 dated Sep. 29, 2009; 11 pages.

USPTO Advisory Action for U.S. Appl. No. 11/166,622 dated May 27, 2009; 3 pages.

USPTO Final Rejection for U.S. Appl. No. 11/166,622 dated Mar. 10, 2009; 11 pages.

USPTO Notice of Allowance for U.S. Appl. No. 12/218,404 dated Nov. 3, 2009; 8 pages.

USPTO Notice of Allowance for U.S. Appl. No. 12/218,404 dated Jul. 10, 2009; 7 pages.

USPTO Notice of Allowance for U.S. Appl. No. 11/709,866 dated Aug. 4, 2009; 7 pages.

USPTO Non-Final Rejection for U.S. Appl. No. 11/698,660 dated Oct. 7, 2009; 12 pages.

USPTO Advisory Action for U.S. Appl. No. 11/698,660 dated Jul. 31, 2009; 3 pages.

USPTO Notice of Allowance for U.S. Appl. No. 11/983,291 dated Oct. 22, 2009; 7 pages.

USPTO Final Rejection for U.S. Appl. No. 11/983,291 dated Aug. 12, 2009; 10 pages.

USPTO Final Rejection for U.S. Appl. No. 11/322,044 dated Oct. 19, 2009; 10 pages.

USPTO Final Rejection for U.S. Appl. No. 11/644,100 dated Aug. 19, 2009; 12 pages.

USPTO Advisory Action for U.S. Appl. No. 11/850,260 dated Nov. 2, 2009; 3 pages.

USPTO Final Rejection for U.S. Appl. No. 11/850,260 dated Aug. 21, 2009; 9 pages.

USPTO Final Rejection for U.S. Appl. No. 11/698,660 dated Feb. 16, 2010; 14 pages.

USPTO Notice of Allowance for U.S. Appl. No. 09/989,765 dated Dec. 22, 2009; 8 pages.

USPTO Notice of Allowance for U.S. Appl. No. 09/994,600 dated Jan. 4, 2010; 4 pages.

USPTO Notice of Allowance for U.S. Appl. No. 10/002,217 dated Jan. 11, 2010; 7 pages.

USPTO Notice of Allowance for U.S. Appl. No. 09/989,777 dated Jan. 15, 2010; 8 pages.

USPTO Notice of Allowance for U.S. Appl. No. 11/965,291 dated Jan. 13, 2010; 4 pages.

USPTO Notice of Allowance for U.S. Appl. No. 09/975,115 dated Jan. 29, 2010; 9 pages.

USPTO Non-Final Rejection for U.S. Appl. No. 10/133,581 dated Feb. 24, 2006; 11 pages.

USPTO Final Rejection for U.S. Appl. No. 09/994,601 dated Jan. 5, 2010; 13 pages.

USPTO Non-Final Rejection for U.S. Appl. No. 09/998,848 dated Dec. 10, 2009; 16 pages.

USPTO Notice of Allowance for U.S. Appl. No. 10/008,096 dated Feb. 1, 2010; 6 pages.

USPTO Non-Final Rejection for U.S. Appl. No. 11/201,627 dated Dec. 24, 2009; 22 pages.

USPTO Final Rejection for U.S. Appl. No. 11/200,619 dated Jan. 4, 2010; 18 pages.

USPTO Non-Final Rejection for U.S. Appl. No. 11/644,100 dated Dec. 16, 2009; 13 pages.

USPTO Non-Final Rejection for U.S. Appl. No. 11/850,260 dated Jan. 14, 2010; 8 pages.

USPTO Notice of Allowance for U.S. Appl. No. 10/033,027 dated Feb. 18, 2010; 4 pages.

USPTO Notice of Allowance for U.S. Appl. No. 09/989,762 dated Feb. 22, 2010; 7 pages.

USPTO Notice of Allowance for U.S. Appl. No. 11/986,338 dated Feb. 16, 2010; 4 pages.

USPTO Non-Final Rejection for U.S. Appl. No. 12/136,557 dated Mar. 15, 2010; 10 pages.

USPTO Notice of Allowance for U.S. Appl. No. 11/965,677 dated Feb. 12, 2010; 4 pages.

USPTO Notice of Allowance for U.S. Appl. No. 11/985,340 dated Feb. 19, 2010; 8 pages.

USPTO Notice of Allowance for U.S. Appl. No. 12/218,404 dated Feb. 16, 2010; 7 pages.
USPTO Notice of Allowance for U.S. Appl. No. 10/709,886 dated Feb. 16, 2010; 7 pages.
USPTO Non-Final Rejection for U.S. Appl. No. 10/133,581 dated Aug. 12, 2005; 12 pages.
USPTO Notice of Allowance for U.S. Appl. No. 10/133,581 dated Mar. 5, 2010; 9 pages.
USPTO Non-Final Rejection for U.S. Appl. No. 10/133,581 dated Sep. 1, 2009; 18 pages.
USPTO Final Rejection for U.S. Appl. No. 10/133,581 dated May 11, 2009; 21 pages.
USPTO Non-Final Rejection for U.S. Appl. No. 10/133,581 dated Nov. 26, 2008; 20 pages.
USPTO Final Rejection for U.S. Appl. No. 10/133,581 dated Jun. 11, 2008; 14 pages.
USPTO Non-Final Rejection for U.S. Appl. No. 10/133,581 dated Nov. 27, 2007; 15 pages.
USPTO Final Rejection for U.S. Appl. No. 10/133,581 dated Jul. 13, 2007; 15 pages.
USPTO Non-Final Rejection for U.S. Appl. No. 10/133,581 dated Jan. 10, 2007; 14 pages.
USPTO Final Rejection for U.S. Appl. No. 10/133,581 dated Aug. 10, 2006; 13 pages.
USPTO Notice of Allowance for U.S. Appl. No. 10/001,477 dated Mar. 23, 2010; 6 pages.
USPTO Notice of Allowance for U.S. Appl. No. 09/989,765 dated Mar. 31, 2010; 8 pages.
USPTO Notice of Allowance for U.S. Appl. No. 12/104,672 dated Jan. 11, 2010; 7 pages.
USPTO Non-Final Rejection for U.S. Appl. No. 11/799,439 dated Nov. 2, 2007; 7 pages.
USPTO Non-Final Rejection for U.S. Appl. No. 11/799,439 dated May 29, 2008; 8 pages.
USPTO Final Rejection for U.S. Appl. No. 11/799,439 dated Dec. 18, 2008; 6 pages.
USPTO Notice of Allowance for U.S. Appl. No. 11/799,439 dated Jun. 25, 2009; 6 pages.
USPTO Notice of Allowance for U.S. Appl. No. 11/799,439 dated Feb. 5, 2010; 4 pages.

* cited by examiner

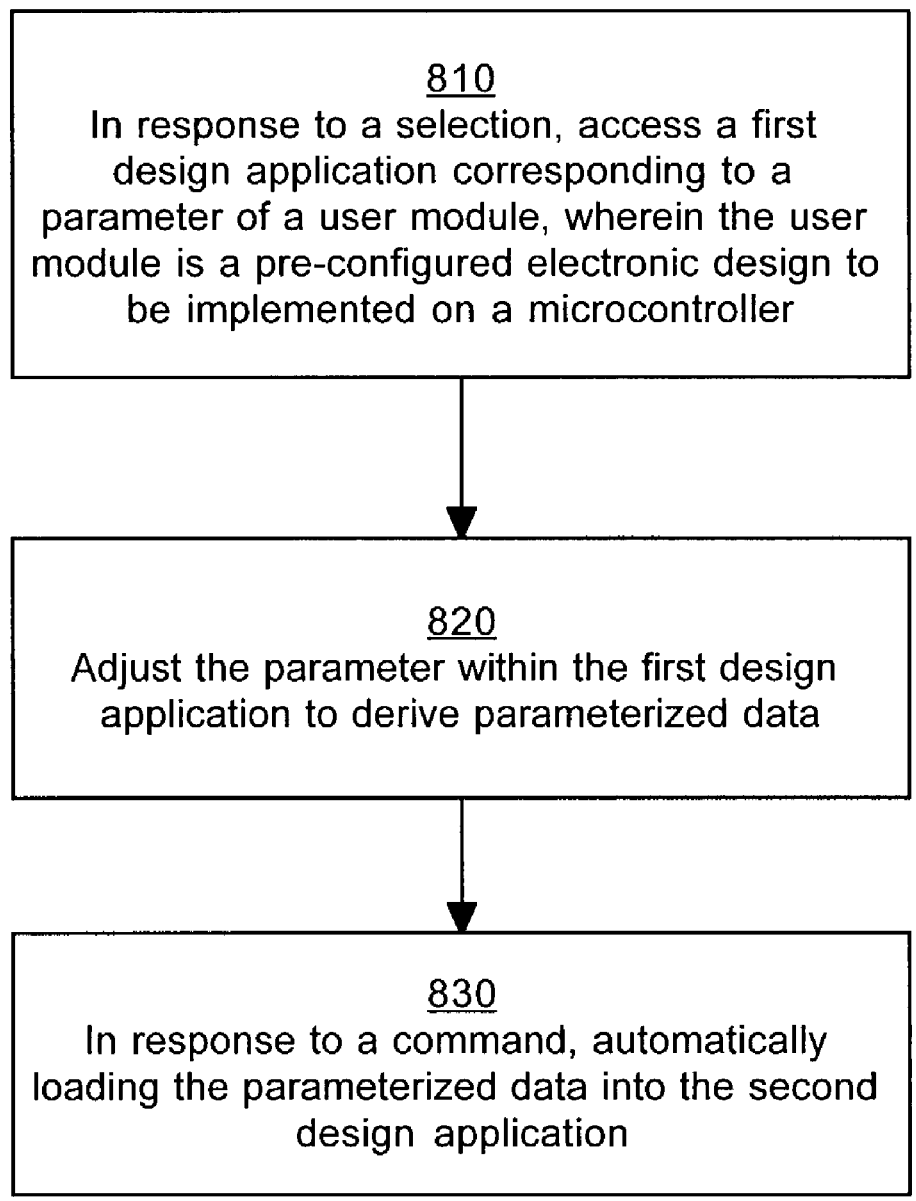

METHOD FOR PARAMETERIZING A USER MODULE

FIELD OF INVENTION

The present invention generally relates to software applications. Specifically, the present invention relates to an application used for designing a microcontroller.

BACKGROUND OF THE INVENTION

Microcontrollers function to replace mechanical and electromechanical components in a variety of applications and devices. Since they were first introduced approximately 30 years ago, microcontrollers have evolved to the point where they can be used for increasingly complex applications. Some microcontrollers in use today are also programmable, expanding the number of applications in which they can be used.

However, even though there are a large number of different types of microcontrollers available on the market with a seemingly wide range of applicability, it is still often difficult for a designer to find a microcontroller that is particularly suited for a particular application. Unique aspects of the intended application may make it difficult to find an optimum microcontroller, perhaps necessitating a compromise between the convenience of using an existing microcontroller design and less than optimum performance.

In those cases in which a suitable microcontroller is found, subsequent changes to the application and new requirements placed on the application will likely affect the choice of microcontroller. The designer thus again faces the challenge of finding a suitable microcontroller for the intended application.

Currently, design tools are available for designing, configuring and programming microcontrollers or other programmable electronic devices for providing a desirable microcontroller. Conventional design tools often provide for including a number of selectable microprocessor peripherals in the programmable device. In order to design the peripheral component to provide optimal performance, parameters of the peripheral component are adjusted accordingly. The conventional tools typically require a user to open up a separate application for determining the optimized parameters of selected peripherals. Typically, the separate application must be accessed through the operating system of the computer system, and cannot be accessed directly from the microcontroller design tool.

Upon completion of parameterizing a user module, the parameterized data is entered into the microcontroller design tool. Currently, the parameterized data must be entered into the microcontroller design tool manually. Unfortunately, many peripherals have complex design techniques, and there are a large number of parameters that must be set. Each parameter may be several digits in length, and may comprise a decimal point and/or may be positive or negative in value. Entering the parameters into the design tool can be very time-consuming, cumbersome and error prone. For example, if a decimal is misplaced, or a value is placed in the wrong parameter field, the peripheral component may not function properly. Since many programmable microcontrollers comprise a number of complex peripheral components, the functionality of the microcontroller may be compromised due to transcription errors.

SUMMARY OF THE INVENTION

Accordingly, a need exists for a method or system for linking an external design tool to a microcontroller design application for helping a user parameterize a user module for a programmable electronic device. A need also exists for a method or system that satisfies the above need and that provides for accessing the external design tool directly from the microcontroller design application. A need also exists for a method or system that satisfies the above needs and provides for loading parameter values from the external design tool directly into the microcontroller design application.

Embodiments of the present invention provide a method for parameterizing a user module. A first design application corresponding to a parameter of a user module is accessed, wherein the user module is a pre-configured electronic design to be implemented on a microcontroller. In one embodiment the first design application is an external design application for assisting in deriving parameterized data. In one embodiment, the first design application is accessed in response to selecting the parameter within a graphical interface of the second design application. The parameter is adjusted within the first design application to derive parameterized data.

In response to a command, the parameterized data is automatically loaded into a second design application. In one embodiment, the parameterized data is loaded into a parameter field of a graphical interface of the second design application. In one embodiment the second design application is a microcontroller design application for programming a microcontroller. In one embodiment, the command is closing the first design application. In another embodiment, the command is accessing a transfer control of a graphical interface of the first design application.

Embodiments of the present invention provide a graphical user interface comprising a first display region and a second display region. The first display region displays a first design application corresponding to a parameter of a user module, wherein a user module is a pre-configured electronic design to be implemented on a microcontroller. The first design application is for adjusting the parameter to derive parameterized data. In one embodiment, the first design application is an external design application for assisting in deriving the parameterized data. In one embodiment, the first design application is accessible in response to selecting the parameter within the second display region.

The second display region displays a second design application configured to receive the parameterized data in response to a command of the first design application, wherein the parameterized data is loaded into a parameter field of the second display region, wherein the parameter field corresponds to the parameter. In one embodiment, the second design application is a microcontroller design application for programming a microcontroller. In one embodiment, the command is closing the first design application. In another embodiment, the command is accessing a transfer control of a graphical interface of the first design application.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 8 is a flowchart illustrating steps in a process for parameterizing a user module in accordance with one embodiment of the present invention.

DETAILED DESCRIPTION

Figure 1:
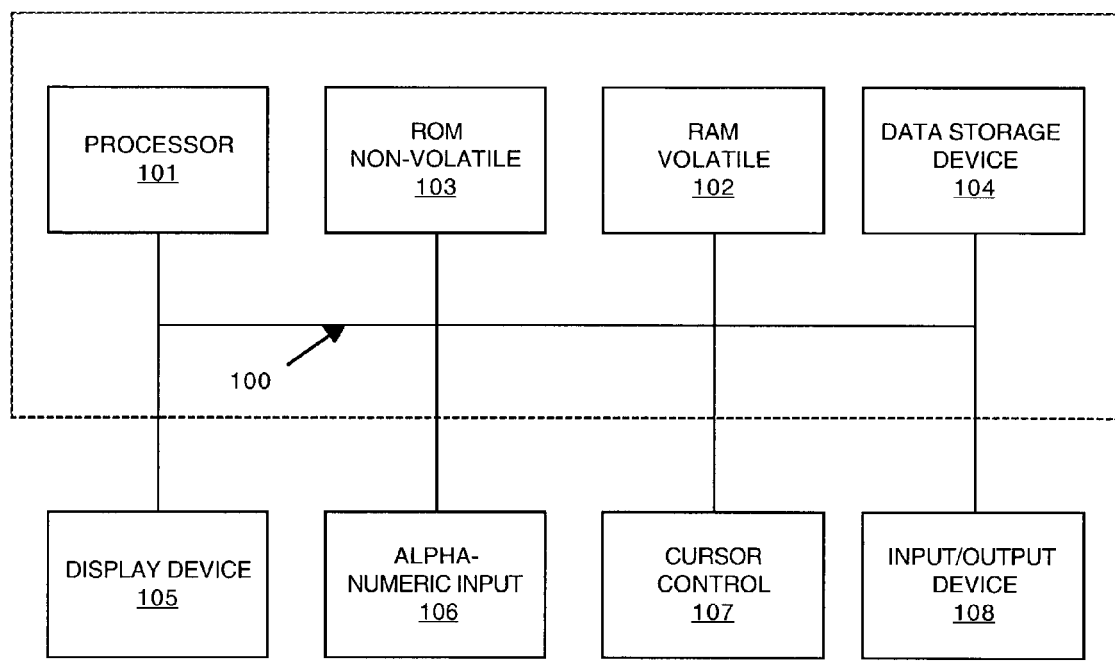
FIG. 1 is a block diagram of an exemplary computer system upon which embodiments of the present invention may be practiced.

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "adjusting," "loading," "programming," "assisting," "closing," "selecting," "deriving" or the like, refer to actions and processes (e.g., processes 300 and 800 of FIGS. 3 and 8, respectively) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

Refer now to FIG. 1, which illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, an optional input/output (I/O) device 108 is used to couple computer system 190 onto, for example, a network.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (e.g., a pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Microcontroller suppliers (e.g., commercially available from Cypress MicroSystems in Bothell, Wash.) offer standard parts that combine a microprocessor with several user-configurable "building blocks." These building blocks may be assembled, configured and programmed to form many standard microprocessor peripherals, as well as to form unique peripherals as may be required by a specific application. Thus, a user can tailor a microcontroller to meet his or her specific requirements, in less time and at less cost than through other means. A microcontroller assembled from these building blocks is referred to herein as a programmable system on a chip (PSoC).

The present invention is described in the context of a software tool, portions of which are comprised of computer-readable and computer-executable instructions which reside, for example, in computer-usable media of a computer system such as that exemplified by FIG. 1. The present invention is primarily described as being used with a tool for designing configuring, programming, compiling, building (assembling), emulating, and debugging an embedded microcontroller, in particular a class of microcontrollers that provide analog and/or digital subsystems comprising many dynamically configurable blocks. An example of this class is referred to herein as a programmable system on a chip (PSoC). Additional information regarding PSoCs is provided in the co-pending, commonly-owned U.S. patent application Ser. No. 10/033,027, filed Oct. 22, 2001, by W. Snyder, and entitled "Microcontroller Programmable System on a Chip," hereby incorporated by reference.

Figure 2A:
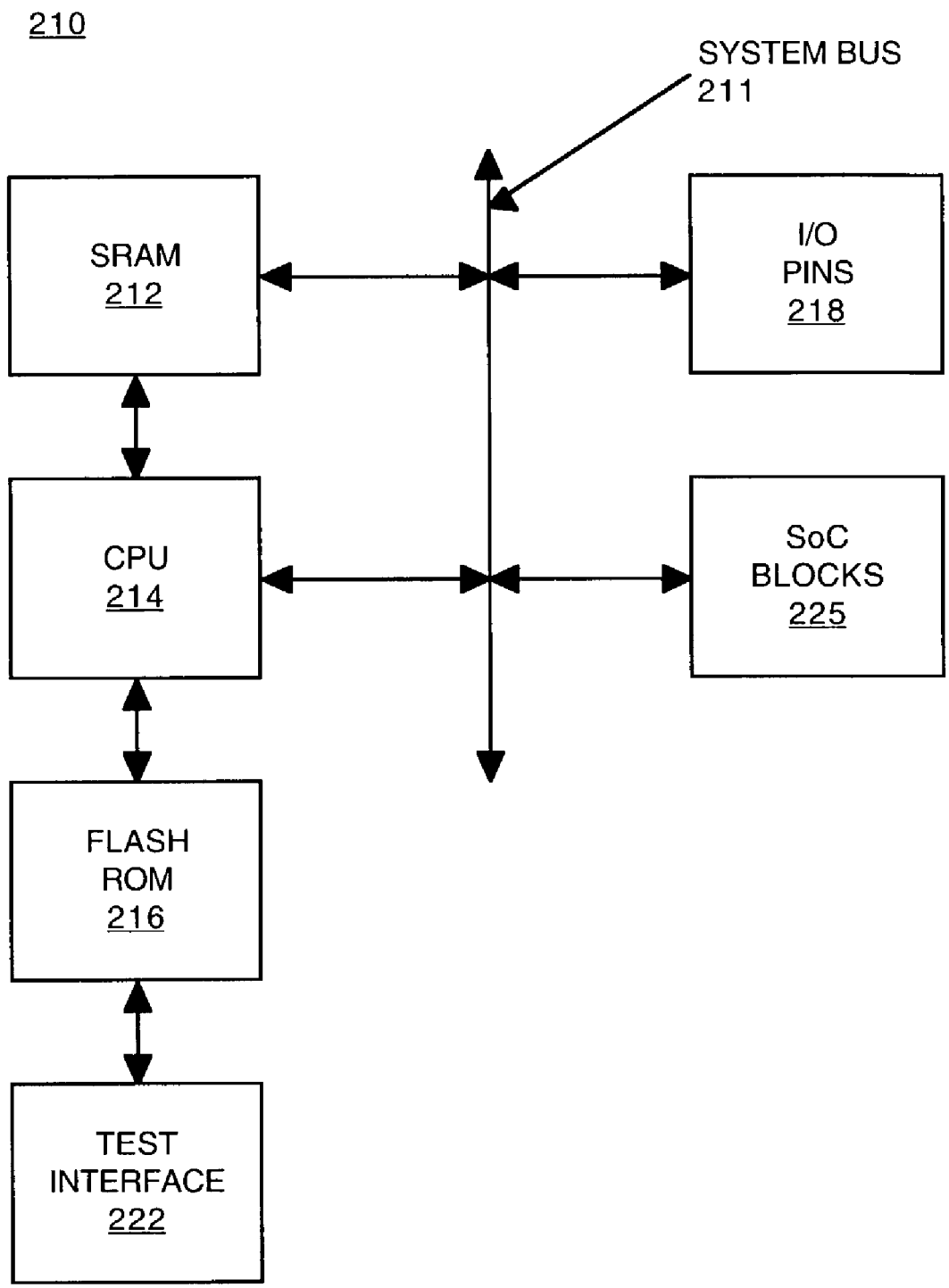
FIG. 2A is a block diagram of an exemplary programmable system on a chip (SoC) architecture used with one embodiment of the present invention.

FIG. 2A is a block diagram of an integrated circuit (or microcontroller) 210 that exemplifies a microcontroller which uses the PSoC architecture. In the illustrated embodiment, integrated circuit 210 includes a system bus 211, and coupled to bus 211 are synchronous random access memory (SRAM) 212 for storing volatile or temporary data during firmware execution, central processing unit (CPU) 214 for processing information and instructions, flash read-only memory (ROM) 216 for holding instructions (e.g., firmware), input/output (I/O) pins 218 providing an interface with external devices and the like, and system on a chip (SoC) blocks 225. The SoC blocks 225 include analog blocks and digital blocks, which are further described below (see FIG. 2B).

Figure 2B:
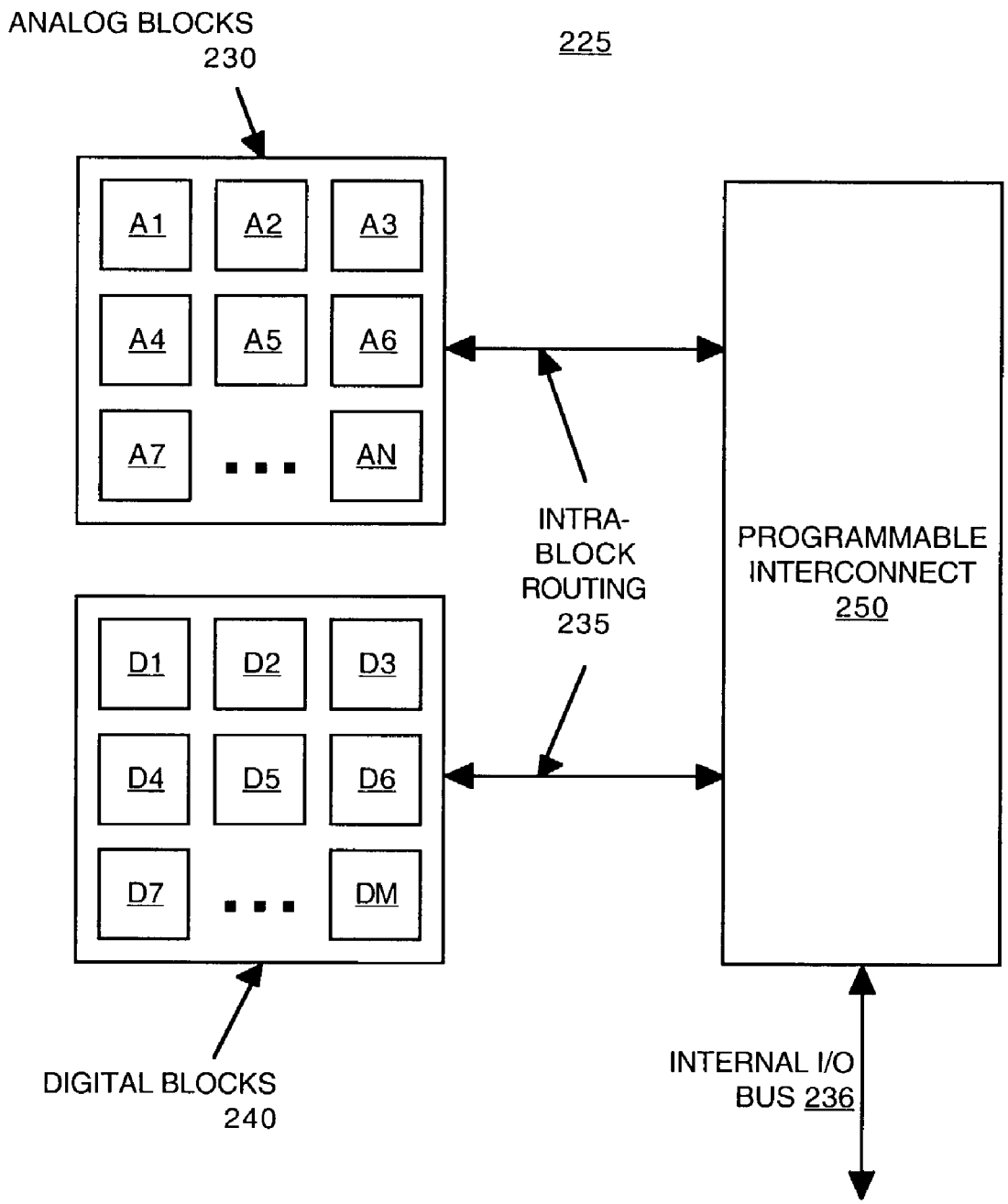
FIG. 2B is a block diagram of an exemplary arrangement of SoC blocks used with one embodiment of the present invention.

Referring to FIG. 2B, an embodiment of SoC block 225 is depicted in greater detail. In this embodiment, SoC block 225 includes an analog functional block 230, a digital functional block 240, and a programmable interconnect 250. Analog block 220 includes, in the present embodiment, a matrix of interconnected analog blocks A1 through AN. The number N may be any number of analog blocks. Likewise, digital block 240 includes, in the present embodiment, a matrix of interconnected digital blocks D1 through DM. The number M may be any number of digital blocks. The analog blocks A1 through AN and the digital blocks D1 through DM are fundamental building blocks that may be combined in different ways to accomplish different functions. Importantly, different combinations of blocks, producing different functions, may exist at different times within the same system. For example, a set of blocks configured to perform the function of analog-to-digital conversion may sample a signal. After processing that signal in the digital domain, those same blocks (perhaps in conjunction with a few others) may be recombined in a different configuration to perform the function of digital-to-analog conversion to produce an output signal.

Continuing with reference to FIG. 2B, the internal matrices of analog blocks 230 and digital blocks 240 may be constituted, in one embodiment, by a routing matrix described further in the patent application referenced above. Analog blocks 230 and digital blocks 240 are electrically and/or communicatively coupled to programmable interconnect 250, in the present embodiment, by intra-block routing 235. Each individual functional unit, e.g., analog blocks A1 through AN and digital blocks D1 through DM, may communicate and interact with each and/or any other functional unit. Which functional unit communicates with which other functional unit is programmable, in the present embodiment, via the configurability of the programmable interconnect 250. The programmable interconnect 250 is connected via an internal input/output (I/O) bus 236 to pin-by-pin configurable I/O transceivers (pins) 218 (FIG. 2A), which effect communicative coupling between integrated circuit 210 (FIG. 2A) and external modalities. The total pin count of pin-by-pin configurable I/O pins 218 may vary from one application to another, depending on the system device under consideration.

Figure 3:
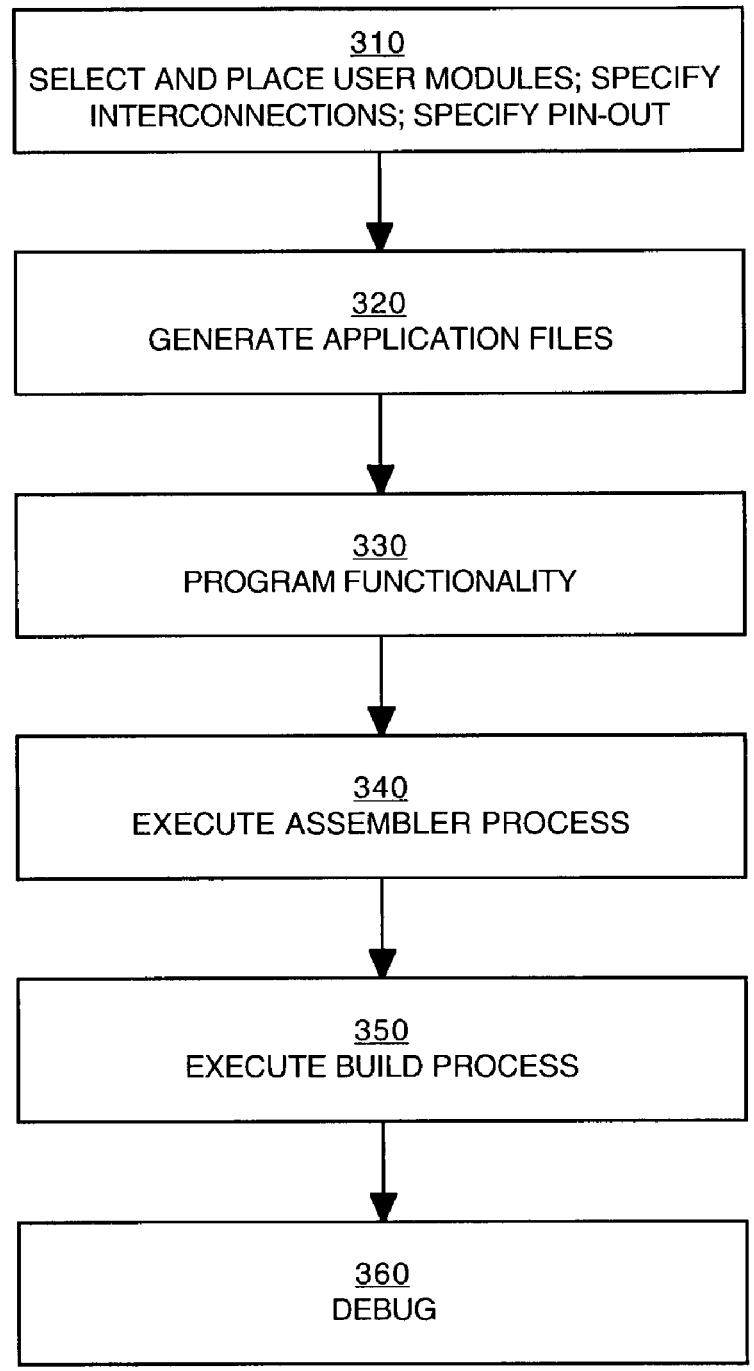
FIG. 3 is a flowchart of a process used by a microcontroller design tool in accordance with one embodiment of the present invention.

With reference next to FIG. 3, process 300 illustrates exemplary steps used by a microcontroller design tool in accordance with one embodiment of the present invention. The purpose of process 300 is to configure, program, compile, build, emulate and debug a customized microcontroller (a "target device") based on the integrated circuit 210 and SoC blocks 225 of FIGS. 2A and 2B.

In one embodiment, process 300 of FIG. 3 is carried out by a processor under the control of computer-readable and computer-executable instructions. The computer-readable and computer-executable instructions reside, for example, in data storage features such as computer usable volatile memory 102, computer-usable non-volatile memory 103, and/or data storage device 104 of FIG. 1. The computer-readable and computer-executable instructions are used to control or operate in conjunction with, for example, central processing unit 101 of FIG. 1.

Although specific steps are disclosed in process 300 of FIG. 3, such steps are exemplary. That is, the present invention is well suited to use with various other steps or variations of the steps recited in process 300. Additionally, for purposes of clarity and brevity, the following discussion and examples specifically deal with a microcontroller design tool. The present invention, however, is not limited solely to use with a microcontroller design tool. Instead, the present invention is well suited to use with other types of computer-aided hardware and software design systems in which it is necessary to accomplish a multitude of tasks as part of an overall process.

In step 310, applicable "user modules" are selected. A user module, as used herein, is a preconfigured function that may be based on more than one SoC blocks. A user module, once placed and programmed, will work as a peripheral on the target device. At any time in process 300, user modules may be added to or removed from the target device.

The selected user modules can then "placed" or "mapped" onto the SoC blocks 225 of FIG. 2B. Once a user module is placed, its parameters can be viewed and modified as needed. Global parameters used by all of the user modules (for example, CPU clock speed) can also be set.

Continuing with step 310 of FIG. 3, interconnections between the selected user modules can be specified, either as each user module is placed or afterwards. The pin-out for each PSoC block can be specified, making a connection between the software configuration and the hardware of the target device.

In step 320, application files can be generated. When application files are generated, existing assembly-source and C compiler code are updated for all device configurations, and application program interfaces (APIs) and interrupt service routines (ISRs) are generated.

In step 330, the functionality can be programmed into the target device. Source code files can be edited, added or removed.

In step 340, the assembler process can be executed. The assembler operates on an assembly-language source to produce executable code. This code is compiled and built into an executable file that can be downloaded into an emulator, where the functionality of the target device can be emulated and debugged.

In step 350, the target device can be "built." Building the target device links all the programmed functionalities of the source files (including device configuration), which are downloaded to a file for debugging.

In step 360, the target device can be emulated using an in-circuit emulator for debugging. The emulator allows the target device to be tested in a hardware environment while device activity is viewed and debugged in a software environment.

Figure 4:
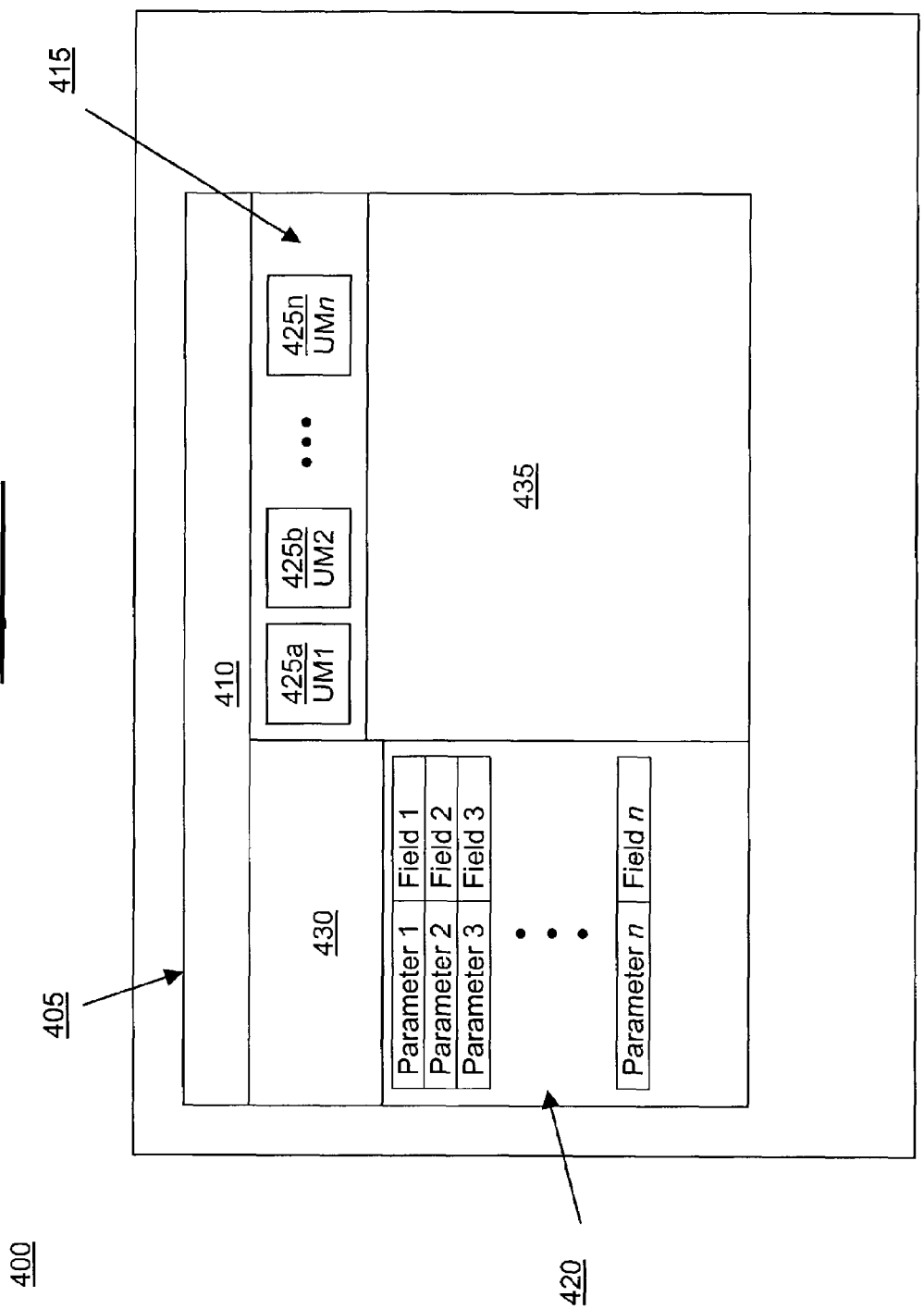
FIG. 4 is an exemplary graphical user interface comprising a display region in accordance with one embodiment of the present invention.

FIG. 4 is an exemplary graphical user interface (GUI) 400 as displayed on a computer display comprising a display region 405 in accordance with one embodiment of the present invention. In one embodiment, GUI 400 is displayed on display device 105 of computer system 190 (FIG. 1). It is appreciated that GUI 400 is exemplary only, and that they may include different numbers and shapes of elements and windows other than those that are illustrated.

In one embodiment, display region 405 is for displaying a design application. In one embodiment, the design application is a microcontroller design application for programming a microcontroller. Display region 405 comprises selected user modules 415, and user module parameters 420. In one embodiment, first display region 405 also comprises menu bar 410 for performing operations within the design application, global resources information 430 for setting parameters for all user modules and user module placement 435 for placing a user module onto the SoC blocks (e.g., SoC blocks 225 of FIG. 2B).

Selected user modules 415 comprises at least one user module 425. It should be appreciated that selected user modules 415 may comprise any number of user modules (e.g., user modules 425a-n), and is not limited by the present embodiment. In response to a user module being selected, for example user module 425a, parameters corresponding to user module 425a are rendered in user module parameters 420.

In one embodiment, user module 425a is selected by a user using well-known GUI techniques. That is, for example, a user can position a cursor over an element and "click" a cursor control element (e.g., a mouse) to select an element. In one embodiment, highlighting or changing the color of the user module indicates a selected user module. In another embodiment, a selected user module is by bolding or otherwise altering the text within the user module. In general, a selected user module is rendered in a way that allows the user to readily determine which user module has been selected.

User module parameters 420 comprises at least one parameter for a selected user module. User module parameters are used to define the operating characteristics of a user module. A parameter has a corresponding field for inputting a value for the parameter. It should be appreciated that user module parameters 420 may comprise any number of parameters and corresponding fields (e.g., parameters 1-n and fields 1-n), and are not limited to the present embodiment. The number of parameters and corresponding fields within user module parameters 420 is dependent on the parameters defined within a selected user module.

A parameter value for a parameter is input into the corresponding field. In one embodiment, an external design application is used for assisting in deriving the parameterized data for a parameter. In one embodiment, a parameter is selected by a user using well-known GUI techniques, as described above. In response to the parameter being selected, an external design application is opened in a different display region for assisting in deriving parameterized data.

Figure 5:
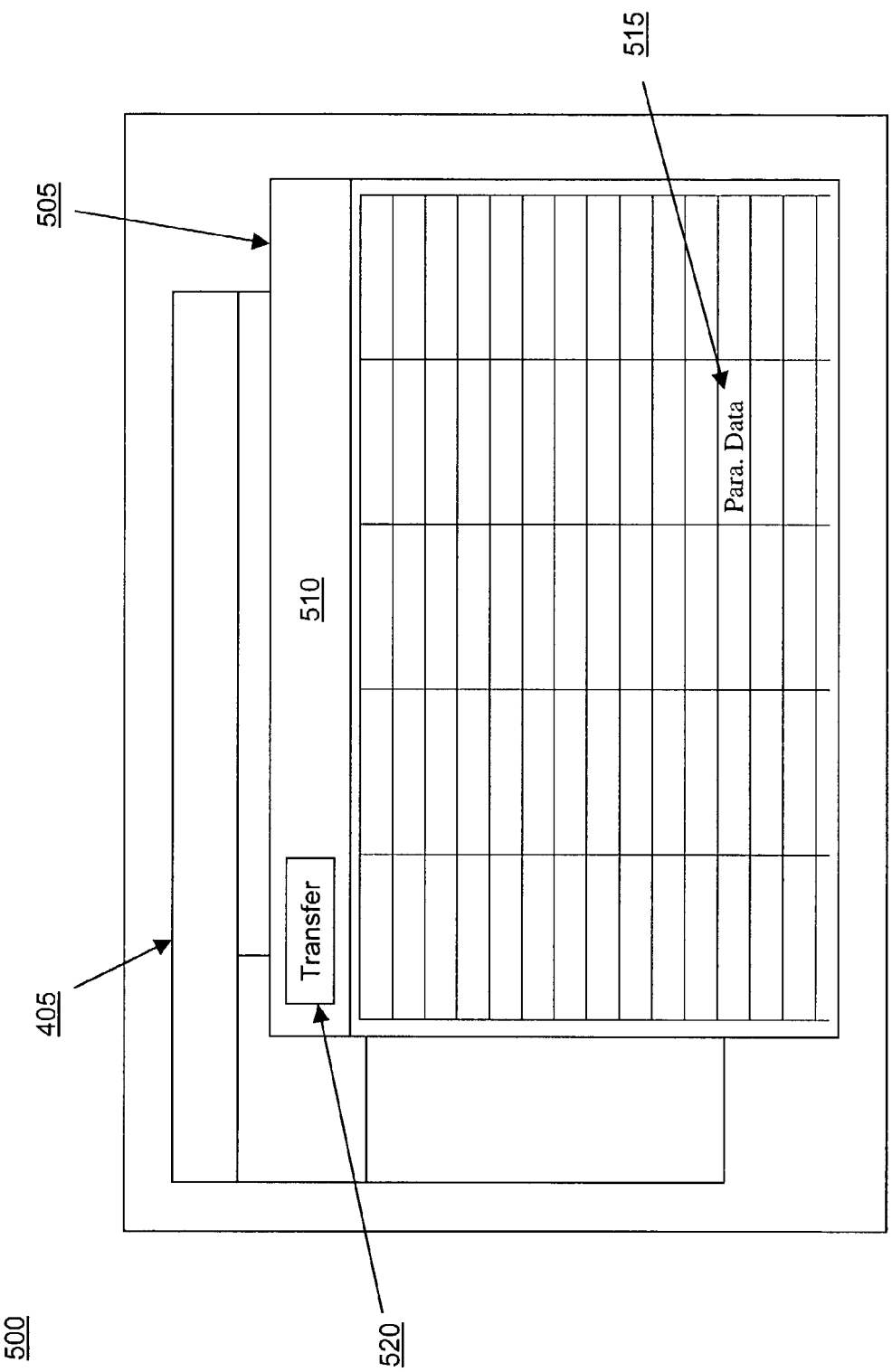
FIG. 5 is an exemplary graphical user interface comprising a first display region and a second display region in accordance with one embodiment of the present invention.

FIG. 5 is an exemplary graphical user interface 500 as displayed on a computer display comprising a first display region 505 and a second display region 405 in accordance with one embodiment of the present invention. In one embodiment, GUI 500 is displayed on display device 105 of computer system 190 (FIG. 1). It is appreciated that GUI 400 is exemplary only, and that they may include different numbers and shapes of elements and windows other than those that are illustrated.

In one embodiment, display region 505 is for displaying a design application. In one embodiment, the design application is an external design application for assisting in deriving parameterized data 515. It should be appreciated that the design application may be any computer application used for calculating data. In one embodiment, the design application is a spreadsheet application. In one embodiment, display region 505 comprises menu bar 510 for performing operations within the design application and transfer control 520 for loading parameterized data 515 into a microcontroller design application.

The parameter is adjusted within the external design application, resulting in parameterized data 515. In response to a command, parameterized data 515 is automatically load into a microcontroller design application (e.g., the design application of second display region 405). In one embodiment, the command is closing the external design application. For example, upon exiting the external design application, parameterized data 515 is automatically loaded into the microcontroller design application. In another embodiment, the command is accessing transfer control 520. For example, upon accessing transfer control 520, parameterized data 515 is automatically loaded into the microcontroller design application. It should be appreciated that transfer control 520 can be accessed by a user using well-known GUI techniques.

In one embodiment, parameterized data 515 is loaded into a parameter field corresponding to the selected parameter within the microcontroller design application. For example, parameter 1 of user module parameters 420 of FIG. 4 is selected. An external design application (e.g., the design application of first display region 505 of FIG. 5) is accessed for assisting in deriving parameterized data 515 of FIG. 5. Upon determining parameterized data 515, a command is issued (e.g., closing the external design application or accessing transfer control 520 of FIG. 5). In response to the command, parameterized data 515 is automatically loaded into field 1 of user module parameters 420 of FIG. 4.

Figure 6:
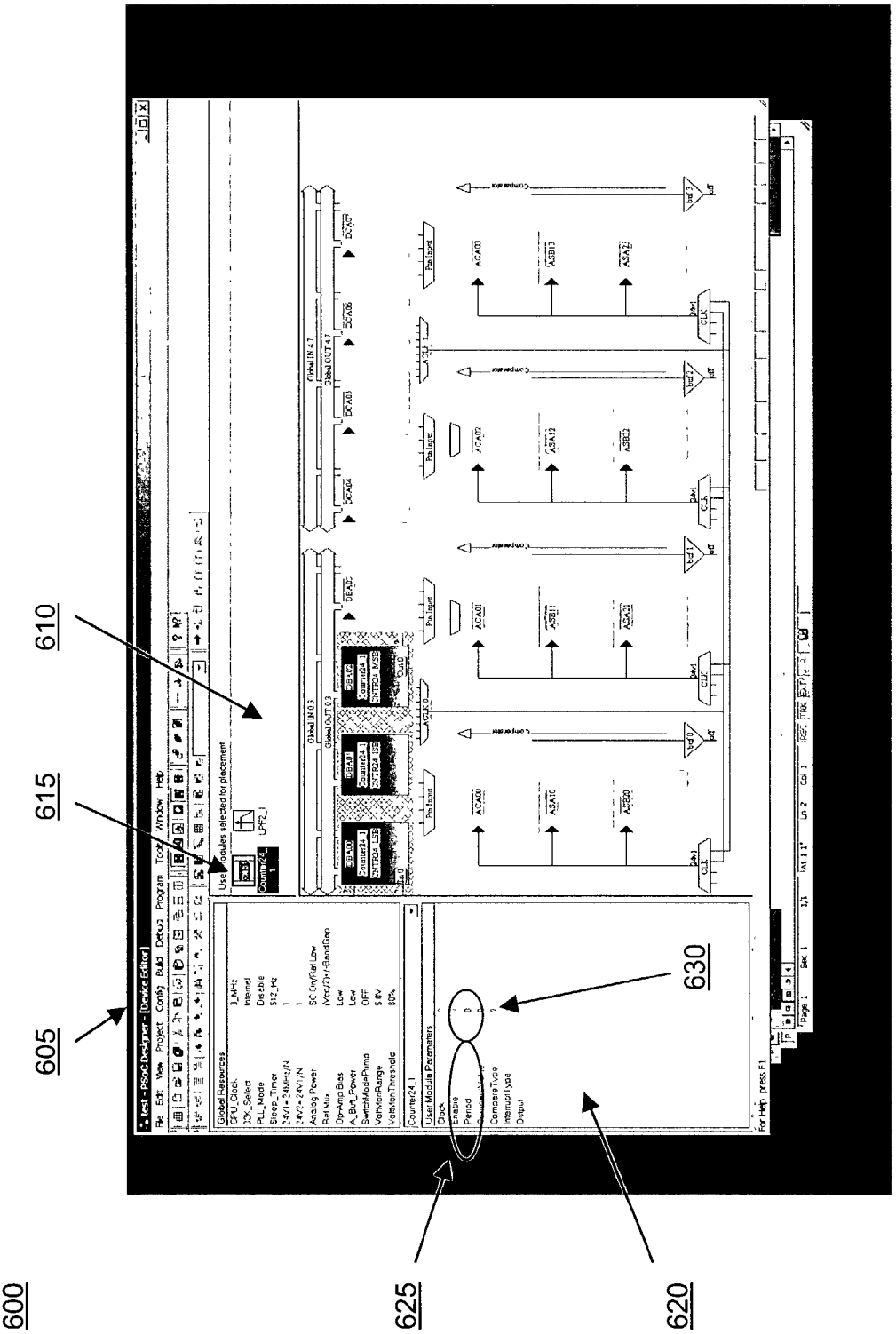
FIG. 6 is an exemplary screen shot of a graphical user interface comprising a microcontroller design application in accordance with one embodiment of the present invention.

FIG. 6 is an exemplary screen shot of GUI 600 comprising microcontroller design application 605 in accordance with one embodiment of the present invention. GUI 600 comprises selected user modules 610, and user module parameters 620. In response to selecting a user module (e.g., user module 615) of the selected user modules 610, parameters for the selected user module are presented in user module parameters 620. User module parameters 620 comprises a plurality of parameters, including parameter 625 and corresponding field 630. In response to selecting parameter 625, an external design application is accessed.

Figure 7:
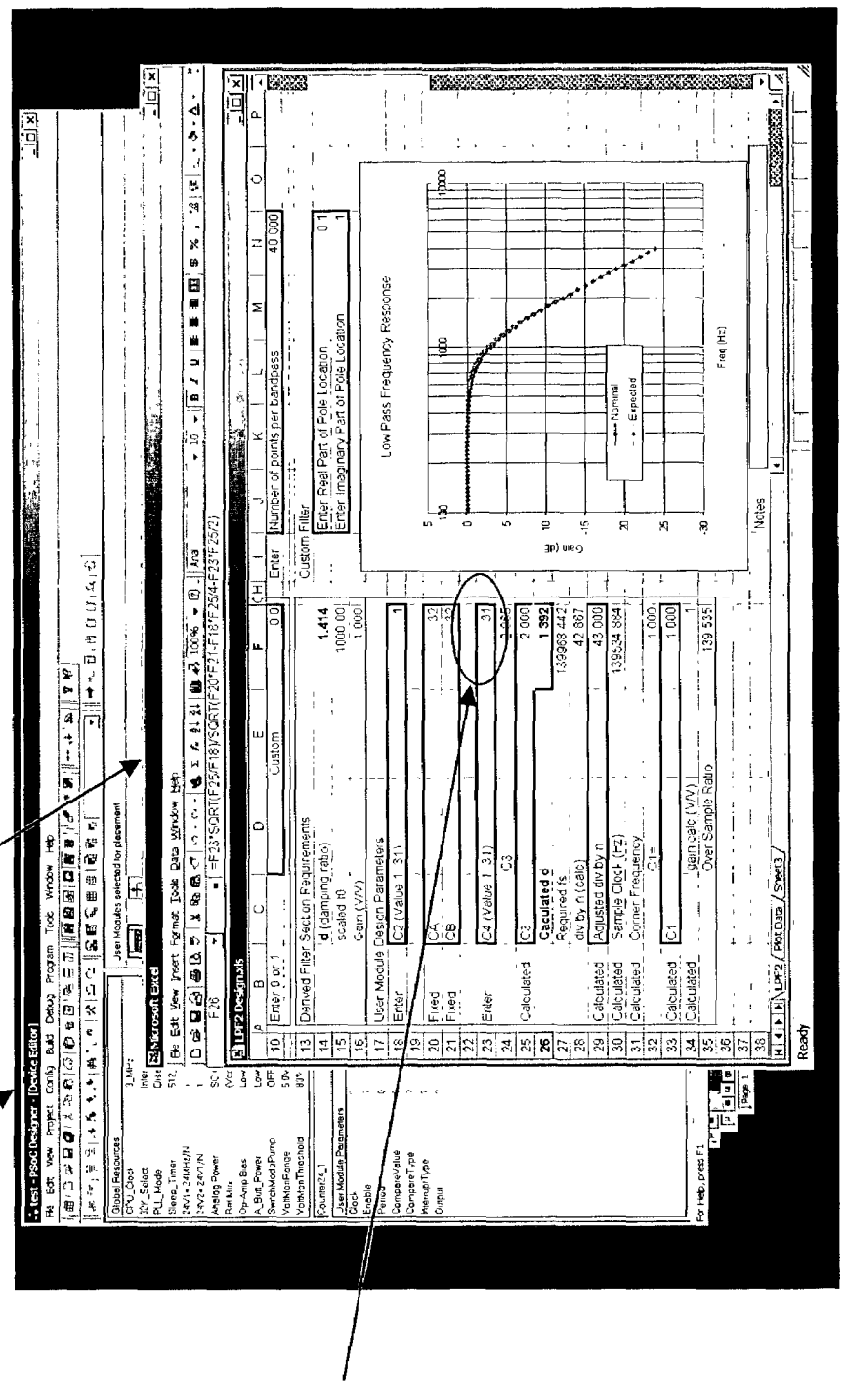
FIG. 7 is an exemplary screen shot of a graphical user interface comprising a microcontroller design application and an external design application in accordance with one embodiment of the present invention.

FIG. 7 is an exemplary screen shot of GUI 700 comprising microcontroller design application 605 and external design application 705 in accordance with one embodiment of the present invention. In the present embodiment, external design application 705 is a spreadsheet application. It should be appreciated that external design application 705 can be any application used for calculating data, and is not intended to be limited to the present embodiment. Using external design application 705, parameterized data 710 is calculated. In response to a command (e.g., exiting external design application 705), parameterized data 710 is automatically loaded into microcontroller design application 605. In one embodiment, where external design application 705 was accessed in response to the selection of parameter 625 of FIG. 6, parameterized data 710 is automatically loaded into field 630 of microcontroller design application 605.

FIG. 8 is a flowchart illustrating steps in a process 800 for parameterizing a user module in accordance with one embodiment of the present invention. In one embodiment, process 800 is carried out by processors and electrical components under the control of computer readable and computer executable instructions. Although specific steps are disclosed in process 800, such steps are exemplary. That is, the embodiments of the present invention are well suited to performing various other steps or variations of the steps recited in FIG. 8.

At step 810 of process 800, a first design application corresponding to a parameter of a user module is accessed in response to a selection, wherein a user module is a preconfigured electronic design to be implemented on a microcontroller. In one embodiment, the first design application is an external design application for assisting in deriving parameterized data. In one embodiment, the first design application is accessed in response to selecting the parameter within a graphical interface of a second design application. In one embodiment, the second design application is a microcontroller design application for programming a microcontroller.

At step 820, the parameter is adjusted within the first design application to derive parameterized data. In one embodiment, the first design application is an external design application for assisting in deriving parameterized data. It should be appreciated that the design application may be any computer application used for calculating data. In one embodiment, the design application is a spreadsheet application.

At step 830, the parameterized data automatically loading said into a second design application in response to a command. In one embodiment, the second design application is a microcontroller design application for programming a microcontroller. In one embodiment, the command is closing the first design application. In another embodiment, the command is accessing a transfer control of a graphical interface of the first design application. In one embodiment, the parameterized data is loaded into a parameter field of a graphical interface of the second design application.

The preferred embodiment of the present invention, a method for parameterizing a user module, is thus described. While the present invention has been described in particular embodiments, it should be appreciated that the present invention should not be construed as limited by such embodiments, but rather construed according to the below claims.

What is claimed is:

1. A method of parameterizing a user module, said method comprising:
    accessing a first application associated with a parameter of said user module, wherein said user module is a preconfigured electronic design to be implemented on a programmable system on a chip, wherein said user module utilizes at least one block of said programmable system on a chip to implement a predetermined functionality;
    generating parameterized data in response to an adjustment of said parameter using said first application, wherein said parameterized data is associated with operating characteristics of said user module implemented on said programmable system on a chip; and
    automatically loading said parameterized data into a second application, said second application for programming said programmable system on a chip based upon said parameterized data, and in accordance with a specified interconnection between said user module and at least one additional user module of said programmable system on a chip, and wherein said programmable system on a chip comprises a manufactured integrated circuit.

2. The method as recited in claim 1 further comprising:
    accessing said first application in response to a selection of said parameter within a graphical interface of said second application.

3. The method as recited in claim 1, wherein said second application is further operable to program said programmable system on a chip in accordance with a specified pin-out associated with said programmable system on a chip.

4. The method as recited in claim 1, wherein said first application comprises an external application separate from said second application.

5. The method as recited in claim 1, wherein said automatically loading said parameterized data into said second application comprises automatically loading said parameterized data into said second application in response to a command, and wherein said command is selected from a group consisting of a closing of said first application and a transferring of control from said first application to said second application.

6. The method as recited in claim 1 further comprising:
    loading said parameterized data into a parameter field of a graphical interface of said second application, wherein said parameter field corresponds to said parameter.

7. The method of claim 1, wherein said at least one block is selected from a group consisting of at least one analog block and at least one digital block.

8. A computer-usable medium having computer-readable program code embodied therein for causing a computer system to perform a method of parameterizing a user module, said method comprising:
    accessing a first application associated with a parameter of said user module, wherein said user module is a preconfigured electronic design to be implemented on a programmable system on a chip, wherein said user module utilizes at least one block of said programmable system on a chip to implement a predetermined functionality;
    generating parameterized data in response to an adjustment of said parameter using said first application, wherein said parameterized data is associated with operating characteristics of said user module implemented on said programmable system on a chip; and
    automatically loading said parameterized data into a second application, said second application for programming said programmable system on a chip based upon said parameterized data, and in accordance with a specified interconnection between said user module and at least one additional user module of said programmable system on a chip, and wherein said programmable system on a chip comprises a manufactured integrated circuit.

9. The computer-usable medium as recited in claim 8, wherein said method further comprises:
    accessing said first application in response to a selection of said parameter within a graphical interface of said second application.

10. The computer-usable medium as recited in claim 8, wherein said second application is further operable to program said programmable system on a chip in accordance with a specified pin-out associated with said programmable system on a chip.

11. The computer-usable medium as recited in claim 8, wherein said first application comprises an external application separate from said second application.

12. The computer-usable medium as recited in claim 8, wherein said automatically loading said parameterized data into said second application comprises automatically loading said parameterized data into said second application in response to a command, and wherein said command is selected from a group consisting of a closing of said first application and a transferring of control from said first application to said second application.

13. The computer-usable medium as recited in claim 8, wherein said method further comprises:
   loading said parameterized data into a parameter field of a graphical interface of said second application, wherein said parameter field corresponds to said parameter.

14. The computer-usable medium of claim 8, wherein said at least one block is selected from a group consisting of at least one analog block and at least one digital block.

15. A display device having rendered thereon a graphical user interface, said graphical user interface comprising:
   a first display region displaying a first application associated with a parameter of a user module, wherein said user module is a pre-configured electronic design to be implemented on a programmable system on a chip, wherein said user module utilizes at least one block of said programmable system on a chip to implement a predetermined functionality, said first application for generating parameterized data in response to an adjustment of said parameter using said first application, wherein said parameterized data is associated with operating characteristics of said user module implemented on said programmable system on a chip; and
   a second display region displaying a second application configured to receive said parameterized data, said second application for programming said programmable system on a chip based upon said parameterized data, and in accordance with a specified interconnection between said user module and at least one additional user module of said programmable system on a chip, and wherein said programmable system on a chip comprises a manufactured integrated circuit.

16. The display device as recited in claim 15, wherein said second application is further operable to program said programmable system on a chip in accordance with a specified pin-out associated with said programmable system on a chip.

17. The display device as recited in claim 15, wherein said first application comprises an external application separate from said second application.

18. The display device as recited in claim 15, wherein said parameterized data is automatically loaded into said second application in response to a command, and wherein said command is selected from a group consisting of a closing of said first application and a transferring of control from said first application to said second application.

19. The display device as recited in claim 15, wherein said parameterized data is loaded into a parameter field of said second display region, wherein said parameter field corresponds to said parameter.

20. The display device of claim 15, wherein said at least one block is selected from a group consisting of at least one analog block and at least one digital block.

\* \* \* \* \*